(12) United States Patent
Aucinas et al.

(10) Patent No.: US 12,197,454 B2
(45) Date of Patent: Jan. 14, 2025

(54) METHOD OF PROVISIONING A DATABASE SERVER

(71) Applicant: DATASWYFT LTD, Cambridgeshire (GB)

(72) Inventors: Andrius Aucinas, London (GB); Lena Irene Cheng Leng Ng, Croydon (GB); Augustinas Markevicius, London (GB)

(73) Assignee: DATASWYFT LTD, Cambridgeshire (GB)

(*) Notice: Subject to any disclaimer, the term of this patent is extended or adjusted under 35 U.S.C. 154(b) by 0 days.

(21) Appl. No.: 18/001,866

(22) PCT Filed: Jun. 15, 2021

(86) PCT No.: PCT/GB2021/051484
§ 371 (c)(1),
(2) Date: Dec. 14, 2022

(87) PCT Pub. No.: WO2021/255425
PCT Pub. Date: Dec. 23, 2021

(65) Prior Publication Data
US 2023/0222137 A1    Jul. 13, 2023

(30) Foreign Application Priority Data
Jun. 15, 2020 (GB) .................................... 2009099

(51) Int. Cl.
*G06F 16/25* (2019.01)
*G06F 21/44* (2013.01)

(52) U.S. Cl.
CPC ............ *G06F 16/252* (2019.01); *G06F 21/44* (2013.01)

(58) Field of Classification Search
CPC ....... G06F 16/252; G06F 21/44; H04L 63/20; H04L 63/10
See application file for complete search history.

(56) References Cited

U.S. PATENT DOCUMENTS

2003/0236874 A1* 12/2003 Hotti ..................... H04M 15/44
                                                  709/224
2011/0231452 A1    9/2011 Nakajima
(Continued)

FOREIGN PATENT DOCUMENTS

WO    2018/053258    3/2018

OTHER PUBLICATIONS

Allard et al., Secure Personal Data Servers: a Vision Paper, Secure Personal Data Servers: a Vision Paper. The VLDB Journal, 2010, 3 (1-2), pp. 25-35. (Year: 2010).*

(Continued)

*Primary Examiner* — Cheyne D Ly
(74) *Attorney, Agent, or Firm* — ARENTFOX SCHIFF LLP

(57) ABSTRACT

Method(s), apparatus, system(s) and platform(s) are provided for operating a personal data management component (PDMC) and provisioning/operating a personal database server (PDS) in a personal database management (PDM) platform. The PDM platform communicates over a communication network with a plurality of applications and the PDMC is communicatively coupled to a plurality of PDSs provisioned for one or more users. Each PDS is configured for storing and exchanging personal data controlled by a corresponding user. Each application is configured for providing an application service requiring access to personal user data. Provisioning a PDS for a user includes receiving a PDS creation request for a user, creating a PDS for the user, registering representative user data and user PDS, and providing a PDS identifier to the user for enabling an application to store and access personal user data in the PDS based on personal data access control information of the application.

19 Claims, 19 Drawing Sheets

(56) References Cited

U.S. PATENT DOCUMENTS

2014/0282900 A1    9/2014  Wang
2018/0173896 A1*   6/2018  Arneson ............ G06F 21/6254
2019/0104125 A1    4/2019  Dearment
2019/0364052 A1   11/2019  Walstad

OTHER PUBLICATIONS

Paradinas, P., Vandewalle, JJ. (1994). A personal and portable database server: The CQL card. In: Litwin, W., Risch, T. (eds) Applications of Databases. ADB 1994. Lecture Notes in Computer Science, vol. 819. Springer, Berlin, Heidelberg. (Year: 1994).*

Ladjel et al., 2019 18th IEEE International Conference On Trust, Security And Privacy In Computing And Communications/13th IEEE International Conference On Big Data Science And Engineering, pp. 381-388. (Year: 2019).*

Search Report dated Nov. 8, 2021 from corresponding PCT Application No. PCT/GB2021/051484.

Written Opinion dated Nov. 8, 2021 from corresponding PCT Application No. PCT/GB2021/051484.

\* cited by examiner

METHOD OF PROVISIONING A DATABASE SERVER

CROSS-REFERENCE TO RELATED APPLICATIONS

This is a national stage application filed under 37 U.S.C. 371 based on International Patent Application No. PCT/GB2021/051484, filed on Jun. 15, 2021, which is based on and claims priority to a United Kingdom Patent Application No. 2009099.9 filed on Jun. 15, 2020, disclosures of which are expressly incorporated by reference herein in their entirety.

The present application relates to an apparatus, system and method of operating a data management platform. In particular, although not exclusively, embodiments of the present application relate to an apparatus, system and method of operating a personal data management platform.

BACKGROUND

This is important under current legal data protection regulations such as, without limitation, for example the General Data Protection Regulation (GDPR) require strict procedures to be undertaken for handling personal data. When a user registers or installs an application on their user device, there are many technological and legal hurdles, the application and/or the application provider must comply with to store, process, and protect the personal data of the user.

Under the current GDPR regulations, a controller is someone who determines the purpose for which personal data of a user is to be processed and the means of processing the personal data (i.e. how the personal data is processed), and a processor is someone who processes personal data of a user on behalf of the controller (i.e. following the controller's instructions). Typically, applications, application providers and other third parties become both the controller and processor of personal data of users. Such data protection regulations are becoming particularly burdensome for, without limitation, for example applications, application providers, and/or other third party application data providers or plug-ins and have resulted in costly technical security and/or storage solutions (e.g. cloud-based storage) whilst still being liable for hefty penalties for these parties.

Even with data protection regulations in place, the user lacks the technological capability to collect, use and process the user's own personal data generated by applications, application providers and/or other third parties. This lack of capability result in the user's inability to legally contract or license their own data on demand online to websites and applications.

There is a desire for a personal database management (PDM) system or platform that is configured to provide a scalable solution for efficiently collecting and/or storing personal data of users whilst substantially removing the technological and/or legal requirements during collection, storage and/or processing of personal data of users for applications, application providers and other third party data providers, but which enable direct contracting of the personal data from users. Furthermore, there is a desire for a PDM system or platform that is also configured to provide a scalable solution for reducing the amount of redundant personal data and/or the number of personal data silos unnecessarily stored by most if not all applications and/or cloud based services.

There is also a desire for a database management (DM) system or platform suitable for use with data beyond personal data, wherein the system is configured to provide a scalable solution for efficiently collecting and/or storing the data of entities—entities including, amongst other options, users, organisations, government agencies, machines, and/or networks—whilst substantially removing the technological and/or legal requirements during collection, storage and/or processing of data of entities for applications, application providers and other third party data providers, but which enable direct contracting of the data from entities. Furthermore, there is a desire for a DM system or platform that is also configured to provide a scalable solution for reducing the amount of redundant data and/or the number of data silos unnecessarily stored by most if not all applications and/or cloud based services.

The embodiments described below are not limited to implementations which solve any or all of the disadvantages of the known approaches described above.

SUMMARY

The invention is set out in the appended set of claims.

The skilled person will understand that where reference is made below to 'personal data' and/or 'users', these terms are interchangeable with 'data' and 'entities' respectively. In particular, the skilled person will understand that while embodiments of the invention are exemplified below using personal data, the data need not be of a personal nature and the invention disclosed herein is not exclusively related to individual use and ownership but rather encompasses use and ownership by any entity, including a user, an organisation, a government agency, or a machine or network.

This Summary is provided to introduce a selection of concepts in a simplified form that are further described below in the Detailed Description. This Summary is not intended to identify key features or essential features of the claimed subject matter, nor is it intended to be used to determine the scope of the claimed subject matter; variants and alternative features which facilitate the working of the invention and/or serve to achieve a substantially similar technical effect should be considered as falling into the scope of the invention disclosed herein.

The present disclosure provides a personal data management platform that includes a plurality of personal database servers (PDSs) connected to a personal data management component (PDMC) for managing, controlling and executing application services in relation to most, if not all, the personal data of each user of a plurality of users stored on each corresponding PDS. Each user is assigned a separate personal database server that is configured to act as a personal data account (PDA) for only storing the personal data of said each user, where the user is the PDA owner. The personal database server assigned to each user is configured, via the personal data management component, to ensure that each user is a legal owner of their personal database within the user's personal database server assigned to that user and retains property rights of their personal data when using one or more applications requiring personal data of the user and/or generating further personal data of the user and the like.

The present disclosure further provides a data management platform that includes a plurality of database servers (DSs) connected to a data management component (DMC) for managing, controlling and executing application services in relation to most, if not all, the data of each entity of a plurality of entities stored on each corresponding DS. Each entity is assigned a separate personal database server that is configured to act as a data account (DA) for only storing the data of said each entity, where the entity is the DA owner. The database server assigned to each entity is configured, via the data management component, to ensure that each entity is a legal owner of their database within the entity's database server assigned to that entity and retains property rights of their data when using one or more applications requiring data of the entity and/or generating further data of the entity and the like.

In a first aspect, the present disclosure provides a computer-implemented method of provisioning a personal database server (PDS) for a user by a personal data management component (PDMC) of a personal database management (PDM) platform, the PDM platform comprising the PDMC communicatively coupled to a plurality of PDSs provisioned for one or more of a plurality of users, each PDS configured for storing and exchanging personal data controlled by said corresponding user, wherein the PDM platform communicates over a communication network with a plurality of applications, wherein each application is configured for providing an application service requiring access to personal data of one or more of the plurality of user(s), the method, performed by the PDMC, comprising: receiving a request for creating a PDS for a user of the plurality of users; creating a PDS for the user based on scalable computing infrastructure, wherein the PDS is configured for a user to control automatic storage and exchange of personal data of the user with one or more of the applications; registering data representative of the user and PDS of the user; providing a PDS identifier to the user for enabling an application to store and access personal data in the PDS of the user based on personal data access control information of the application.

As an option, creating the PDS for the user further comprises: combining at least an application programming interface (API), a web server, a database, and a file system using scalable computing infrastructure to form the PDS; and validating the PDS is connectable to the communication network via an endpoint of the API of the PDS.

Optionally, the scalable computing infrastructure comprises a web server layer and a database server layer, the web server layer comprising a plurality of web server instances and the database server layer comprising a plurality of database instances, wherein each webserver instance comprises a plurality of webserver containers and each database instance comprises a plurality of database containers, creating the PDS for the user further comprising: assigning or allocating a portion of a webserver container for creating the webserver; assigning or allocating a database container for creating the database; and linking the portion of webserver container to the database container for creating the PDS of the user.

As another option, each database instance is a single database instance, each single database instance configured with a single multi-tenant database management system shared by each of the plurality of database containers, each database container configured to execute a single tenant logical database for a user and each logical database protected with a user password, and optionally encrypted with a unique private key.

As an option, the single database instance executes a single copy of a database management system configured to manage the plurality of logical databases of each user.

As an option, wherein the application and the PDAC information of the application is previously registered with the PDMC, wherein an application is registered with the PDMC when the PDAC information of the application satisfies or meets the personal data protection requirements of the PDM platform, the method further comprising: receiving, prior to receiving the request to create a PDS for the user, a request from the application for creating a personal data account, PDA, for the user, wherein the request for creating the PDA is sent from the application during an initial set-up stage of the application with the user; determining whether the application is registered with the PDMC; in response to the application being registered with the PDMC, performing the steps of: retrieving the PDAC information of the application; displaying data representative of the PDAC information of the application to the user, wherein the application is configured to store and access personal data in the PDS of the user based on PDAC information of the application; and receiving confirmation the user approves the application handling personal data of the user in accordance with the PDAC information of the application.

As another option, wherein providing a PDS identifier to the user further comprising: receiving a personal data access token from the PDS of the user for enabling the application to store and access personal data in the PDS of the user in accordance with the PDAC information of the application; and sending the personal data access token of the application to the application for use in storing and accessing personal data in the PDS of the user.

As an option, further comprising, prior to requesting creation of a PDS for the user, receiving, from the user, a request for creating a personal data account (PDA) for the user.

Optionally, the method further comprising: receiving a set of personal data protection requirements of the user for automatically approving any application having PDAC information that meets the personal data protection requirements of the user; and setting-up a user agent for the PDS of the user, wherein the user agent is configured to automatically approve any application having PDAC information that meets the set of personal data protection requirements of the user, wherein the application is configured to store and access personal data in the PDS of the user in accordance with the PDAC information of the application.

Optionally, wherein the PDAC information of an application comprises data representative of one or more from the group of: a set of data exchange rules, instructions and/or permissions for the application governing the storage and/or exchange of personal data between a PDS of the user and the application; PDS instructions, for example, Hub-of-all things Microserver instructions, PDSI/HMI, governing the storage and/or exchange of personal data between a PDS of the user and the application; PDSI/HMI digital contract governing the storage and/or exchange of personal data between a PDS of the user and the application; any other data representative of governing the storage and/or exchange of personal data between a PDS of the user and the application.

In a second aspect, the present disclosure provides a computer-implemented method of operating a personal data management component (PDMC) of a personal database management (PDM) platform, the PDM platform comprising the PDMC communicatively coupled to a plurality of PDSs provisioned for one or more of a plurality of users, each PDS configured for storing and exchanging personal data controlled by said corresponding user, wherein the PDM platform communicates over a communication network with a plurality of applications, wherein each application is configured for providing an application service requiring access to personal data of one or more of the plurality of user(s), the method, performed by the PDMC, comprising: receiving, from a PDS of a user, an indication of the user providing an application permission to store and access personal data in the PDS of the user based on personal data access control (PDAC) information of the application, the PDAC information of the application governing the storage and exchange of personal data between the PDS of the user and the application; determining whether the application is registered with the PDMC, wherein an application is registered with the PDMC when the PDAC information of the application satisfies or meets the personal data protection requirements of the PDM platform; in response to the application being registered with the PDMC, performing the steps of: retrieving the registered PDAC information of the application governing the storage and exchange of personal data between the PDS of the user and the application; sending to the PDS of the user data representative of the retrieved PDAC information and an indication the application is registered with the PDAC; and registering the PDS of the user permitting the application access to the PDS in accordance with the registered PDAC information; wherein the PDS of the user sends a response message to the application indicating whether permission is granted based on a comparison of the retrieved PDAC information with previous PDAC information of the application used previously for configuring an API of the PDS of the user for permitting storage and exchange of personal data between the PDS and the application in accordance with the previous PDAC information.

Optionally, the method further comprising: receiving a plurality of validation request(s) from one or more PDS(s) of one or more user(s), wherein each validation request from each PDS of a user is in response to an application of the plurality of application requesting access to personal data of said each PDS of said user; sending for each validation request, when the application is registered with the PDMC to access personal data of the PDS of the user corresponding to the validation request, a validation response associated with the application to the PDS including data representative of registered PDAC information of the application, wherein the PDAC information of the application governs the permitted storage and exchange of personal data between the PDS and the application; wherein, each PDS is configured to include an API configured for controlling access to personal data of the PDS for each application permitted to store and access personal data of the PDS based on previously received PDAC information of the application, and for determining whether to permit said application access to personal data according to the PDAC information of the application based on a comparison of the previously received PDAC information and the PDAC information of the application client received in the corresponding validation response.

In a third aspect, the present disclosure provides a computer-implemented method of performing a data access by a personal data management component (PDMC) of a personal database management (PDM) platform, the PDM platform comprising the PDMC communicatively coupled to a plurality of PDSs provisioned for one or more of a plurality of users, each PDS configured for storing and exchanging personal data controlled by said corresponding user, wherein the PDM platform communicates over a communication network with a plurality of applications, wherein each application is configured for providing an application service requiring access to personal data of one or more of the plurality of user(s), the method, performed by the PDMC, comprising: receiving a plurality of validation request(s) from one or more PDS(s) of one or more user(s), wherein each validation request from each PDS of a user is in response to an application of the plurality of applications requesting access to personal data of said each PDS of said user; determining for each validation request whether each application of the plurality of applications is registered with the PDMC to access personal data of the PDS of the user corresponding to the validation request; and sending for each validation request, when the application is registered with the PDMC to access personal data of the PDS of the user corresponding to the validation request, a validation response associated with the application to the PDS including data representative of registered PDAC information of the application, wherein the PDAC information of the application governs the permitted storage and exchange of personal data between the PDS and the application; wherein, each PDS is configured to include an API configured for controlling access to personal data of the PDS for each application permitted to store and access personal data of the PDS based on previously received PDAC information of the application, and for determining whether to permit said application access to personal data according to the PDAC information of the application based on a comparison of the previously received PDAC information and the PDAC information of the application client received in the corresponding validation response.

Optionally, the method according to the second and/or third aspects further comprising: receiving an application and PDAC information of the application, the PDAC information of the application governing the storage and exchange of personal data between the PDS of the user and the application; and registering the application and PDAC information with the PDMC when the PDAC information of the application satisfies or meets the personal data protection requirements of the PDM platform.

As an option, the method according to the second and/or third aspects, wherein the received application and PDAC information of the application are submitted by an application developer of the application to the PDM platform for approval and registration with the PDMC based on the PDAC information of the application.

As an option, the method according to the second and/or third aspects further comprising: receiving, from a PDS of a user, an indication of the user providing an application permission to store and access personal data in the PDS of the user; retrieving, when the application is registered with the PDMC, registered PDAC information of the application, the PDAC information governing the storage and exchange of personal data of the user between the PDS and the application; sending, to the PDS of the user, data representative of the retrieved PDAC information for reconfiguring an application programming interface, API, of the PDS of the user for permitting the application to store and access personal data with the PDS of the user based on the PDAC information of the application.

As another option, the method according to the second and/or third aspects further comprising: receiving a personal data access request associated with an application of the plurality of applications for accessing a PDS of a user based on PDAC information used by the application for handling personal data of the user; retrieving PDAC information of the application, when registered with the PDMC, the PDAC information governing the storage and exchange of personal data of the user between the PDS and the application; sending data representative of the retrieved PDAC information of the application to the PDS of the user; receiving a permission response message from the PDS of the user indicating whether or not the user has approved the application to access the PDS of the user based on the PDAC information; in response to the permission response message of the user indicating the application is approved to access the PDS of the user, registering the PDS of the user permitting the application storage and access to personal data of the PDS in accordance with the PDAC information of the application; wherein the retrieved PDAC information is used by the PDS for reconfiguring the API of the PDS based on the PDAC information of the application, wherein the API associated with the application is configured for designating and using an application namespace designated to the application in the PDS of the user for exchanging personal data of the user in accordance with the PDAC information.

As an option, the method according to the second and/or third aspects further comprising sending, when an application and corresponding PDAC information are registered with the PDMC, data representative of the registered application and corresponding PDAC information to each PDS of the plurality of PDSs, wherein each PDS logs the registered application and corresponding PDAC information.

Optionally, the method according to the second and/or third aspects further comprising: receiving a personal data access request from an application for accessing personal user data associated with another application namespace within a PDS of the user from the plurality of users based on PDAC information used by the application for handling personal data of the user; receiving a permission response message from the PDS of the user indicating whether or not the user has approved the application to access the other namespace of the PDS based on the registered PDAC information of the application; in response to the permission response message of the user indicating the application is approved to access the PDS of the user, registering the PDS of the user permitting the application storage and access to personal data in the other namespace of the PDS in accordance with the PDAC information of the application; wherein the retrieved PDAC information is used by the PDS for reconfiguring the API of the PDS based on the registered PDAC information of the application, wherein the API associated with the application is configured for accessing personal data in the other application namespace designated to the other application in the PDS of the user in accordance with the PDAC information of the application.

As another option, the method according to the second and/or third aspects further comprising: receiving, from a PDS of a user, validate application available request indicating the user providing an application permission to store and access personal data in the PDS of the user based on personal data access control information, PDAC, of the application, wherein the validate application available request includes an application identifier and address associated with the application; determining whether the application is registered with the PDMC; in response to the application being registered with the PDMC, performing the steps of: retrieving the registered PDAC information of the application including the registered application identifier and address of the application; sending to the PDS of the user data representative of the retrieved PDAC information and an indication the application is registered with the PDAC; and registering the PDS of the user permitting the application access to the PDS in accordance with the registered PDAC information; wherein the PDS of the user checks whether the registered application identifier and address matches the application identifier and address of the validation application available request and sends a response message to the application indicating whether permission is granted based on the comparison.

Optionally, the method according to the second and/or third aspects further comprising: receiving, from a PDS of a user, an indication to rescind access to an application registered as authorised for accessing personal data of the PDS of the user in accordance with the registered PDAC information of the application; and registering the PDS of the user rescinding authorisation for the application to access the PDS; wherein the PDS of the user reconfigures the API of the PDS to block or deny the application from accessing the PDS of the user.

As an option, the method according to the second and/or third aspects further comprising: receiving an indication to rescind or disable access to an application registered as authorised for accessing personal data of one or more PDS(s) in accordance with the registered PDAC information of the application; and registering the authorisation of the registered application to access personal data of the one or more PDSs as being rescinded or disabled.

As another option, the method according to the second and/or third aspects, wherein the received indication is sent from an application developer associated with the application.

As an option, the method according to the second and/or third aspects, wherein the received indication is sent in response to the registered application and associated PDAC information failing one or more data protection criteria of the PDMC.

As an option, the method according to the second and/or third aspects further comprising: receiving a plurality of validation request(s) from one or more PDS(s) of one or more user(s), wherein each validation request from each PDS of a user is in response to a rescinded or disabled application requesting access to personal data of said each PDS of said user; sending to each of the one or more PDS(s) a validation fail response indicating the application has been rescinded or disabled; wherein each of the one or more PDS(s) reconfigures the API of said each PDS to block or deny the rescinded or disabled application from accessing the PDS of the user.

As another option, the method according to the second and/or third aspects further comprising sending one or more rescind application messages to each of the one or more PDS(s) registered to be associated with the rescinded or disabled application.

As an option, the method according to the second and/or third aspects wherein the registered PDAC information of a registered application includes data representative of an expiry time period, the expiry time period indicating when authorisation for the application accessing personal data of a PDS of a user expires, the method, performed by the PDMC, further comprising: receiving a validation request from a PDS of a user, wherein the validation request is in response to an application requesting access to personal data of said each PDS of said user; determining whether the application is registered with the PDMC to access personal data of the PDS of the user corresponding to the validation request; and sending, when the application is registered with the PDMC to access personal data of the PDS of the user corresponding to the validation request, a validation response associated with the application to the PDS including data representative of registered PDAC information of the application, wherein the PDAC information of the application further includes the data representative of the expiry time period; wherein, the PDS of the user is configured to determine whether the expiry time period has expired in relation to the authorisation of the application to access personal data of the PDS of the user, when the expiry time period has expired, the PDS of the user reconfigures the API of the PDS of the user to block or deny the application from accessing the PDS of the user.

As another option, the method according to the second and/or third aspects further comprising: determining whether the expiry time period has expired in relation to the authorisation of the application to access personal data of the PDS of the user; and registering the authorisation of the registered application to access personal data of the PDS of the user as being rescinded or disabled when the expiry time period has expired.

Optionally, the method according to the second and/or third aspects, wherein the PDAC information of an application comprises data representative of one or more from the group of: a set of data exchange rules, instructions and/or permissions for the application governing the storage and/or exchange of personal data between a PDS of the user and the application; PDS instructions, for example Hub-of-all things Microservers instructions, PDSI/HMI, governing the storage and/or exchange of personal data between a PDS of the user and the application; PDSI/HMI digital contract governing the storage and/or exchange of personal data between a PDS of the user and the application; any other data representative of governing the storage and/or exchange of personal data between a PDS of the user and the application.

As another option, the method according to the second and/or third aspects comprising provisioning a PDS of the user by: receiving a request for creating a PDS for a user of the plurality of users; creating a PDS for the user based on scalable computing infrastructure, wherein the PDS is configured for a user to control automatic storage and exchange of personal data of the user with one or more of the applications; registering data representative of the user and PDS of the user; providing a PDS identifier to the user for enabling an application to store and access personal data in the PDS of the user based on personal data access control information of the application.

As another option, the method according to the second and/or third aspects, wherein creating the PDS for the user further comprises: combining at least an application programming interface, API, a web server, a database, and a file system using scalable computing infrastructure to form the PDS; and validating the PDS is connectable to the communication network via an endpoint of the API of the PDS.

As an option, the method according to the second and/or third aspects, wherein the scalable computing infrastructure comprises a web server layer and a database server layer, the web server layer comprising a plurality of web server instances and the database server layer comprising a plurality of database instances, wherein each webserver instance comprises a plurality of webserver containers and each database instance comprises a plurality of database containers, creating the PDS for the user further comprising: assigning or allocating a portion of a webserver container for creating the webserver; assigning or allocating a database container for creating the database; and linking the portion of webserver container to the database container for creating the PDS of the user.

As another option, the method according to the second and/or third aspects, wherein each database instance is a single database instance, each single database instance configured with a single multi-tenant database management system shared by each of the plurality of database containers, each database container configured to execute a single tenant logical database for a user and each logical database protected with a user password, and optionally encrypted with a unique private key.

As an option, the method according to the second and/or third aspects, wherein the single database instance executes a single copy of a database management system configured to manage the plurality of logical databases of each user.

Optionally, the method according to the second and/or third aspects, wherein the application and the PDAC information of the application is previously registered with the PDMC, wherein an application is registered with the PDMC when the PDAC information of the application satisfies or meets the personal data protection requirements of the PDM platform, the method further comprising: receiving, prior to receiving the request to create a PDS for the user, a request from the application for creating a personal data account, PDA, for the user, wherein the request for creating the PDA is sent from the application during an initial set-up stage of the application with the user; determining whether the application is registered with the PDMC; in response to the application being registered with the PDMC, performing the steps of: retrieving the PDAC information of the application; displaying data representative of the PDAC information of the application to the user, wherein the application is configured to store and access personal data in the PDS of the user based on PDAC information of the application; and receiving confirmation the user approves the application handling personal data of the user in accordance with the PDAC information of the application.

Optionally, the method according to the second and/or third aspects, wherein providing a PDS identifier to the user further comprising: receiving a personal data access token from the PDS of the user for enabling the application to store and access personal data in the PDS of the user in accordance with the PDAC information of the application; and sending the personal data access token of the application to the application for use in storing and accessing personal data in the PDS of the user.

As another option, the method according to the second and/or third aspects further comprising, prior to requesting creation of a PDS for the user, receiving, from the user, a request for creating a personal data account (PDA) for the user.

As an option, the method according to the second and/or third aspects, further comprising: receiving a set of personal data protection requirements of the user for automatically approving any application having PDAC information that meets the personal data protection requirements of the user; and setting-up a user agent for the PDS of the user, wherein the user agent is configured to automatically approve any application having PDAC information that meets the set of personal data protection requirements of the user, wherein the application is configured to store and access personal data in the PDS of the user in accordance with the PDAC information of the application.

As an option, the method according to the first, second and/or third aspects, wherein the PDAC information of an application comprises data representative of one or more from the group of: a set of data exchange rules, instructions and/or permissions for the application governing the storage and/or exchange of personal data between a PDS of the user and the application; PDS instructions, for example Hub-of-all things Microserver instructions (PDSI/HMI) governing the storage and/or exchange of personal data between a PDS of the user and the application; PDS/HMI digital contract governing the storage and/or exchange of personal data between a PDS of the user and the application; and/or any other data representative of governing the storage and/or exchange of personal data between a PDS of the user and the application.

As an option, the method according to the first, second and/or third aspects, wherein each application of the plurality of application is configured to only store personal data of a user in a PDS of the user, and configured to only access personal data of a user from the PDS of the user.

In a fourth aspect, the present disclosure provides a computer-implemented method of operating a personal database server (PDS) of a user of a personal database management (PDM) platform, the PDM platform comprising a personal data management component, PDMC, communicatively coupled to the PDS and a plurality of other PDSs, each PDS provisioned for one of a plurality of users, each PDS configured for storing and exchanging personal data controlled by said corresponding user, wherein the PDM platform communicates over a communication network with a plurality of applications, wherein each application is configured for providing an application service requiring access to personal data of one or more of the plurality of user(s), the method, performed by the PDS of the user, comprising: sending, to the PDMC, an indication of the user providing an application permission to store and access personal data in the PDS of the user based on personal data access control information (PDAC) of the application, the PDAC information of the application governing the storage and exchange of personal data between the PDS of the user and the application; receiving, when the application and the PDAC information of the application is registered with the PDMC, an indication the application is registered with the PDMC and data representative of the registered PDAC information of the application, wherein an application is registered with the PDMC when the PDAC information of the application satisfies or meets the personal data protection requirements of the PDM platform; configuring an API of the PDS of the user for permitting storage and exchange of personal data between the PDS and the application in accordance with the received PDAC information; and sending an personal data access token generated for the application for use by the application in requesting storage and exchange of personal data between the PDS and the application in accordance with the received PDAC information.

As an option, the method of the fourth aspect further comprising: receiving, from an application, a data access request of the plurality of applications for store or access to personal data of the PDS of the user; sending, to the PDMC, a validation request to the PDMC in response to the application requesting access to personal data of the PDS of the user; receiving, from the PDMC, when the application is registered with the PDMC to access personal data of the PDS of the user, a validation response including data representative of registered PDAC information of the application, wherein the PDAC information of the application governs the permitted storage and exchange of personal data between the PDS and the application; determining, using the API of the PDS, whether the request for access to personal data of the PDS of the user complies with the received registered PDAC information of the application; sending, to the application, a data access response including data representative of the data access request.

As another option, the method of the fourth aspect further comprising: receiving, from an application, a data access request of the plurality of applications for store or access to personal data of the PDS of the user; sending, to the PDMC, a validation request to the PDMC in response to the application requesting access to personal data of the PDS of the user; receiving, from the PDMC, when the application is not registered with the PDMC to access personal data of the PDS of the user, a validation fail response; and sending, to the application, an indication that the application is not permitted to access personal data of the PDS of the user.

Optionally, the method of the fourth aspect, wherein the data access request comprises one or more data access operations from the group of: read access in relation to retrieving personal data of the user; write access in relation to storing personal data of the user; delete access in relation to personal data of the user; update access in relation to personal data of the user; any other type of access or storage operation in relation to personal data of the user; and the method comprising: performing one or more of the data access operations in relation the request from the application; and sending, to the application, the data access response including data representative of the one or more data access operations.

Optionally, the method of the fourth aspect, wherein the data access request further comprises a personal data access token of application generated by the PDS for use by the application in requesting access when the application is authorised to access personal data of the PDS.

As an option, the method of the fourth aspect, the method further comprising: determining whether to permit said application access to personal data according to the received registered PDAC information of the application based on a comparison of the PDAC information used to configure the API of the PDS in relation to the application; and sending the personal data access token of application when the comparison indicates a match, the personal data access token of application for use by the application in requesting storage and exchange of personal data between the PDS and the application in accordance with the received PDAC information.

As another option, the method of the fourth aspect further comprising: receiving a request for PDAC information associated with an application requesting access to personal data of the PDS of the user; sending, to the PDMC, the request for PDAC information associated with the application; receiving, from the PDMC when the application and PDAC information of the application is registered at the PDMC, data representative of registered PDAC information of the application; sending, to the PDMC, a permission response message indicating the user has approved the application to access the PDS of the user based on the registered PDAC information; reconfiguring the API of the PDS based on the registered PDAC information of the application, wherein the API associated with the application is configured for designating and using an application namespace designated to the application in the PDS of the user for exchanging personal data of the user in accordance with the PDAC information, wherein the application namespace is defined in the PDAC information.

Optionally, the method of the fourth aspect further comprising: receiving, from the PDMC when an application and corresponding PDAC information are registered with the PDMC, data representative of the registered application and corresponding PDAC information; and logging or registering the data representative of the registered application and corresponding PDAC information for use with authorising the application access to personal data of the PDS of the user.

As another option, the method of the fourth aspect further comprising: receiving a request for PDAC information associated with an application requesting access to personal user data associated with another application's namespace within the PDS of the user based on PDAC information used by the application for handling personal data of the user; sending, to the PDMC, the request for PDAC information associated with the application; receiving, from the PDMC when the application and PDAC information of the application is registered at the PDMC, data representative of registered PDAC information of the application; sending, to the PDMC, a permission request message indicating that the user has approved the application to access the other namespace of the PDS based on the registered PDAC information of the application; and reconfiguring the API of the PDS based on the registered PDAC information of the application, wherein the API associated with the application is configured for accessing personal data in the other application namespace designated to the other application in the PDS of the user in accordance with the PDAC information of the application.

Optionally, the method of the fourth aspect further comprising: receiving a request for authenticating and authorising an application requesting access to personal data of the PDS of the user, the request including the application identifier and address; sending, to the PDMC, a validate application available request indicating the user providing an application permission to store and access personal data in the PDS of the user based on personal data access control information, PDAC, of the application, wherein the validate application available request includes an application identifier and address associated with the application; receiving, in response to the application being registered with the PDMC, data representative of the registered PDAC information and an indication the application is registered with the PDAC, the registered PDAC information including data representative of the registered application identifier and address of the application; comparing whether the registered application identifier and address matches with the application identifier and address of the validation application available request; sending, to the application, a success response message including a personal data access token for the application when the comparison indicates a match; and sending, to the application, a fail response message indicating permission is not granted for the application when the comparison indicates a mismatch.

As another option, the method of the fourth aspect further comprising: receiving an instruction from the user to rescind an application authorised to access personal data of the PDS of the user; sending, to the PDMC, an indication to rescind access to the application registered as authorised for accessing personal data of the PDS of the user in accordance with the registered PDAC information of the application; and reconfiguring the API of the PDS to block or deny the application from accessing the PDS of the user.

Optionally, the method of the fourth aspect, the method further comprising: receiving, from an application, a data access request for storing or access to personal data of the PDS of the user; sending, to the PDMC, a validation request in response to the data access request from the application; receiving, from the PDMC, an indication to rescind or disable access to the application; reconfiguring the API of the PDS to block or deny the application from accessing the PDS of the user; and sending, to the application, an indication that the application is not permitted to access personal data of the PDS of the user.

As an option, the method of the fourth aspect, wherein: an application developer associated with the application requested the PDMC to rescind or disable the application; or the PDMC rescinded or disabled the application based on the registered application and PDAC information failing to comply with one or more data protection criteria of the PDM.

As another option, the method of the fourth aspect further comprising: receiving, from the PDMC, one or more rescind application messages associated with applications authorised to access personal data of the PDS, wherein the PDS is registered as being associated with authorising the one or more applications access to personal data of the PDS; and reconfiguring the API of the PDS to block or deny the one or more applications from accessing the PDS of the user; and sending, to each of the application, an indication that said each application is not permitted to access personal data of the PDS of the user.

Optionally, the method of the fourth aspect wherein the registered PDAC information of a registered application includes data representative of an expiry time period, the expiry time period indicating when authorisation for the application accessing personal data of a PDS of a user expires, the method further comprising: receiving, from an application, a data access request for storing or access to personal data of the PDS of the user; sending, to the PDMC, a validation request in response to the data access request from the application; receiving, when the application is registered with the PDMC to access personal data of the PDS of the user corresponding to the validation request, a validation response associated with the application including data representative of registered PDAC information of the application, wherein the PDAC information of the application further includes the data representative of the expiry time period; determining whether the expiry time period has expired in relation to the authorisation of the application to access personal data of the PDS of the user; in response to when the expiry time period has expired, performing the steps of: reconfiguring the API of the PDS of the user to block or deny the application from accessing the PDS of the user; and sending, to each of the application, an indication that said each application is not permitted to access personal data of the PDS of the user; in response to when the expiry time period is unexpired, performing the steps of: performing one or more of the data access operations in relation the request from the application; and sending, to the application, the data access response including data representative of the one or more data access operations.

As another option, the method of the fourth aspect, wherein the PDS of the user is provisioned by the PDMC when a user or application requests registration of a personal data account with the PDM platform, wherein the PDS of the user is created based on scalable computing infrastructure and configured for the user to control automatic storage and exchange of personal data of the user with one or more of the applications via a reconfigurable API of the PDS.

Optionally, the method of the fourth aspect, wherein the PDS of the user is created based on combining at least an application programming interface (API) such as a web API, a web server, a database, and a file system using scalable computing infrastructure to form the PDS.

As an option, the method of the fourth aspect, wherein the scalable computing infrastructure comprises a web server layer and a database server layer, the web server layer comprising a plurality of web server instances and the database server layer comprising a plurality of database instances, wherein each webserver instance comprises a plurality of webserver containers and each database instance comprises a plurality of database containers, the PDS of the user being created based: an assigned or allocated portion of a webserver container for creating the webserver; an assigned or allocated database container for creating the database; wherein, the portion of webserver container is linked to the database container to create the PDS of the user.

As an option, the method of the fourth aspect, wherein each database instance is a single database instance, each single database instance configured with a single multi-tenant database management system shared by each of the plurality of database containers, each database container configured to execute a single tenant logical database for a user and each logical database protected with a user password, and optionally encrypted with a unique private key.

As another option, the method of the fourth aspect, wherein the single database instance executes a single copy of a database management system configured to manage the plurality of logical databases of each user.

Optionally, the method of the fourth aspect, further comprising: receiving a set of personal data protection requirements of the user for automatically approving any application having PDAC information that meets the personal data protection requirements of the user; and setting-up a user agent for the PDS of the user, wherein the user agent is configured to automatically approve any application having PDAC information that meets the set of personal data protection requirements of the user, wherein the application is configured to store and access personal data in the PDS of the user in accordance with the PDAC information of the application.

As another option, the method of the fourth aspect, wherein the PDAC information of an application comprises data representative of one or more from the group of: a set of data exchange rules, instructions and/or permissions for the application governing the storage and/or exchange of personal data between a PDS of the user and the application; PDS instructions, for example Hub-of-all things Microserver instructions (PDSI/HMI) governing the storage and/or exchange of personal data between a PDS of the user and the application; PDSI/HMI digital contract governing the storage and/or exchange of personal data between a PDS of the user and the application; any other data representative of governing the storage and/or exchange of personal data between a PDS of the user and the application.

In a fifth aspect, the present disclosure provides a computer-implemented method of operating an application for use with a personal database management (PDM) platform the PDM platform comprising the personal data management component (PDMC) coupled to a plurality of personal database servers (PDSs), each PDS corresponding to one of a plurality of users and configured for storing and exchanging personal data associated with said corresponding user, wherein the PDM platform is coupled to a communication network for communicating with the application, wherein said application is configured for providing an application service in relation to one or more of the user(s), the method comprising: sending a PDS access request to a PDS of a user for accessing personal data of the PDS of the user based on a personal data access control (PDAC) information of the application, the PDAC information governing the storage and access of personal data of the user between the personal database server of the user and the application; receiving an indication of an application programming interface endpoint of the PDS associated with the application, the API endpoint associated with the application and configured based on the PDAC information of the application; and communicating with the API endpoint of the PDS of the user for exchanging personal data of the user between the personal database server and the application client.

Optionally, the method according to the fifth aspect further comprising: receiving the indication further comprising receiving data representative of a personal data access token generated by the PDS of the user for the application for use by the application in requesting storage and exchange of personal data between the PDS and the application in accordance with the PDAC information of the application.

As an option, the method according to the fifth aspect, the method further comprising: sending, to the PDS of the user, a data access request associated with the application storing or accessing personal data of the PDS of the user, wherein the application is registered with the PDMC to access personal data of the PDS of the user; receiving, from the PDS of the user, a data access response including data representative of the data access request.

As another option, the method according to the fifth aspect, further comprising: sending, to the PDS, a data access request for the application to store or access personal data of the PDS of the user, wherein the application is not registered with the PDMC to access personal data of the PDS of the user; and receiving, from the PDS, an indication that the application is not permitted to access personal data of the PDS of the user.

As another option, the method according to the fifth aspect, wherein the data access request comprises one or more data access operations from the group of: read access in relation to retrieving personal data of the user; write access in relation to storing personal data of the user; delete access in relation to personal data of the user; update access in relation to personal data of the user; any other type of access or storage operation in relation to personal data of the user; and the method comprising: receiving, from the PDS, a data access response including data representative of the one or more data access operations specified by the data access request.

As an option, the method according to the fifth aspect, wherein the data access request further comprises a personal data access token of application generated by the PDS for use by the application in requesting access when the application is authorised to access personal data of the PDS.

Optionally, the method according to the fifth aspect, wherein: sending, to the PDS of the user, a data access request for storing or access to personal data of the PDS of the user; and receiving, from the PDS of the user, an indication that the application is not permitted to access personal data of the PDS of the user.

As an option, the method according to the fifth aspect, further comprising requesting registration of a personal data account with the PDM platform on behalf of a user, wherein the personal data account is formed with a PDS provisioned by the PDMC, wherein the PDS of the user is created based on scalable computing infrastructure and configured for the user to control automatic storage and exchange of personal data of the user with one or more of the applications via a reconfigurable API of the PDS.

As another option, the method according to the fifth aspect, wherein the application and the PDAC information of the application is previously registered with the PDMC, wherein an application is registered with the PDMC when the PDAC information of the application satisfies or meets the personal data protection requirements of the PDM platform, the method further comprising: sending a request from the application for creating a personal data account, PDA, for the user, wherein the request for creating the PDA is sent from the application during an initial set-up stage of the application with the user; and receiving a personal data access token of the application authorising the application to store and access personal data of the PDS of the user according to the PDMC of the application.

Optionally, the method according to the fifth aspect, wherein the PDAC information of an application comprises data representative of one or more from the group of: a set of data exchange rules, instructions and/or permissions for the application governing the storage and/or exchange of personal data between a PDS of the user and the application; PDS instructions, for example Hub-of-all things Microserver instructions (PDSI/HMI) governing the storage and/or exchange of personal data between a PDS of the user and the application; PDSI/HMI digital contract governing the storage and/or exchange of personal data between a PDS of the user and the application; any other data representative of governing the storage and/or exchange of personal data between a PDS of the user and the application.

As an option, the method according to the fifth aspect, wherein personal data of a user comprises data representative of any information associated or relating to the user.

As an option, the method according to any of the first, second, third, fourth and/or fifth aspects, wherein the application is configured for execution on one or more user devices or platforms associated with the plurality of users.

As an option, the method according to any of the first, second, third, fourth and/or fifth aspects, wherein the application is further configured for only storing and accessing personal data of a user on the PDS of the user whilst providing the application service.

In a sixth aspect, the present disclosure provides an apparatus comprising a processor unit, a memory unit and a communication interface, the processor unit connected to the memory unit and the communication unit, wherein the apparatus is configured to implement the computer-implemented method according to the first aspect, modifications thereto, combinations thereof and/or as described herein.

In an seventh aspect, the present disclosure provides an apparatus comprising a processor unit, a memory unit and a communication interface, the processor unit connected to the memory unit and the communication unit, wherein the apparatus is configured to implement the computer-implemented method according to any of the second and/or third aspects, combinations thereof, modifications thereto and/or as herein described.

In an eighth aspect, the present disclosure provides an apparatus comprising a processor unit, a memory unit and a communication interface, the processor unit connected to the memory unit and the communication unit, wherein the apparatus is configured to implement the computer-implemented method according to the fourth aspect, modifications thereto, combinations thereof and/or as herein described.

In a ninth aspect, the present disclosure provides a personal data management platform comprising: a personal data management component configured according to the sixth aspect and/or the seventh aspect; and a plurality of personal database servers, each personal database server configured according to the eighth aspect; wherein the personal data management component apparatus is connected to the plurality of user database servers, and the personal database management component communicates with a plurality of applications over a communication network, each of the plurality of application configured according to the fifth aspect, modifications thereof, combinations thereof and/or as herein described.

In a tenth aspect, the present disclosure provides a personal data management system comprising: a personal data management platform according to the ninth aspect, and a plurality of applications or application providers; wherein the personal data management platform communicates over a communication network with the plurality of applications or application providers.

In an eleventh aspect, the present disclosure provides a computer-readable medium comprising code or computer instructions stored thereon, which when executed by a processor unit, causes the processor unit to perform the computer-implemented method according to the first aspect, modifications thereto, combinations thereof and/or as herein described.

In a twelfth aspect, the present disclosure provides a computer-readable medium comprising code or computer instructions stored thereon, which when executed by a processor unit, causes the processor unit to perform the computer-implemented method according to any of the second and/or third aspects, combinations thereof, modifications thereto, and/or as herein described.

In a thirteenth aspect, the present disclosure provides a computer-readable medium comprising code or computer instructions stored thereon, which when executed by a processor unit, causes the processor unit to perform the computer-implemented method according to the fourth aspect combinations thereof, modifications thereto, and/or as herein described.

In a fourteenth aspect, the present disclosure provides a computer-readable medium comprising code or computer instructions stored thereon, which when executed by a processor unit, causes the processor unit to perform the computer-implemented method according to the fifth aspect, modifications thereof, combinations thereto, and/or as herein described.

In a fifteenth aspect, the present disclosure provides a computer-implemented method of provisioning a database server (DS) for an entity by a data management component (DMC) of a database management (DM) platform, the DM platform comprising the DMC communicatively coupled to a plurality of DSs provisioned for one or more of a plurality of entities, each DS configured for storing and exchanging data controlled by said corresponding entity, wherein the DM platform communicates over a communication network with a plurality of applications, wherein each application is configured for providing an application service requiring access to data of one or more of the plurality of entities, the method, performed by the DMC, comprising: receiving a request for creating a DS for an entity of the plurality of entities; creating a DS for the entity based on scalable computing infrastructure, wherein the DS is configured for an entity to control automatic storage and exchange of data of the entity with one or more of the applications; registering data representative of the entity and DS of the entity; providing a DS identifier to the entity for enabling an application to store and access data in the DS of the entity based on data access control information of the application.

In a sixteenth aspect, the present disclosure provides a computer-implemented method of operating a data management component (DMC) of a database management (DM) platform, the DM platform comprising the DMC communicatively coupled to a plurality of DSs provisioned for one or more of a plurality of entities, each DS configured for storing and exchanging data controlled by said corresponding entity, wherein the DM platform communicates over a communication network with a plurality of applications, wherein each application is configured for providing an application service requiring access to data of one or more of the plurality of entities, the method, performed by the DMC, comprising: receiving, from a DS of an entity, an indication of the entity providing an application permission to store and access data in the DS of the entity based on data access control (DAC) information of the application, the DAC information of the application governing the storage and exchange of data between the DS of the entity and the application; determining whether the application is registered with the DMC, wherein an application is registered with the DMC when the DAC information of the application satisfies or meets the data protection requirements of the DM platform; in response to the application being registered with the DMC, performing the steps of: retrieving the registered DAC information of the application governing the storage and exchange of data between the DS of the entity and the application; sending to the DS of the entity data representative of the retrieved DAC information and an indication the application is registered with the DAC; and registering the DS of the user permitting the application access to the DS in accordance with the registered DAC information; wherein the DS of the entity sends a response message to the application indicating whether permission is granted based on a comparison of the retrieved DAC information with previous DAC information of the application used previously for configuring an API of the DS of the entity for permitting storage and exchange of data between the DS and the application in accordance with the previous DAC information.

In a seventeenth aspect, the present disclosure provides a computer-implemented method of performing a data access by a data management component (DMC) of a database management (DM) platform, the DM platform comprising the DMC communicatively coupled to a plurality of DSs provisioned for one or more of a plurality of entities, each DS configured for storing and exchanging data controlled by said corresponding entity, wherein the DM platform communicates over a communication network with a plurality of applications, wherein each application is configured for providing an application service requiring access to personal data of one or more of the plurality of entities, the method, performed by the DMC, comprising: receiving a plurality of validation request(s) from one or more DS(s) of one or more entities, wherein each validation request from each DS of an entity is in response to an application of the plurality of applications requesting access to data of said each DS of said entity; determining for each validation request whether each application of the plurality of applications is registered with the DMC to access data of the DS of the entity corresponding to the validation request; and sending for each validation request, when the application is registered with the DMC to access data of the DS of the entity corresponding to the validation request, a validation response associated with the application to the DS including data representative of registered DAC information of the application, wherein the DAC information of the application governs the permitted storage and exchange of data between the DS and the application; wherein, each DS is configured to include an API configured for controlling access to data of the DS for each application permitted to store and access data of the DS based on previously received DAC information of the application, and for determining whether to permit said application access to data according to the DAC information of the application based on a comparison of the previously received DAC information and the DAC information of the application client received in the corresponding validation response.

In an eighteenth aspect, the present disclosure provides a computer-implemented method of operating a database server (DS) of an entity of a database management (DM) platform, the DM platform comprising a data management component, DMC, communicatively coupled to the DS and a plurality of other DSs, each DS provisioned for one of a plurality of entities, each DS configured for storing and exchanging data controlled by said corresponding entity, wherein the DM platform communicates over a communication network with a plurality of applications, wherein each application is configured for providing an application service requiring access to data of one or more of the plurality of entities, the method, performed by the DS of the entity, comprising: sending, to the DMC, an indication of the entity providing an application permission to store and access data in the DS of the entity based on data access control information (DAC) of the application, the DAC information of the application governing the storage and exchange of data between the DS of the entity and the application; receiving, when the application and the DAC information of the application is registered with the DMC, an indication the application is registered with the DMC and data representative of the registered DAC information of the application, wherein an application is registered with the DMC when the DAC information of the application satisfies or meets the data protection requirements of the DM platform; configuring an API of the DS of the entity for permitting storage and exchange of data between the DS and the application in accordance with the received DAC information; and sending a data access token generated for the application for use by the application in requesting storage and exchange of data between the DS and the application in accordance with the received DAC information.

In a nineteenth aspect, the present disclosure provides a computer-implemented method of operating an application for use with a database management (DM) platform the DM platform comprising the data management component (DMC) coupled to a plurality of database servers (DSs), each DS corresponding to one of a plurality of entities and configured for storing and exchanging data associated with said corresponding entity, wherein the DM platform is coupled to a communication network for communicating with the application, wherein said application is configured for providing an application service in relation to one or more of the entities, the method comprising: sending a DS access request to a DS of an entity for accessing data of the DS of the entity based on a data access control (DAC) information of the application, the DAC information governing the storage and access of data of the entity between the database server of the entity and the application; receiving an indication of an application programming interface endpoint of the DS associated with the application, the API endpoint associated with the application and configured based on the DAC information of the application; and communicating with the API endpoint of the DS of the entity for exchanging data of the user between the database server and the application client.

In a twentieth aspect, the present disclosure provides an apparatus comprising a processor unit, a memory unit and a communication interface, the processor unit connected to the memory unit and the communication unit, wherein the apparatus is configured to implement the computer-implemented method according to the fifteenth aspect, modifications thereto, combinations thereof and/or as described herein.

In a twenty-first aspect, the present disclosure provides an apparatus comprising a processor unit, a memory unit and a communication interface, the processor unit connected to the memory unit and the communication unit, wherein the apparatus is configured to implement the computer-implemented method according to any of the sixteenth and/or seventeenth aspects, combinations thereof, modifications thereto and/or as herein described.

In a twenty-second aspect, the present disclosure provides an apparatus comprising a processor unit, a memory unit and a communication interface, the processor unit connected to the memory unit and the communication unit, wherein the apparatus is configured to implement the computer-implemented method according to the eighteenth aspect, modifications thereto, combinations thereof and/or as herein described.

In a twenty-third aspect, the present disclosure provides a data management platform comprising: a data management component configured according to the twentieth aspect and/or the twenty-first aspect; and a plurality of database servers, each database server configured according to the twenty-second aspect; wherein the data management component apparatus is connected to the plurality of entity database servers, and the database management component communicates with a plurality of applications over a communication network, each of the plurality of application configured according to the nineteenth aspect, modifications thereof, combinations thereof and/or as herein described.

In a twenty-fourth aspect, the present disclosure provides a data management system comprising: a data management platform according to the twenty-third aspect, and a plurality of applications or application providers; wherein the data management platform communicates over a communication network with the plurality of applications or application providers.

In a twenty-fifth aspect, the present disclosure provides a computer-readable medium comprising code or computer instructions stored thereon, which when executed by a processor unit, causes the processor unit to perform the computer-implemented method according to the fifteenth aspect, modifications thereto, combinations thereof and/or as herein described.

In a twenty-sixth aspect, the present disclosure provides a computer-readable medium comprising code or computer instructions stored thereon, which when executed by a processor unit, causes the processor unit to perform the computer-implemented method according to any of the sixteenth and/or seventeenth aspects, combinations thereof, modifications thereto, and/or as herein described.

In a twenty-seventh aspect, the present disclosure provides a computer-readable medium comprising code or computer instructions stored thereon, which when executed by a processor unit, causes the processor unit to perform the computer-implemented method according to the eighteenth aspect combinations thereof, modifications thereto, and/or as herein described.

In a twenty-eighth aspect, the present disclosure provides a computer-readable medium comprising code or computer instructions stored thereon, which when executed by a processor unit, causes the processor unit to perform the computer-implemented method according to the nineteenth aspect, modifications thereof, combinations thereto, and/or as herein described.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

This application acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1A:
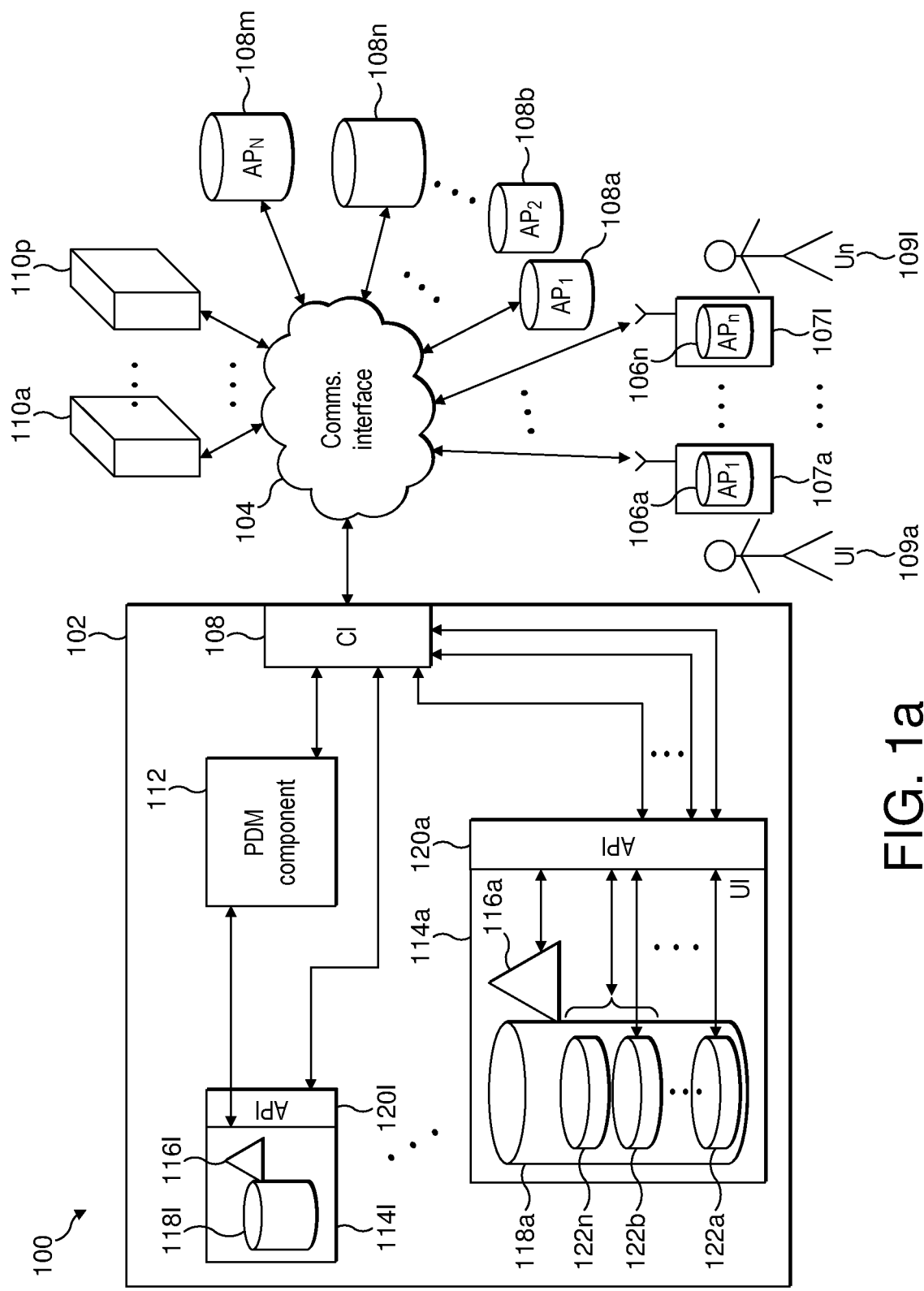
FIG. 1a is a schematic diagram illustrating an example PDM system and PDM platform according to some embodiments of the invention.

Common reference numerals are used throughout the figures to indicate similar features.

DETAILED DESCRIPTION

Embodiments of the present invention are described below by way of example only. These examples represent a best mode of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

In particular, references to 'personal data' and 'user' in the description of the embodiments below are to be understood to be interchangeable with references to 'data' (i.e. data beyond that of a personal nature) and 'entity' (e.g. a user, an organisation, a government agency, or a machine or network amongst other options) respectively. In particular, while the embodiments disclosed below exemplify the invention through personal data use and ownership, the invention as set out in the claims encompasses data use and ownership by other entities.

The invention provides a personal data management platform that includes a plurality of personal database servers (PDSs) connected to a personal data management component (PDMC) for managing, controlling and executing application services in relation to most, if not all, the personal data of each user of a plurality of users stored on each corresponding PDS. Each user is assigned a separate personal database server that is configured to act as a personal data account (PDA) for only storing the personal data of said each user, where the user is the PDA owner. The personal database server assigned to each user is configured, via the personal data management component, to ensure that each user is a legal owner of their personal database within the user's personal database server assigned to that user and retains property rights of their personal data when using one or more applications requiring personal data of the user and/or generating further personal data of the user and the like.

Personal data of a user comprises or represents data representative of any information generated of the user, generated by the user, associated with the user, or relating to the user whether the user can or cannot be identified by the data. Examples of personal data of the user may include, by way of example only but not limited to, any identifier associated with the user such as, without limitation, for example an email address, social security number, employee identifier, tax number, bank account number, and/or any other identifier associated with the user; any information or data related to the user such as, without limitation, for example photographs of the user, video of the user (e.g. CCTV footage of their activities), sound of the user, text or messages associated with the user, and/or multimedia content of the user; any data generated of the user or by the user, such as, without limitation, for example any data collected in relation to a user and their actions or activities and/or any measured data by one or more sensors of the user (e.g. opening a door that has sensor data); any information about the user created by others such as, without limitation, for example his personnel record; other personal data include digital representations of the personal preferences of a user; personal behaviour and/or events of a user; a name of a user; location activity, health record, sleep or fitness activities, driving behavior data or other behavioral data recorded by a sensor, an image, video or multimedia data related or associated with a user; any document related or associated with the user; email associated with the user; chat and/or phone data associated with the user; chat data associated with the user; any application data associated with the user; any information generated by an application that is associated with a user; any information generated by the user and the like.

A user device or device may comprise or represent any device, endpoint device, computing device or platform controllable, operable, used and/or interact by a user or individual user that is capable of, adapted for and/or configured for executing and/or communicating with one or more applications/application clients. Examples of a user device used in some embodiments of the invention may include, by way of example only but not limited to, customer end-point device; communications devices; mobile phone; smartphone; personal computer; desktop computer; laptop; portable devices; virtual reality device; internet of things (IoT) devices; a server and/or computing/communication equipment and/or device used by a user; device capable of executing one or more applications/application clients; a smart device such as a smart fridge, smart TV, smart assistant and the like; any other device or computing device capable of operating or executing one or more applications/application clients and operable for communicating over a communications network and the like for operation and/or use by a user.

A personal database server (or a personal data server) (PDS) may comprise or represent a server/database technology that enables a user or individual to store and manage personal data and/or perform computations on it. The server/database technology may be based on computing infrastructure and/or resources configured for controlling the collection, storage, access, processing, and/or sharing of personal data. Examples of a PDS used in some embodiments of the invention may include, by way of example only but not limited to, a Hub-of-all-things Microserver configured to enable a user or individual to control the collection, storage, access, processing, and/or sharing of personal data; an application programming interface (API), webserver, database and/or file system combined and configured to enable a user or individual to control the collection, storage, access, processing, and/or sharing of personal data; one or more servers configured to enable a user or individual to control the collection, storage, access/exchange, processing, and/or sharing of personal data; any combination of hardware and/or software configured to enable a user or individual to control the collection, storage, access, processing, and/or sharing of personal data; a computing entity or cloud instance instantiated from a cloud computing platform, network or architecture that is configured to enable a user or individual to control the collection, storage, access, processing, and/or sharing of personal data; a virtual server configured for controlling the collection, storage, access, processing, and/or sharing of personal data and the like.

A personal data account (PDA) may comprise or represent an interface configured for providing a user with credentials to access and control a PDS configured for storing and accessing personal data of the user and is created when a user or individual is registered by the PDM platform. For example, every new PDA of a user gets provisioned a PDS, and the user may get access to a PDS by logging into the PDA via an interface (e.g. PDS Dashboard) that enables the user to issue instructions via, by way of example only but not limited to, an application running on their device/user device or within a web-browser on the device/user device, and gets access to the trusted data storage and exchange system provided by the PDM platform, which enables user controlled data transfers to/from the PDS of the user and third parties such as, without limitation, for example applications/application client(s), application providers, application data providers, and/or data providers and the like. A PDS might have more than one user but only one owner. Each user of a PDA is also an owner of a PDS/PDS technology.

The PDM platform and/or PDMC are configured to uphold or maintain the following principles, without limitation, for example of: 1. ensuring data rights of each user of a PDS (also known as a personal data account (PDA) owner); 2. ensuring data mobility of personal data of a PDA (i.e. personal data of a user stored in the PDS assigned to the user); 3. ensuring control of the personal data by PDA owners; 4. upholding trust and credibility between parties such as, without limitation, for example applications and PDA owners; 5. preservation of identity/personas by PDA owners; 6. preservation of privacy by design; 7. ensuring security and scalability in performance; 8. ensuring portability of PDAs; 9. upholding standards for responsible and transparent data conduct.

The PDM platform according to the invention is configured to: provision a PDS (e.g. Hub-of-All-Things (HAT) Microserver (RTM)) when registering a PDA for an individual or user, which may be, without limitation, for example at the request of the user, one or more websites and/or applications in relation to a user using those websites and/or applications; using the PDS to form a PDA that collects, stores, process(es) and/or share(s) personal data of the user in a permissioned and controlled manner such that the user retains property rights over their personal data including the right to assign such rights, this facilitates the movement of personal data into and out of the PDS of a PDA of a user; and enabling the PDS of a user to control access, storage and/or visualisation of personal data of the PDA by users/individuals.

An application or application client of an application, app, application program or application software may comprise or represent a computer program, computer code and/or instructions designed to help users or individuals perform an activity and/or provides an application service to one or more users or individuals. There are many variations or configurations for how an application may be configured, operate and/or executed in relation to providing an application service to a user or individual. For example, an application may be standalone software, code or computer instructions that only executes on a user device. In another example, an application may be software, code or computer instructions that executes remotely and provides the application service to a user via a corresponding application client executing on the user device/device operated by the user.

Applications/application clients may be configured during operation/execution to only store personal data of the user, which may be generated for or by the user during use of the application/application client, within the PDS of the user. When applications/application clients are configured to store the personal data of a user in a single place that is under the control of the user, e.g. a PDS of the user, then this substantially reduces the duplication and redundant storage of personal data of a user that is out of the control of the user. For example, each application/application client may define or require one or more namespace for storing and/or accessing personal data of the user in the PDS of the user. Conventionally, each of a plurality of applications may require to use, store and/or access personal data of a user, which is stored on the application providers or application developers servers/storage mediums and the like. This means that there is a large duplication and collection of personal data of the user that occurs. This requires specialised storage and data security infrastructure, which can be onerous to operate and ensure compliance with data protection requirements associated with storing and handling personal data of users. Furthermore, this requires all application providers and/or developers and the like to continually purchase and/or maintain enough storage to cater for the amount of personal data of the users that each of their applications and/or application clients may be collecting and storing from users. Enabling applications/application clients to store and/or access personal data of a user in a single place such as a PDS of the user that is also under the control of the user, substantially reduces, without limitation, for example the duplication and required secure storage infrastructure and/or data security technologies that application providers/developers/applications/or application clients require for each application that handles, generates, stores and/or access(es) personal data of users. This may be achieved by the PDM system or platform as described herein that is configured to enable applications/application clients to only store and/or access personal data associated with a user from a single storage system, where such access and storage of personal data of a user in a PDS of the user is under the control of the user. For simplicity, the terms application or application/application client are used herein as examples only, but it is to be appreciated by the skilled person that, where applicable, the terms application and application client may be used synonymously and/or are interchangeable in the following description where applicable and/or as the application demands.

Each application (or application client) may be submitted to the PDM platform to (1) request for personal data access control information comprising data representative of a set of technical data storage rules, exchange rules and/or permissions and specification to be set up between the application and the user and it also (2) declares a rating based on where data is stored in relation to the way it handles personal data of each user of the application/application client. Once the request for technical specification set up is approved, the PDM platform loads the specification into the PDMC. When a user registers with an application, the application redirects the user to the PDM platform where the specification is auto-generated and displayed for the user to confirm. Once the specification is confirmed by the user, the PDMC creates the user's PDS and loads the specification into the PDS together with any other access and/or storage rules contained within the specification. The PDM Platform then transfers the legal rights of the database by technically enabling the user to create their own password which can be before or after the database is created. Once the password is created, PDS access to the user's database is only possible by having the owner/user's permission based on the data access and/or storage rules originally specified and agreed by both parties (e.g. application and the owner/user) and recorded by the PDM platform.

The personal data access control information may comprise data representative of a set of rules, instructions and/or permissions that enable a digital permission based data exchange contract that governs the agreed upon exchange of data between application/application client 106a and the database of the PDS 114a of the user. This enables the user to become a data controller of the personal data of the PDS 114a. The personal data access control information may comprise or represent a set of rules, instructions and/or permissions associated with the application for governing the exchange of data between application/application client 106a and the PDS 114a of the user.

The personal data access control information may include, without limitation, for example data representative of: 1. Permissions that are given to applications, application clients, application providers/developers and the like to act on their behalf and do what it is permitted to do with personal data of the user in the PDS of the user (e.g. read and write personal data into the PDS of the user); 2. Agreements: formed when users agree to allow applications/application clients to operate based on personal data access control information proposed to the user/owner of the PDS of the user by applications, application clients/application providers and the like that are in compliance with the PDM System/Platform, and agreed by the users of the PDS in exchange for consideration. Offer, consideration, and acceptance are presented and agreed through 'HMI screens' (or, more generally, PDSI screens) presented to the user/owner of the PDS of the user.

The application can then access and/or store the user personal data in the database based on the specified personal data access control information (e.g. set of rules, instructions and permissions) that govern the exchange of personal data between the application and the PDS of the user approving use of the application. The generated set of rules, instructions and permissions of the specification define the data access and/or storage rules requested by the application, how the application may access the application namespace assigned to the application within the database of the user. If the data access and/or storage rules specified by the application changes and/or requires access to other personal data of the user within another application namespace (e.g. cross namespace data) of the personal database, then a further "data debit" specification is created by the PDM platform and the specification to enable the data debit would be generated for user acceptance. After the acceptance of the specification by the user of the personal database server, the application will then have the permission to access the approved data within the personal database of the personal data server.

Users may be assigned a PDS to form a PDA with one or more applications with each application having their assigned namespaces and/or folders within the personal database for storing/holding/accessing personal data of the user that can be accessed by corresponding applications based on a set of rules and/or permissions generated for each application based on that application's requirements of handling/accessing/storing/using personal data of the user. An application may assist in the provisioning of a PDS assigned to user. For example, when an application registers a user wishing to use the application, the application may notify the PDM platform to create a new PDA that includes a PDS assigned to the user for holding and managing personal data of the user and the connections to the personal data management component and/or application. The PDS is configured to check with the personal data management component the data access/storage rules and/or permissions, which may have been pre-approved, before allowing the application access to its PDA.

FIG. 1a is a schematic illustration of an example personal database management (PDM) system 100 including a PDM platform 102 according to the invention. The PDM system 100 includes the PDM platform 102 in communication over a communication network 104 with a plurality of applications (and/or application clients) 106a-106n, a plurality of application providers 108a-108m, and/or a plurality of application data providers 110a-110p. The PDM platform 102 includes a personal data account management component 112, a plurality of personal database servers (PDSs) 114a-114l, and a communications interface 108, where the personal data account management component 112 is connected to each of the plurality of PDSs 114a-114l and the communication interface 108. In this example, each of the PDSs 114a-114l corresponds to one of a plurality of users 109a-109l. Each PDS 114a is configured for storing and distributing personal data associated with a corresponding user 109a of the plurality of users 109a-109l. The PDM platform 102 communicates over the communication network 104 with the plurality of applications 106a-106n, application providers 108a-108m and/or plurality of application data providers 110a-110p and the like. Each of the applications 106a-106n or application providers 108a-108m are configured for providing an application service.

In this example, each of the users 109a-109l may have at least one user device 107a-107l, in which each of the user devices 107a-107l includes one or more of the applications 106a-106n stored thereon, which when executed provides an application service in relation to the user 109a. Each user 109a may have one or more user devices 107a-107l, and each of the one or more user devices 107a-107l are configured to execute one or more of the applications 106a-106n. Each of the applications 106a-106n may be associated with one of the plurality of application providers 108a-108m. Each of the one or more application(s) 106a-106n executing on a user device 107a of a user 109a may require the use of personal data of the user 109a during operation on the user device 107a for providing the required application service to the user 109a. The PDM platform 102 is configured to act as a contact point or central anchor for enabling PDSs of each of the users 109a-109l to control the access, storage, exchange and/or distribution of personal data the PDS 114a of a user 109a to control the exchange and/or distribution of the personal data of the user 109a stored thereon with one or more of the application(s) 106a-106n, one or more application providers 108a-108m, and/or one or more application data providers 110a-110p and the like.

The personal data management component (PDMC) 104 may be configured to log all activities on the PDM platform 102, responds to PDS requests for verified application access/storage permissions template to enable the personal data of user to be exchanged, and serves as an authorised application registrar and logs associated (sets of rules and permissions) personal data access control information for accessing/storing personal data of users by applications. The personal data management component 112 may be configured to further provide authoritative information about approved applications 106a-106n and their sets of data access/storage rules and the like. The PDMC 112 provides personal data access control information corresponding to one or more application(s) to application programming interfaces (APIs) 120a-120l configured for enabling each of the PDSs 114a-114l to verify the trustworthiness of entities such as, without limitation, for example applications 106a-106n, application providers 108a-108m and/or application data providers 110a-110p that they interact with. Each of the APIs 120a-120l are configured for enabling each of the PDSs 114a-114l to exchange personal data of their user in a standardised fashion and according to the personal data access control information (e.g. data access rules/permissions) specified for each of the applications 106a-106n accepted by the corresponding user of each of the PDSs 114a-114l.

Each PDS 114a has an API 120a with a list of endpoints that can be accessed by different applications 106a-106n (or application clients of the applications 106a-106n), and configured with personal data access control information (e.g. data access rules/permissions) associated with which of the applications 106a-106n can access which endpoints with the rules/permissions defining the access of the applications to personal data in the database 118a of the PDS 114a. These aspects of the API 120a can be dynamically reconfigured as the PDS 114a operates and is being used and as each application 106a is permitted access to personal data of the PDS 114a according to personal data access control information associated with each application/application client 106a/108a. Essentially, each database 118a of a PDS 114a can be accessed through a unique domain name and the API 120a is exposed based on this domain name. For example, when a user registers for a PDA from the PDM platform 102 with PDA username "gus" the corresponding PDS 114a may be given a domain name "gus.hubofallthings.net", and through this domain, portions of the API 120a may be exposed that allows access to different parts or namespaces 122a-122n of the database 118a to one or more of the applications 106a-106n according to the personal data access control information corresponding to each of these applications/application clients 106a-106n.

The PDMC 112 may be configured to generate personal data access control information (e.g. a set of data exchange rules and permissions) associated with an application 106a based on a set of data access rules for accessing personal data as specified by the application 106a or the application developer. Should the user 109a approve of an application 106a to access personal data from the PDS 114a of the user 109a, the personal data access control information (a set of data exchange rules and permissions) governing the exchange of personal data of the user 109a between the PDS 114a of the user 109a and the application 106a may be generated based on the set of data access rules specified by the PDM platform as requested by the application 106a for handling personal data of the user 109a. The personal data access control information for the application 106a may be registered and stored in relation to the application 106a and the PDS 114a of the user 109a. Thereafter, the API 120a associated with the PDS 114a of the user may be reconfigured by the PDS 114a based on the personal data access control information of the application 106a for enabling the PDS 114a to operate to exchange personal data of the user 109a between PDS 114a and the application 106a based on the registered personal data access control information of the application 106a (e.g. set of data exchange rules and permissions required by the application 106a for providing an application service to the user). This may include the API 120a associated with the PDS 114a to be configured for defining an application namespace 122a designated to the application 106a in the PDS 114a of the user 109a. The application namespace 122a may be used for storing and/or exchanging personal data of the user 109a in accordance with the personal data access control information (e.g. set of data exchange rules and permissions of the application 106a).

Each PDS 114a of the plurality of PDSs 114a-114l is associated with one user 109a of the plurality of users 109a-109l. That is, each of the users 109a-109l has a corresponding one of the plurality of PDSs 114a-114l. Each PDS 114a includes a server component 116a (e.g. a web server), a database component 118 and an API 120a including endpoints (not shown) associated with those applications 106a-106l that are providing one or more application service(s) to the user 109a of the PDS 114a. The server component 116a may be configured to connect via API 120a with the personal data management component 112 of the PDM platform 102 and receive one or more personal data access control information associated with the corresponding applications 106a-106n that the user 109a of PDS 114a has authorised to store and/or access the personal data of PDS 114a. Each API 120a associated with an application 106a has been configured to operate on and/or exchange personal data of the user 109a using a set of rules and permissions generated based on a set of data access rules specified by the application 106a and approved by the user 109a and/or the PDS 114a. Each of the APIs 120a-120n is associated with one of the applications 106a-106n and has been configured to exchange personal data of the user 109a stored by database component 118 in the PDS 114a in a controlled manner using its corresponding set of rules and permissions for access to the personal data of the user that has been agreed upon between the user 109a and the application 120a.

The database component 118 is configured to store and provide access to personal data of the user 109a. The database component 118a may include, by way of example only, a database unit or system for controlling, searching and providing access to personal data of the user 109a, a file storage system for storing the personal data of the user 109a, and/or data computational unit for processing personal data of the user 109a. The database unit or system of the database component 118a includes one or more application namespaces 122a-122n associated with each of the one or more applications 106a-106n that the user 109a of the PDS 114a uses. Each API 120a is associated with one application 106a and may be linked to a corresponding application namespace 122a for enabling the application 106a to store and/or access (e.g. reading and/or writing) only those portions of personal user data of the user 109a that the user 109a has given the corresponding application 106a permission to access, store and/or use. The personal data that may be stored to and accessed from the application namespace 122a may be generated by the application 106a and/or already stored in or under the application namespace 122a or provided by the user 109a during operation of the application 106a. Each API 120a-120n may be further adapted and/or configured to be linked to one or more other application namespace(s) 122a-122n that the user 109a has given permission to the corresponding application 106a to access. Thus, an application 106a may be able to access personal data of the user 109a from one or more of the other application namespace(s) 122a-122n. In other embodiments, each API 120a is associated with one or more applications 106a-106n and may be linked to corresponding application namespaces 122a-122n for enabling the applications 106a-106n to store and/or access (e.g. reading and/or writing) only those portions of personal user data of the user 109a that the user 109a has given the corresponding application permission to access, store and/or use. As above, the personal data that may be stored to and accessed from the application namespace 122a may be generated by the application 106a and/or already stored in or under the application namespace 122a or provided by the user 109a during operation of the application 106a. In such other embodiments, API 120a may be further adapted and/or configured to be linked to one or more other application namespace(s) 122a-122n that the user 109a has given permission to the corresponding application 106a to access. Thus, as above, an application 106a may be able to access personal data of the user 109a from one or more of the other application namespace(s) 122a-122n.

Figure 1B:
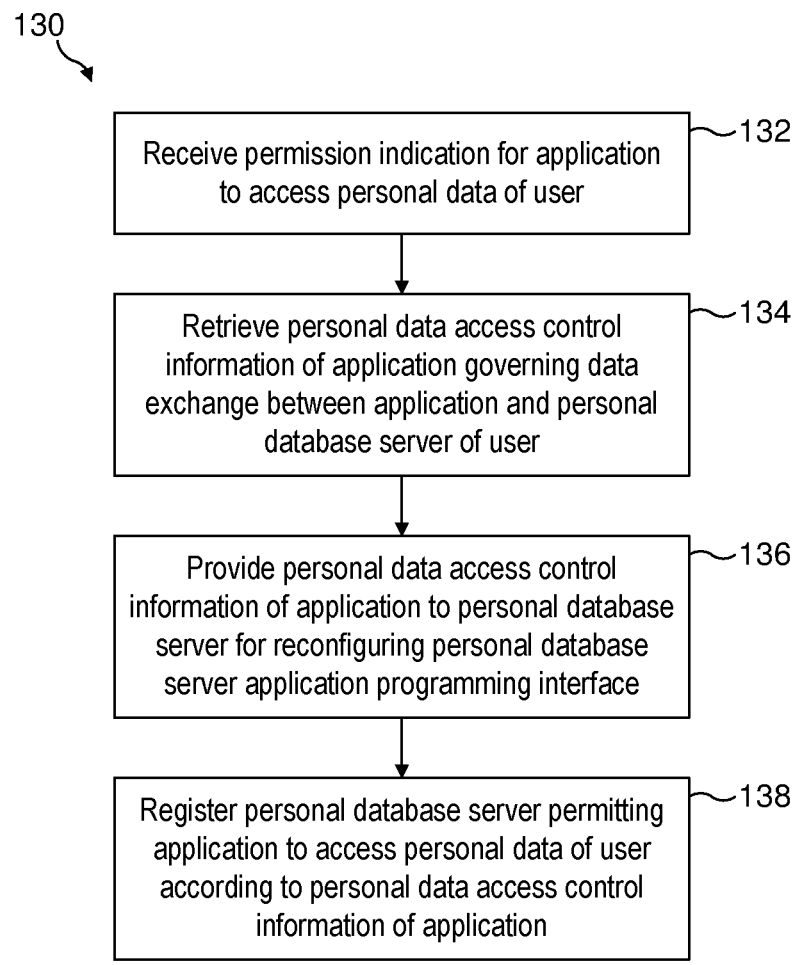
FIG. 1b is a flow diagram illustrating an example application authorisation process performed by a personal data management component of the PDM platform of FIG. 1a according to some embodiments of the invention.

FIG. 1b is a flow diagram illustrating an application authorisation process 130 performed by the personal data management component (PDMC) 112 of the PDM platform 102 of FIG. 1a. The authorisation process 130 may include one or more of the following steps of: In step 132, receiving, from the PDS of a user, an indication of the user providing an application permission to access personal data of the user. In step 134, retrieving personal data access control (PDAC) information associated with the application that (e.g. a set of data exchange rules, instructions and/or permissions) govern the exchange of personal data of the user between the user database and the application. In step 136, providing the retrieved PDAC information associated with the application to the PDS 114a for enabling/reconfiguring an application programming interface (API) 120a of the PDS 114a to provide access to the application based on the retrieved personal data access control information (e.g. set of data exchange rules, instructions and/or permissions associated with data exchange with the application). In step 138, registering the PDS 114a as permitting the application to access personal data of the user according to the PDAC information associated with the application.

Figure 1C:
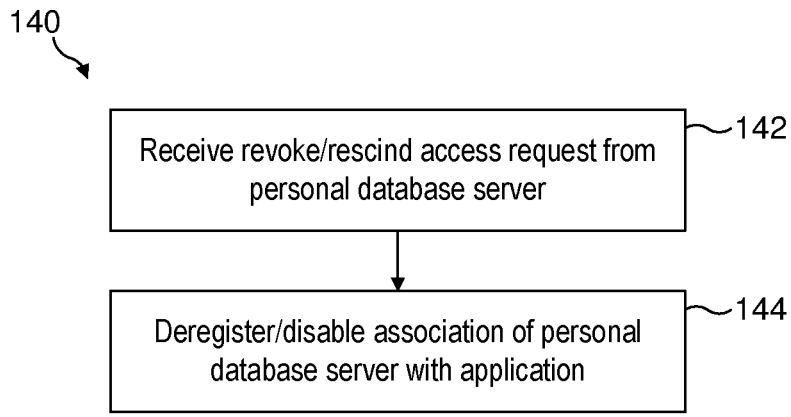
FIG. 1c is a flow diagram illustrating an example application access revocation process performed by the personal data management component of the PDM platform of FIG. 1a according to some embodiments of the invention.

FIG. 1c is a flow diagram illustrating a revoke/rescind access process 140 performed by the PDMC 112, for example, upon the initiation by PDS 114a of the PDM platform 102 of FIG. 1a. The revoke/rescind access process 140 may include one or more of the following steps of: In step 142, receiving a revoke/rescind access request from a PDS of a user for revoking or rescind access to personal data of the PDS of the user by an application. In step 144, deregistering the association of the PDS of the user with the application and/or notifying the PDM platform of application disabling event; step 144 may include specifically notifying the PDM component of application disabling event. The PDS of the user is configured to disable/reconfigure the data representative of the API endpoint associated with the revoked/rescinded application whilst retaining the personal data of the user stored by the application in the PDS.

Figure 1D:
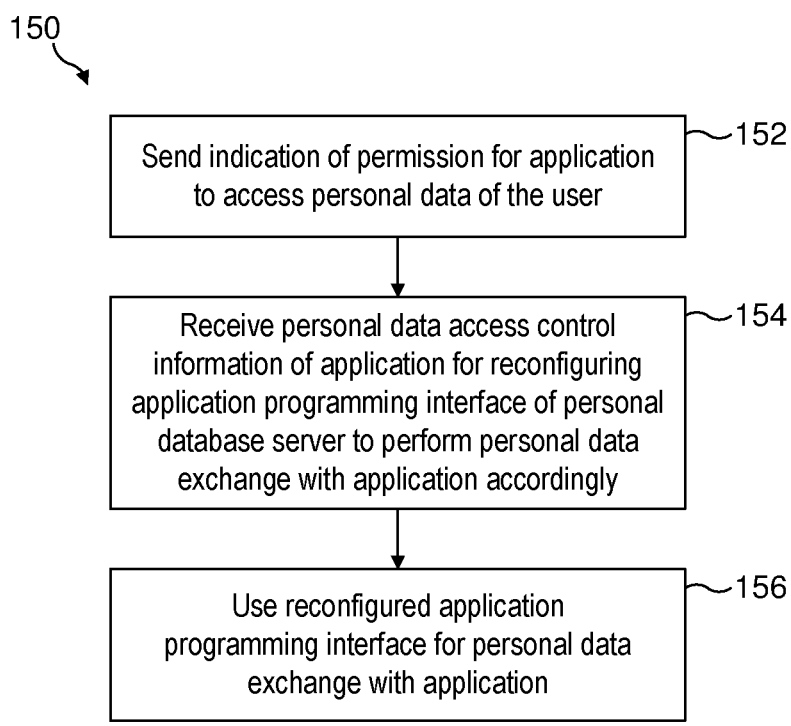
FIG. 1d is a flow diagram illustrating an example application authorisation process performed by a personal database server of the PDM platform of FIG. 1a according to some embodiments of the invention.

FIG. 1d is a flow diagram illustrating an example application authorisation process 150 performed by the PDS 114a of the PDM platform 102 of FIG. 1a. The application authorisation process 150 may include one or more of the following steps of: In step 152, sending, to the PDMC 112 of the PDM platform 102, an indication of the user providing an application permission to access personal data of the user from the PDS 114a. In step 154, receiving, from the PDMC 112, data representative of the PDAC information associated with the application for reconfiguring the API 120a of the PDS 114a based on the received PDAC information governing the exchange of personal data of the user between the user database 118a of the PDS 114a and the application (e.g. a set of data exchange rules, instructions and/or permissions associated with access/storage of personal data of the user in the PDS during operation of the application). In step 156, using data representative of the reconfigured API for exchanging personal data of the user with the application based on the PDAC information of the application.

The user 109a of the PDS 114a may revoke/rescind access to the application by sending a revoke/rescind access request to the PDS 114a for revoking access by an application to the PDS 114a of the user. The PDS 114a also sends a notification to the PDM component informing the PDM component of the revocation/rescind event associated with the application for logging purposes, where the PDMC 112 deregisters or logs the PDS rescinding personal data access to the application. The PDS 114a may then disable/reconfigure the endpoints/components of the API associated with providing the revoked application personal data access so that the application cannot access the PDS 114a whilst still retaining the personal data of the user stored in the PDS.

Alternatively or additionally, access by the application may be revoked/rescinded by the PDMC 112 and/or by the PDMC 112 receiving a revocation/rescind notification from an application developer and/or platform manager via the PDM platform 102. The PDMC 112 may initiate a revoke/rescind action based on discovering for some reason (e.g. user complaints, PDAC information Audit and the like) that an application does not comply with the PDAC information of the application registered in the PDMC 112 when the application was approved and satisfied the data protection requirements of the PDM platform 102. Alternatively or additionally, an application developer may withdraw an application and/or replace the application with an update such that the updated PDAC information of the updated application is different to the registered PDAC information of the registered application. Thus, the application will need to be revoked/rescinded. The application may request to be permitted to access the PDS of a user and go through the application authorisation process(es) 130 and/or 150 again before gaining access to the PDS of a user. Thus, when access by the application is revoked/rescinded by the PDMC 112 and/or by the PDMC 112 receiving a revocation/rescind notification from an application developer via the PDM platform 102, the PDMC 112 deregisters or logs the rescinding of personal data access to the application 106a for all PDSs 114a-114l using the application 106a. The PDMC 112, may then notify each of the PDSs 114a-114l that the application 106a has been revoked/rescinded, where each PDS 114a may then disable/reconfigure the endpoints/components of the API of the PDS 114a associated with providing the revoked application personal data access so that the application cannot access the PDS 114*a*. Each PDS 114*a* may be configured to retain the personal data of the user stored in the PDS.

Alternatively or additionally, the PDMC 112 may not necessarily notify each of the PDSs 114*a*-114*l* that the application 106*a* has been revoked/rescinded, as this may instead be discovered by the PDSs 114*a*-114*l* using the application 106*a* when the application 106*a* requests access. During a data access by an application, each PDS 114*a*, on receipt of a PDS access request from an application 106*a* for access to personal data of the PDS 114*a*, requests the PDMC to confirm whether the request from the application 106*a* is valid or not. The PDMC 112 would then send a response (or revocation response) to the PDS 114*a* that the application 106*a* has been rescinded/revoked/disabled. On receipt of this response, the PDS 114*a* may then disable/reconfigure the endpoints/components of the API of the PDS 114*a* associated with providing the revoked application 106*a* personal data access so that the application 106*a* cannot access the PDS 114*a*. Each PDS 114*a* may be configured to retain the personal data of the user stored in the PDS. The application 106*a* or an updated application may request to be permitted to access the PDS of a user by going through the application authorisation process(es) 130 and/or 150 again before gaining access to the PDS of a user.

Alternatively or additionally, access by the application may be revoked/rescinded on expiry of a timer and/or time period agreed during the application authorisation process 130 or 150 between the user and the application. The PDMC 112 may monitor the timer, and/or provide a time value to the PDS 114*a* of the user 109*a*, which may calculate when the expiry of the access by the application 106*a* to the PDS 114*a* occurs. Once the expiry of the timer and/or time period for accessing the PDS 114*a* occurs, the PDS 114*a* may revoke/rescind access to the application by sending a revoke/rescind access request or notification to the PDMC 112 that informs the PDMC 112 of the revocation/rescind event associated with the application for logging purposes. The PDMC 112 deregisters or logs the PDS 114*a* rescinding personal data access to the application 106*a*. The PDS 114*a* may then disable/reconfigure the endpoints/components of the API of the PDS 114*a* associated with providing the revoked application personal data access so that the application cannot access the PDS 114*a*. The PDS 114*a* may be configured to retain the personal data of the user stored in the PDS. The application 106*a* may request to be permitted to access the PDS 114*a* of a user for another time period or indefinitely and the like by going through the application authorisation process(es) 130 and/or 150 again before gaining access to the PDS of a user.

Figure 1E:
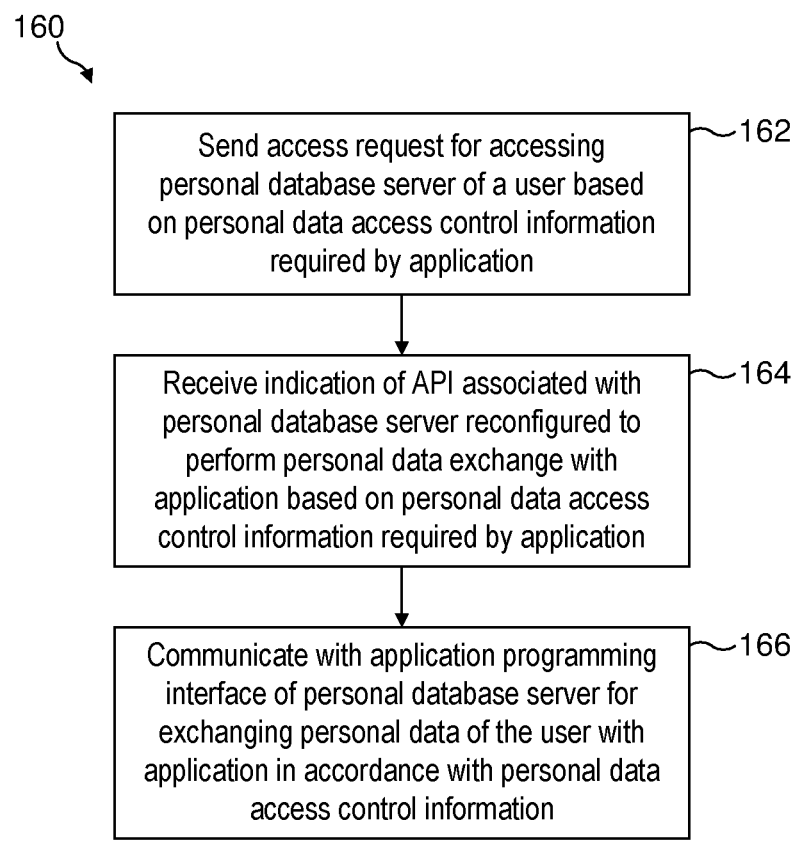
FIG. 1e is a flow diagram illustrating an example application authorisation and access protocol performed by an application communicating with the PDM platform of FIG. 1a according to some embodiments of the invention.

FIG. 1*e* is a flow diagram illustrating a data debit protocol process 160 performed by an application 106*n* of the PDM system 100 of FIG. 1*a*. The application is configured for providing an application service in relation to one or more of the user(s). The data debit protocol process 160 may include one or more of the following steps of: In step 162, sending an access request to the personal data management component for accessing a PDS of a user based on personal data access control information (e.g. a set of personal data access rules or permissions) specified by the application developer. In step 164, receiving an indication of an application programming interface (API) endpoint of the PDS of the user associated with the application, the API endpoint associated with the application configured for operating according to the personal data access control information required by the application that (e.g. the set of data exchange rules, instructions and/or permissions) govern the exchange of personal data of the user between the PDS of the user and the application. In step 166, communicating with the API endpoint of the PDS of the user associated with the application for exchanging/storing personal data of the user between the PDS and the application.

Figure 1F:
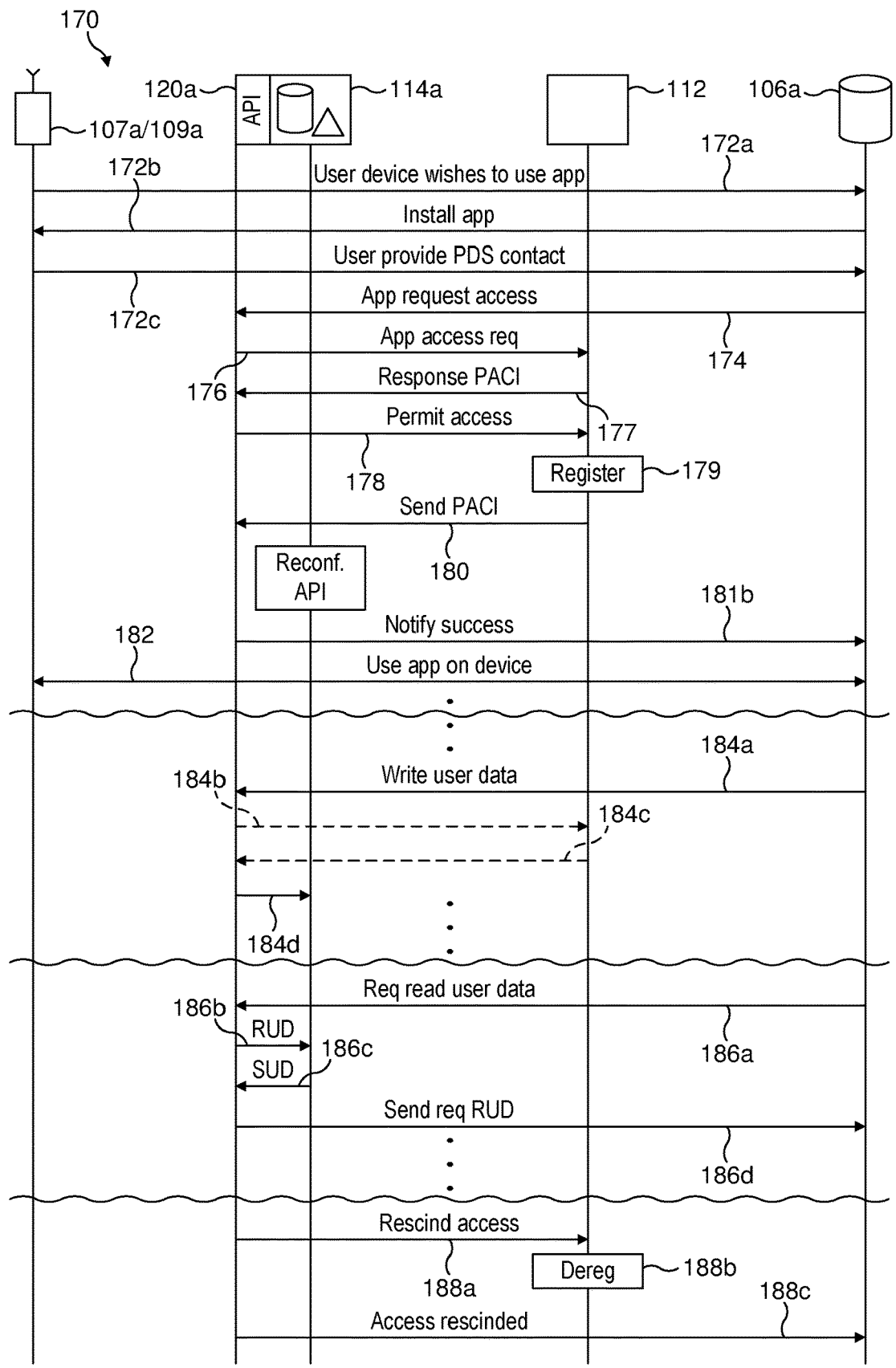
FIG. 1f is a signal flow diagram illustrating another example application authorisation and access protocol performed by the PDM system of FIG. 1a according to some embodiments of the invention.

FIG. 1*f* is a signal flow diagram illustrating an application authorisation and data access process(es) 170 performed by the personal data management component 112 of the PDM platform 102 of FIG. 1*a*. In this example, the application authorisation and data access process(es) 170 is performed by the PDMC 112 when a user 109*a* may wish to use, without limitation, for example an application 106*a* on their user device 107*a*. Alternatively or additionally, the application 106*a* may be operated on a cloud platform in which the user uses the application 106*a* via an application client 106*a* on their device and the like. The user 109*a* has a PDS 114*a* onto which is stored most, if not all, the personal data of the user 109*a* that the user 109*a* may have accumulated/stored so far in their digital life. The PDMC 112 is configured to, if the PDS 114*a* of the user indicates the application is permitted to access personal data of the PDS 114*a* according to the personal data access control information of the application 106*a*, send the personal data access control information of the application to enable the PDS 114*a* to reconfigure the API 120*a* (e.g. configuring and/or creating an endpoint in the API 120*a* associated with the application 106*a* based on the personal data access control information) for use in securely exchanging/storing only that personal data stored in the PDS 114*a* of the user 109*a* that the user 109*a* has approved can be exchanged/stored with or by the application 106*a*. The data debit protocol 130 may be performed each time a user of the plurality of users 109*a*-109*l* wishes to approve and/or authorise, without limitation, for example an application of the plurality of applications 106*a*-106*n* access and/or store to personal data of the user from their PDS. The application authorisation and data access process(es) 170 may include one or more of the following steps of:

In step 172*a*, a user 109*a* with user device 107*a* may communicate with, without limitation, for example the application, application provider, an application dashboard, and/or application store with the wish or intention to use an application 109*a*. For example, the user 109*a* of user device 107*a* may wish to use an application 106*a* for providing an application service to the user 109*a*. This may include, without limitation, for example, in step 172*b* downloading/installing the application 106*a* to the user device 107*a* or registering the user 109*a* of the user device 107*a* to an application service of an application provided on a server, one or more servers, and/or cloud computing platform and the like. In step 172*b*, the user during installation of the application may provide the application 106*a* with the PDS contact information of the PDS 114*a* of the user (e.g. user name, PDS name), which may include a unique identifier identifying the PDS 114*a* of the user and enable the application 106*a* or the application client of the application 106*a* to request access to personal data of the user from the PDS 114*a*.

In step 174, as the application 106*a* may need to use and/or generate personal data of the user 109*a* during execution of the application 106*a* and/or the application client associated with the application 106*a*, which is stored on PDS 114*a*, the application 109*a* sends a personal data access request to the API 120*a* of the PDS 114*a* based on using the PDS identifier/user name or determining the address/endpoint of the PDS 114*a* based on the PDS identifier/user name received from the user device 107*a*/109*a*.

The personal data access request from the application 106a is configured for requesting access to the PDS 114a of the user 109a based on personal data access control information (e.g. a set of data access rules) specified and used by the application 106a for handling personal data of the user 109a from the PDS 114a of the user 109a. Essentially, an application only needs to contact the PDS 114a, and in order for the user 109a to be able to grant access to the personal data, the PDS 114a will transparently contact the PDM component 112 to load data representative of data handling rules (e.g. PDAC information) during the process. An example of the user granting access is provided in the following steps. The application may contact PDM platform 102 directly during the process for additional services, e.g. PDS registration, server discovery, etc.

It is noted, in this case, the application 106a and the personal data access control information required by the application 106a has been registered with the PDMC 112 of the PDM platform 102. That is, the application developer may have submitted the application 106a to the PDMC 112 for analysis of the personal data access control information required by the application, which may be analysed and approved by a data governance process/procedure based on various data protection criteria of the governance process/procedure. The application, if approved, is then registered with the PDMC 112 as an application that is approved for use and meets the data protection criteria of the PDM platform 102. The personal data access control information describes, without limitation, for example a set of data access rules specified and used by the application for handling personal data of the user during operation of the application or application client. The personal data access control information may include read data rules, write data rules, permissions for accessing data and the like, rules for setting up namespaces for the application, rules for reading/writing to namespaces of other applications with permission to access the PDS 114a of the user 109a and the like. For example, an application with the name "myapplication" may define personal data access control information based on, for example, pseudocode or a rule/instruction syntax based on the following:

"Read myapplication namespace data
Write myapplication namespace data"

This personal data access control information may be interpreted by the PDMC 112 and/or PDS 114a to mean that the application, "myapplication", requires read access to personal data in the myapplication namespace of the PDS 114a and also requires write access to the myapplication namespace of the PDS 114a. Initially, the PDS 114a will set up a myapplication namespace for use by the application, "myapplication", for writing and/or reading data thereto/therefrom. For the avoidance of doubt, the application is not limited to the use of a singular namespace format nor to the use of a single namespace.

In another example, an application with the name "myapplication" may define personal data access control information based on, for example, pseudocode or a rule/instruction syntax based on the following:

"Write myapplication namespace data
Manage myapplication namespace files"

This personal data access control information may be interpreted by the PDMC 112 and/or PDS 114a to mean that the application, "myapplication", requires write access to the myapplication namespace of the PDS 114a and is permitted to manage the files/data stored in the myapplication namespace. Initially, the PDS 114a will set up a myapplication namespace for use by the application, "myapplication", for writing and/or reading data thereto/therefrom.

In another example, an application with the name "myapplication" may define personal data access control information based on, for example, pseudocode or a rule/instruction syntax based on the following:

"Read myapplication namespace data
Manage otherapplication status"

This personal data access control information may be interpreted by the PDMC 112 and/or PDS 114a to mean that the application, "myapplication", requires read access to the myapplication namespace of the PDS 114a and is permitted to manage the status of a namespace of another application, "otherapplication". In some embodiments, the application "myapplication" is additionally or alternatively permitted to manage the permissions of another application. Initially, the PDS 114a will set up a myapplication namespace for use by the application, "myapplication", for writing and/or reading data thereto/therefrom.

In a further example, an application with the name "myapplication" may define personal data access control information based on, for example, pseudocode or a rule/instruction syntax based on the following:

"Read myapplication namespace data
Write myapplication namespace data
Read myapplication data-debit data as specified
  facebook.profile.picture
  facebook.profile.surname
  facebook.profile.age
  facebook.messages.text
  . . ."

This personal data access control information may be interpreted by the PDMC 112 and/or PDS 114a to mean that the application, "myapplication", requires read access to the myapplication namespace of the PDS 114a, write access to the myapplication namespace of the PDS 114a, and is permitted to access "data debit data" data from another application namespace (e.g. facebook namespace) of the facebook application such as, without limitation, for example, personal data of the user stored in the facebook namespace including facebook.profile.picture, facebook.profile.surname, facebook.profile.age, facebook.messages.text and the like. Initially, the PDS 114a will set up a myapplication namespace for use by the application, "myapplication", for writing and/or reading data thereto/therefrom. The PDS 114a will also setup myapplication data debit for reading, mapping, and filtering other data specified in the protocol.

In a further example, an application with the name "myapplication" may define personal data access control information based on, for example, pseudocode or a rule/instruction syntax based on the following:

"(data debit only):
Read myapplication data-debit data as specified
  facebook.messages.text
  twitter.messages.text
  instagram.messages.text
  . . ."

This personal data access control information may be interpreted by the PDMC 112 and/or PDS 114a to mean that the application, "myapplication", requires access (e.g. data debit access) to the Facebook (RTM), Twitter (RTM), Instagram (RTM) application namespaces of the PDS 114a, is permitted to access "data debit data" personal data, i.e. the collection of personal data, of the user from one or more applications, without limitation, for example, Facebook (RTM) application, Twitter (RTM) application, Instagram (RTM) application and/or any other application or application namespace in the PDS 114*a* of the user. In this case, the personal data the application, "myapplication", requires access to is, without limitation, for example personal data of the user stored in the facebook namespace including facebook.messages.text, personal data of the user stored in the twitter namespace including twitter messages.text, personal data of the user stored in the instagram namespace including instagram.messages.text and/or any other personal data of the user stored in one or more other namespaces and the like. Initially, the PDS 114*a* will setup myapplication data debit for reading, mapping, and filtering other data specified in the protocol.

Although several examples of personal data access control information have been provided in a particular format and for several types of applications, this is by way of example only and the invention is not so limited, it is to be appreciated by the skilled person that the personal access data control information may include one or more defined or specific rules, instructions and/or permissions that enable the application or an application to access and store personal data of the user in the PDS 114*a* of the user 109*a* and the like as the application demands. This may include, without limitation for example, the application accessing and/or storing personal data in the namespace of the application in the PDS 114*a*, and/or the application having cross-namespace access such as accessing and/or storing personal data of the user associated with one or more other namespaces of one or more other corresponding applications and the like.

In steps 176 and 177, the PDS 114*a* via API 120*a* transparently verifies data access rules with the PDMC 112 component 112 and displays to the user 109*a* data representative of the personal data access control information of the application to illustrate or indicate to the user the permissions and personal data that the application 106*a* intends to access and/or store with the PDS 114*a* of the user. This may include an indication of the application 106*a* requesting access to personal data of the user 109*a* based on the corresponding set of data access rules. In step 176, the API 120*a* sends an application access request to the PDMC 112, the application access request may include data representative of the application identifier. On receipt of the application access request, the PDMC 112 looks at the registry used for registering approved applications based on the received application identifier. If the application is determined to be registered and approved for use with PDM platform 102, then in step 177, the PDMC 112 sends the personal data access control information of the application to the API 120*a* of the PDS 114*a*. This means that the personal data access control information required by the application 106*a* meets the personal data protection criteria of the governance process/procedure of the PDM platform 102. Data representative of the received personal data access control information of the application 106*a* may be displayed to the user, e.g. via a PDS dashboard or other graphical user interface/browser or other means. This allows the user 109*a* to determine whether or not to approve and permit the application 109*a* to access personal data of the user from PDS 114*a* in accordance with the personal data access control information. If the user 109*a* permits the application 106*a* can access the PDS 114*a* of the user in accordance with the personal data access control information, in step 178, the API 120*a* of PDS 114*a* sends a permission response message or a permit access notification to the PDMC 112 indicating that the user 109*a* of PDS 114*a* permits the application 109*a* to access the PDS 114*a* of the user 109*a* in accordance with the provided personal data access control information of the application 109*a*. In some embodiments, PDS114*a* sends the permission response message or permit access notification to the PDMC 112 directly. In step 179, the PDMC 112 registers that the user 109*a* and/or the PDS 114*a* of the user 109*a* has permitted the application 109*a* to access the PDS 114*a* of the user 109*a* in accordance with the personal data access control information of the application.

In step 180, the personal data management component 112 generates and sends data representative of the personal data access control information of the application 109*a* to the API 120*a* of the PDS 114*a*. In step 181*a*, the PDS 114*a* reconfigures the API 120*a* to include, for example, an endpoint associated with the application 109*a* for controlling and/or governing the data exchange of personal data of the user between the application 109*a* and the PDS 114*a* based on the personal data access control information of the application 109*a*.

The API 120*a* of the PDS 114*a* is reconfigured based on the personal data access control information associated with the application 109*a*, which may be generated by the personal data management component 112. For example, the personal data management component 112 may initially generate a set of data exchange rules and permissions associated with the application 106*a* based on the personal data access control information and the PDS 114*a* of the user 109*a*, where this set of data exchange rules and permissions govern the exchange of personal data of the user 109*a* between the PDS 114*a* of the user 109*a* and the application 106*a* based on the personal data access control information required by the application 106*a* for handling personal data of the user 109*a*. The generation of the set of data exchange rules and permissions associated with the personal data access control information (e.g. data access rules and permissions) specified by the application 109*a* may have been performed previously and be stored and/or registered by the PDMC 112 for retrieval when the application 106*a* requests access to personal data of a user. The PDMC 112 may also register the personal data access control information and/or the generated set of data exchange rules and permissions associated with the application 109*a* are linked to the PDS 114*a* of the user 109*a*. The PDMC 112 sends data representative of the personal data access control information of the application (e.g. generated set of data exchange rules and permissions) to the PDS 114*a* for reconfiguring the API 120*a* to enable or allow the application 109*a* to access and store personal data of the user from PDS 114*a* based on the set of data exchange rules and permissions. The API 120*a* may be reconfigured to include an endpoint that is configured for using an application namespace 122*a* designated to the application 106*a* in the PDS 114*a* of the user 109*a* for exchanging, accessing and/or storing personal data of the user 109*a* in accordance with the set of data exchange rules and permissions (or personal data access control information of the application 106*a*).

In step 180, the PDMC 112 sends data representative of the personal data access control information of the application 109*a* to the PDS 114*a* for reconfiguring the API 120*a* to enable the application 109*a* to access the PDS 114*a* based on the personal data access control information. In step 181*a* the PDS 114*a*, uses the data representative of the personal data access control information to reconfigure the API 120*a* to allow the application 106*a* to access the personal data of the PDS 114*a* in accordance with the personal data access control information of the application 106*a*. For example, this may include defining/reconfiguring endpoints of the API 120a and/or defining access to namespaces required by the application 106a for use in accessing personal data of the PDS 114a of the user 109a in accordance with the personal data access control information of the application 106a. The PDS 114a of the user 109a may be configured to designate the application namespace 122a for use by the application 106a for exchanging personal data of the user 109a with the PDS 114a via the API 120a. This may also include providing the application 106a with access to personal data of the user 109a associated with one or more other namespaces of applications being used by the user 109a and that have access and/or storage of personal data with PDS 114a of the user 109a. In step 181b, the reconfigured API 120a of the PDS 114a may send a success notification or response to the application 106a or the application client of the application 106a indicating that access to the PDS 114a has been enabled for the application 106a in accordance with the personal data control information required by the application 106a.

In step 182, the user 109a may use the application 106a via user device 107a. When the application 106a requires personal data of the user 109a and/or generates personal data of the user 109a it may access the application namespace 120a designated to the application 106a in the PDS 114a of the user 109a. The skilled person will of course understand that the data flow depicted in step 182 encompasses many possibilities, including data flows directly connecting the user device 107a and the application namespace 120a, data flows directly connecting the application 106a and the application namespace 120a, and data flows directly connecting the application 106a and the user device 107a.

In step 184a, the application 106a may generate further personal data of the user 109a during execution of the application 106a on the device 107a and/or application platform and the like, and so the application 106a sends a write personal data message to the API 120a associated with the application 106a of the PDS 114a for writing the generated personal data of the user 109a to the application namespace 122a in the PDS 114a. Additionally or alternatively, the user 109a may send a write personal data message directly to the API 120a via the user device 107a. In step 184b, the API 120a associated with the application 106a sends and/or writes/stores the further personal data of the user 109a in the application namespace 122a of the PDS 114a.

In step 186a, the application 106a may need to access personal data of the user 109a stored in the application namespace 122a of the PDS 114a of the user 109a during execution of the application 106a on the device 107a and/or application platform and the like, so the application 106a sends a read personal data message to the API 120a associated with the application 106a of the PDS 114a for reading the required personal data of the user 109a from the application namespace 122a in the PDS 114a. Additionally or alternatively, the user 109a may send a read personal data message directly to the API 120a via the user device 107a. In steps 186b and 186c, the API 120a associated with the application 106a retrieves and/or reads the required personal data of the user 109a from the application namespace 122a of the PDS 114a. In step 186d, the API 120a associated with the application 106a sends the required personal data of the user 109a read from the application namespace 122a of the PDS 114a to the application 106a for processing and use of the required personal data of the user 109a. The application 106a may thus perform steps 184a-186d in relation to reading/writing personal data of the user 109a in application namespace 122a.

In step 188a, should the user 109a wish to stop using the application 106a and/or revoke/rescind the data access rules/permissions specified by the application 106a, the user device 107a of the user 109a may instruct or initiate (e.g. via a user interface of the PDS 114a) the API 120a of the PDS 114a to process the revoke/rescind access request internally and to notify the personal data management component 112 for revoking access by the application 106a to the PDS 114a of the user 109a. Additionally or alternatively, the PDS 114a may directly process the revoke/rescind access request and notify the personal data management component 112 for revoking access by the application 106a to the PDS 114a of the user 109a. The revoke/rescind access request may be processed by the PDS 114a by reconfiguring the API 120a or the associated endpoint of the API 120a corresponding to the application 106a to disable access by the application 106a to the PDS 114a of the user 109a. Alternatively or additionally, the PDS 114a of the user 109a may be configured to disable the endpoint of the API 120a associated with the revoked application 109a when the user 109a indicates that they wish to stop using the application 106a, i.e. in step 188a, whilst retaining the personal data of the user 109a stored under the application namespace 122a of the revoked application 106a in the PDS 114a.

In step 188a, the API 120a of the PDS 114a notifies the PDMC 112 of the revocation/rescinding of access to the application 106a, or the PDS 114a directly notifies the PDMC 112. In step 188b, the PDMC 112, on receiving the revoke access notification message in relation to application 106a from PDS 114a, removes the registration of the set of data exchange rules and permissions associated with the revoked application and linked to the PDS 114a of the user 109a.

In step 188c, the API 120a of the PDS 114a may send the application 106a or the application client of the application 106a a notification that access to personal data of the PDS 114a has been rescinded/revoked, or the PDS 114a may directly send the application 106a or the application client of the application 106a the notification. The application 106a may then be configured to stop requesting access to the PDS 114a of the user 109a until such time that it is granted access again. For example, the PDS 114a may be configured to send the application 106a an access revoked message in relation to the user 109a, where the application 106a may then stop using API 120a associated with the application 106a and/or may uninstall itself from the user device 107a of the user 109a or remove the user 109a from a subscription associated with the application 106a and the like.

The application authorisation and data access process(es) 170 may be further modified to enable an application 106a to access personal data of the user 109a from another application namespace 122b of the application namespaces 122a-122n in the PDS 114a that has been designated to another application 106b (this may be referred to as a Data Debit process). For example, the personal data management component 112 may receive a namespace access request from an application 109a for accessing personal user data associated with another application namespace 122b within a PDS 114a of a user 109a from the plurality of users 109a-109l based on a set of data access rules used by the application 106a for handling personal data of the user. The personal data management component 112 may send a permission request to the PDS 114a of the user 109a with an indication of the application 106a requesting access to user personal data associated with the other application namespace 122b and the corresponding set of data access rules of the application 106a. The request for access to the other application namespace and the set of data access rules of the application 106a may be displayed to the user 109a and/or sent for processing by the PDS 114a for approving or disapproving the request. The PDS 114a of the user 109a may send a notification message indicating whether or not the user and/or the PDS 114a has approved the application 106a to access the other application namespace 122b of the PDS 114a based on the set of data access rules of the application 106a. The personal data management component 112, in response to the permission response message of the user 109a indicating the application 106a is approved to access the PDS 114a of the user 109a may then generate a further set of data exchange rules and permissions associated with the application 106a and the PDS 114a of the user 109a. The further set of data exchange rules and permissions governing the exchange of personal data of the user 109a between the other application namespace 122b of the PDS 114a of the user 109a and the application 106a based on the set of data access rules used by the application 106a for handling personal data of the user 109a. The personal data management component 112 may register the further set of data exchange rules and permissions associated with the application 106a and the other application namespace 122b in the PDS 114a of the user 109a. The personal data management component 112 may adapt the API 120a associated with the application 106a based on the further set of data exchange rules and permissions. The API 120a associated with the application 106a is further configured for accessing personal data of the user 109a using the other application namespace 122b in the PDS 114a of the user 109a in accordance with the further set of data exchange rules and permissions. The personal data management component 112 may send data representative of the adapted API 120a associated with the application 106a to the PDS 114a of the user 109a.

The PDS 114a of the user 109a is configured to use the adapted API 120a for exchanging personal data of the user 109a between the PDS 114a and the application 106a. For example, on receiving, from the personal data management component 112, data representative of an adapted API 120a associated with the application 106a, where the adapted API is configured to enable the application 106a to access personal data of the user 109a from the other application namespace 122b based on a further set of data exchange rules and permissions governing the exchange of personal data of the user 109a between the other application namespace 122b of the PDS 114a and the application 109a. The PDS 114a is configured to modify the API response payload format 120a associated with the application 106a based on the received data representative of the adapted API associated with the application 106a. The API response payload format associated with the application 106a is further configured for accessing personal data of the user using the other application namespace 122b in the PDS 114a of the user 109a in accordance with the further set of data exchange rules and permissions. Thus, the PDS 114a and the application 106a may use the modified API response format associated with the application 106a for exchanging personal data of the user 109a with the application 106a using the application namespace 122a designated to the application 106a and the other application namespace 122b designated to the other application 106b.

In the event that the user 109a of the PDS 114a may not wish the application 106a to access one or more other application namespaces in the PDS 114a, then the PDS 114a may send, to the personal data management component 112, a revoke access namespace notification for revoking access by the application 106a to another application namespace 122b of the PDS 114a. The personal data management component 112 may remove the registration of the further set of data exchange rules and permissions associated with the application 106a accessing the other application namespace 122b of the PDS 114a of the user 109a.

The PDS 114a of the user 109a is configured to update the API response payload format 120a associated with the application 106a based on the reconfiguration. For example, the PDS 114a of the user 109a may receive, from the personal data management component 112, data representative of the reconfigured API response payload format associated with the application 106a, where the API 120a associated with the application 106a has been reconfigured to revoke access by the application 106a to the other application namespace 122b of the PDS 114a of the user 109a. The PDS 114a may be configured to update the API 120a associated with the application 109a based on the received data representative of the reconfigured API 120a.

Figure 1G:
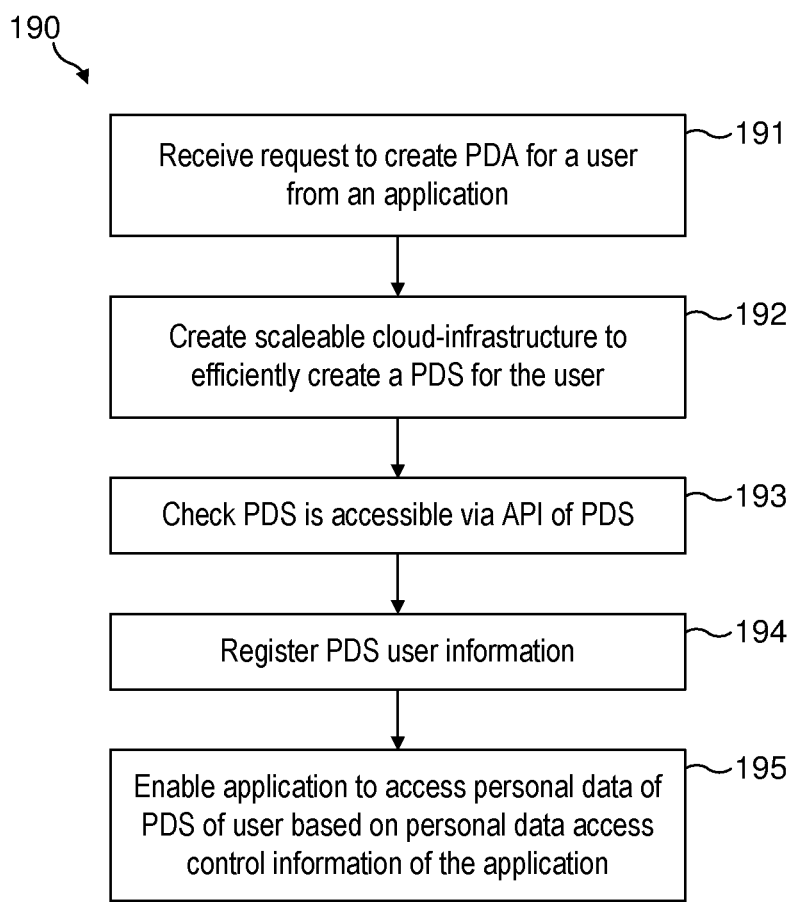
FIG. 1g is a flow diagram illustrating an example PDS provisioning process for use with the PDM platform of FIGS. 1a to 1f according to some embodiments of the invention.

FIG. 1g is a flow diagram illustrating an example PDS provisioning process 190 for use with PDM platform 102 according to some embodiments of the invention. FIGS. 1b to 1f assumed that a PDS 114a of a user 109a exists and has been created. However, there are several ways in which a user may acquire a PDS or have a PDS assigned to them for storing and accessing their personal data, whilst at the same time enabling the user to permit one or more applications access to personal data of the PDS 114a of the user 109a as described with reference to FIGS. 1a to 1f. Typically, when a user 109a does not have a PDS 114a, an application 106a may be configured to initiate creation of a PDS 114a for the user 109a. Thus, the application 106a contacts the PDMC 112 and also redirects the user, e.g. via a browser, to interface with the PDMC 112 for creating a PDS 114a for the user with a unique PDS identifier. The application 106a may contact the PDMC 112 of the PDM platform 102 by calling an API in the PDMC 112. The provisioning process 190 of the PDMC 112 may be based on the following steps of: In step 191 receiving a request from an application 106a for creating a PDA/PDS 114a on behalf of the user 109a. As an option, receiving user data (e.g. user name) associated with the user 109a for generating a unique PDS identifier that is different to the PDS identifiers of the plurality of PDSs 114b-114l, each of the PDSs 114b-114l assigned to a corresponding user of a plurality of users 109b-109l. In step 192, instructing a scalable cloud-based infrastructure agent to efficiently create a PDS 114a for the user 109a based on the unique PDS identifier. The PDS including a database system 118a, a file system 122a-122n, a web server 116a, a computational system, and an application programming interface 120a. The application programming interface 120a coupled to (i.e. served by) the web server 116a, and the web server 116a coupled to the database system 118a, the file system 122a-122n and a computational system. The application programming interface 120a is accessible via a communication network based on the unique PDS identifier. Once the PDS 114a for the user 109a has been created, in step 193, checking that the PDS is accessible via the API 120a of the PDS 114a. In step 194, registering user information and/or unique PDS identifier in the PDMC 112. In step 195, enabling the application 106a to access the PDS 114a of the user 109a based on personal data access control information of the application 106a. The personal data access control information may include a set of rules, permissions and/or instructions specifying or governing how the application handles personal data of users. The PDAC information may include a template of what data or personal data of the user is allowed or required to be accessible to the application 106a. The PDMC 112 registers the template/PDAC information linked with the PDS 114a of the user 109a, which represents the users 109a agreement for allowing the application to access personal data of the user from PDS 114a in accordance with the template/PDAC information.

The user 109a becomes the owner of the PDS 114a as they control the access to/from the PDS 114a.

The provisioning and/or creation of a PDS 114a by a scalable cloud-based infrastructure agent may be based on the architecture of single tenant database and multi-tenant software. For example, the PDS may be configured to have one database per owner/user 109a ("single-tenant" database), which ensures the owner/user 109a has the legal right to license the content of the database. Each of the databases 118a to 118l have to be technically isolated from one another and decentralised to one owner/user 109a each (while still residing in the cloud) otherwise it will be legally impossible to license or contract the content within it. The need for access to the database 118a is through an API 120a, for example on a webserver 116, which reduces surface area of attack and results in higher levels of security as well as for ease of auditability in terms of access to the database 118a. The web server 116 in the PDS 114a of the user 109a (owner) is configured to be multi-tenant software within cloud-based infrastructure. The database system 118a may use many web servers when they enable access to their database 118a through the API 120a e.g. when the user 109a (e.g. owner) interacts with an application 106a, a request might go through a first web server and when they load data a minute later, that request might go through a second web server. Thus the web server 117a of a PDS 114a may be "transient" depending on load of the cloud-based infrastructure/architecture supporting the plurality of PDSs 114a-114l. This means, for a PDS 114a, the databases of the PDSs 114a-114l are isolated from one another and can have clear property rights but the web servers 116a-116l do not have to be. With multi-tenancy software, scaling has far fewer infrastructure/architecture implications because new database owners get access to the same basic software. Thus, the plurality of PDSs 114a-114l are formed using single-tenant databases and multi-tenant software for the web servers, which provides the advantage that the database of each PDS and also the architecture/structure of the plurality of PDSs 114a-114l is scalable to the number of applications each user allows access to the personal data of the user in the PDS of the user.

Figure 2A:
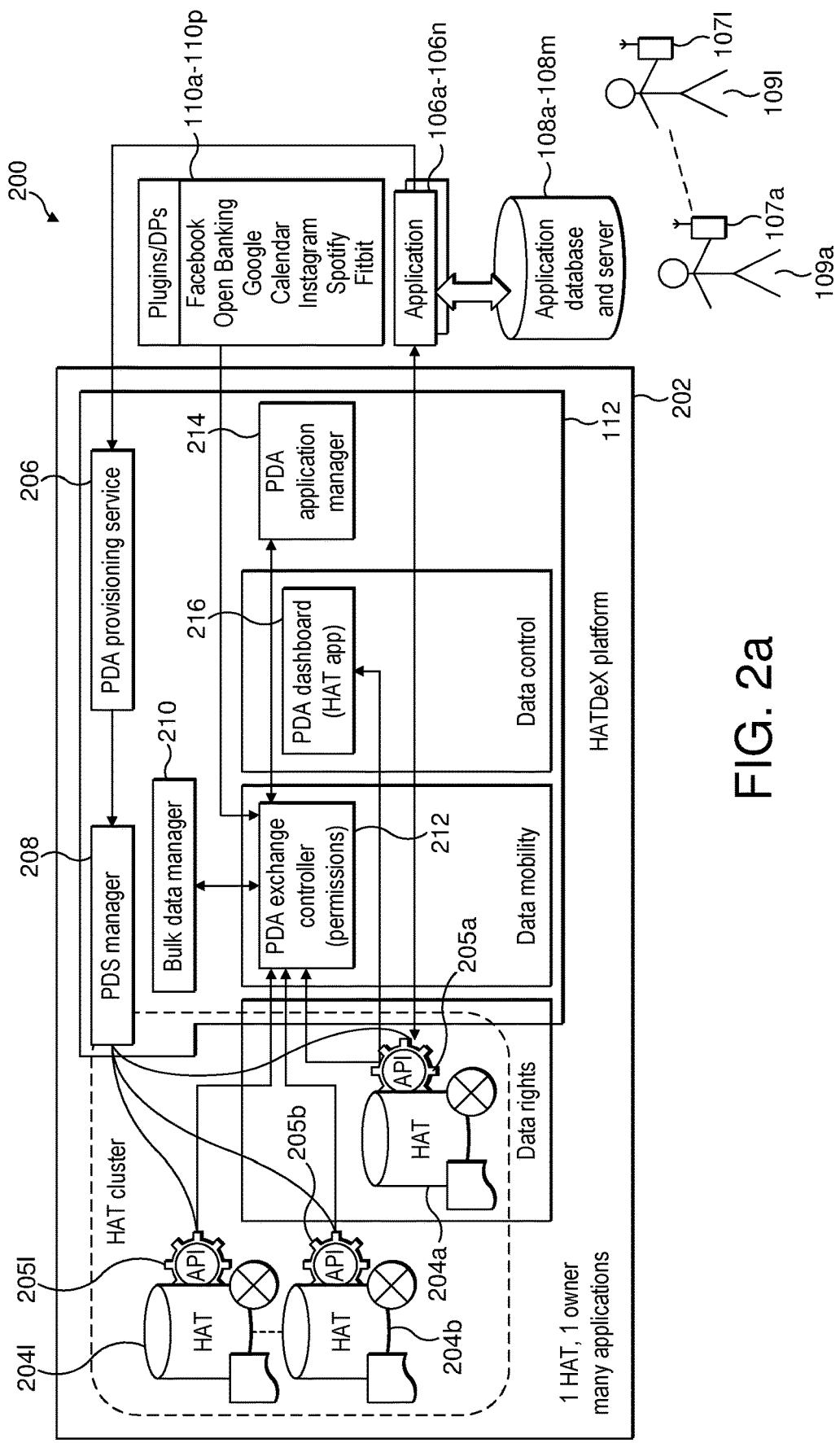
FIG. 2a is a schematic diagram illustrating another example PDM system and PDM platform according to some embodiments of the invention.

FIG. 2a is a schematic illustration of another example PDM system 200 and PDM platform 202 according to the invention. In this example, PDM system 100, PDM platform 102, personal data management component 112, and PDSs 114a-114b as described with reference to FIGS. 1a and 1b have been further modified based on Hub-of-All-Things (HAT) technologies and the like. For simplicity reference numerals of FIGS. 1a and 1b are used for the same or similar features and/or components. In this example, the PDM platform 202 is implemented as a HAT Data Exchange (HATDeX) platform that includes a personal data management component 112 and a plurality of PDSs 204a-204l. The personal data management component 112 includes a Personal Data Account (PDA) provisioning service module 206 (which is configured, in some embodiments, to further operate as a PDA provisioning and authentication service module), a PDS Manager module 208, a Bulk Data Manager 210, a PDA Exchange Controller 212, a PDA application Manager 214, and a PDS Dashboard 216.

Each of the PDS(s) 204a-204l is provided to one of the plurality of users 109a-109l. A PDS 204a of a user 109a is configured to enable the user to collect, store, process and use their personal data. In this example, each PDS 204a of the plurality of PDSs 204a-204l is implemented as a HAT Microserver, which is a cloud-based personal database server. The HATDeX platform 202 is configured to act as a third party that enables each user to collect, own and manage their personal data using a HAT Microserver and manage the exchange of their personal data with one or more applications 106a, application providers 108a, and/or application data providers or plugins 110a-110n and the like.

The HATDeX platform 202 is configured to provision each of the HAT Microserver(s) 204a-204l to an individual user of the plurality of users 109a-109l, where each HAT Microserver 204a of an individual user 109a is used to create a PDA for the corresponding user 109a. The PDA of an individual user 109a of the plurality of users 109a-109l is configured to enable the individual user 109a to, without limitation, for example collect, store, process and use their own personal data in the PDS or HAT Microserver 204a implementation of a PDS. In some embodiments, each HAT Microserver 204a of an individual user 109a implements the PDA of the individual user 109a. In this example, each of the HAT Microservers 204a-204l are implementing based on cloud-based server technologies. Each HAT Microserver 204a includes a web server, database, file storage and/or computation unit(s).

The PDA of each individual user 109a enables the user 109a to permit one or more application(s) 106a to access their personal data via a PDS (HAT Microserver) allocated to the user. For example, the user 109a may, without limitation, for example contract and license their data in real-time and on-demand to website(s), application(s), application provider(s) and/or plugins and the like. The HAT Microserver 204a of an individual user 109a that is hosting the PDA for the user 109a is configured via the HATDeX platform 202 and the personal data management component 112 to provide these websites, applications 106a-106n, application provider(s) 108a-108n, application data provider(s) and/or plugins 110a-110n permissions to read and write data into namespaces within the PDS hosted by the HAT Microserver 204a of the user 109a.

A user 109a may acquire a PDA with a PDS for collecting, storing and/or managing their personal data via an application 106a, website and/or other means in which the HATDeX platform 202 provisions and/or assigns a PDS (to a PDA), in this case, a HAT Microserver 204a to the user 109a for hosting the PDS of the user 109a. A PDA and hence PDS in the form of HAT Microserver 204a may be issued to a user 109a when the user 109a registers with an application and/or application service via, without limitation, for example their user device, a web service and/or cloud-based platform. This replaces the requirement for each of the plurality of application(s) 106a-106l, application provider(s) 108a-108m, application data providers, web servers/sites, data plug-ins and the like 110a-110p to each have a centralised user account for storing personal data of the user 109a and the necessary data regulatory and/or security headaches such user accounts entail. Instead, only one PDA for the user is required with a PDS controllable by the user for enabling application(s) to access and/or store personal data of the user in the PDS or HAT Microserver 204a of the user.

The HATDeX platform 202 is configured to ensure that each individual user of the plurality of users 109a-109l becomes a data controller and/or owner of their personal data, which substantially reduces the technological and also legal burden (e.g. data protection law and/or regulations) of application(s) 106a-106n, application provider(s) 108a-108m, and/or application data provider(s) 110a-110p being both data controllers and data processors of personal data of users. A data controller is someone, such as a user 109a, who determines the purpose for which personal data is to be processed and the means of processing (i.e. how the personal data is processed). A data processor is someone who processes personal data on behalf of the controller (i.e. following the controller's instructions). This is important under current legal data protection regulations such as, without limitation, for example the GDPR for the lawful storage and/or processing of personal data of a user.

Thus, the HATDeX platform 202 is configured to ensure each individual user of the plurality of users 109a-109l is assigned a separate HAT Microserver of the plurality of HAT Microservers 204a-204l for hosting a PDA for that individual user's personal data. The HATDeX platform is further configured via the PDA provisioning service module 206, a PDS Manager module 208, a Bulk Data Manager 210, a PDA Exchange Controller 212, a PDA application Manager 214, and a PDA Dashboard 216 and the PDS implemented by HAT Microservers 204a-204l to enable each user 109a of the plurality of users 109a-109l to become a data controller and/or processor of their own personal data. The personal data of each user is stored/collected in a PDS that is hosted by a HAT Microservers assigned to said each user.

For example, the HATDeX system 200 and platform 202 may be configured to allow corporations and/or organisations to store personal data that belongs to their users, customers and/or employees and the like whilst giving control back to their users, customers and/or employees while also enabling their users, customers and/or employees to reuse and reshare across other applications, application providers and/or application data providers and the like. Furthermore, the HATDeX system 200 is scalable for the largest applications and contains built-in robust security and vetting process(es) via the unique combination of PDA provisioning service module 206, a PDS Manager module 208, a Bulk Data Manager 210, a PDA Exchange Controller 212, a PDA application Manager 214, and a PDS Dashboard 216 and the PDS HAT Microservers 204a-204l.

The PDA Exchange controller 212 is also configured to log or register all activities in the HATDeX system 200, responds to HAT Microservers 204a-204n requests to verify and/or create the so-called data debits, authorises applications 106a-106n compliant with the HATDeX platform 202 and associated sets of rules, instructions and permissions such as, without limitation, for example HAT Microserver Instructions (HMI) as implementation of PDSI, holds data transactions, verifies exchanges of personal data and quickly, accurately and securely sends and receives personal data between parties. The PDA Exchange controller 212 also logs or registers the data contracts between PDS/HAT owners and PDS/HAT-enabled applications.

The PDA Provisioning Service 206 serves as a main gateway into the HATDeX platform 202. The main functions it serves includes, without limitation, for example providing visual interface and API level support for frictionless issuing of PDAs and linked to corresponding PDSs; create a smooth application developer experience by abstracting the complexities of having to deal with a distributed network of PDAs. Application developers can build API interactions as if their applications were operating with a centralised back-end.

The PDA Provisioning Service 206 couples with the PDS Manager 208, which, without limitation, for example is configured as a turn-key solution for running the HAT Microservers 204a-204n and PDAs hosted thereon at scale on public cloud infrastructure. PDS Manager 208 is configured to take the role of a credential broker that monitors underlying resources and manages underlying infrastructure, with an administrative dashboard to monitor platform health of the HATDeX platform 202. The PDS Manager 208 is also configured to be tasked with interacting with HAT Microservers 204a-204n for fast setup and teardown in order to facilitate speedy provisioning of PDS HAT Microservers 204a-204n. Furthermore, the PDS Manager 208 provisioning of HAT Microservers 204a-204n with PDAs enables the running of PDAs in any geographic region supported by a cloud-based service such as, without limitation for example, AWS as a turn-key solution. This enables the HATDeX platform 202 to quickly adapt the infrastructure to regional requirements as well as comply with personal data management rules in specific geographies and the like.

The Bulk Data Manager API 210 is configured to enable the aggregation/collection of PDA personal data of a user in an efficient manner, providing a one-stop service of wholesale data acquisition from PDA owners (subject to contract and permissions). Bulk Data Manager API 210 may be an application developer service for bulk data sourcing and usually used for research or training of PDS/HAT computation tools and the like. Special permissions are required for access to bulk data manager API service 210 for protecting personal data in the PDAs of each PDA owner (user). In addition, to ensure excellent developer experience when working in the decentralised HATDeX platform, functionality may be included into the Bulk Data Manager API 210 that overcomes the difficulties of setting up data licensing contracts between merchants and PDS/HAT owners, collecting and storing raw data in an efficient manner, and providing a one-stop solution of wholesale data acquisition. It is therefore a key component needed for the commercial adoption of HAT and demonstration of the "market-making" facility of the PDA/HAT Ecosystem. The data exchange framework described herein means that PDAC information may allow for specific data values to be requested when access PDSs of the users, where organisations only receive the exact data values they ask for, and only the datasets that meet minimum data protection requirements set in place by the PDM/HATDeX platform can be provided. This may be used as developer service/research service for bulk data sourcing and usually used for research.

The HAT Application (or HAT App) 216, also known (generically) as a PDS Dashboard or (specifically) as the HAT Dashboard, is a dashboard or user interface (UI) for each user's PDA hosted by a HAT Microservers 204a-204n. The HAT Dashboard 216 may be configured to enable a user 109a to: 1) visualise all the information in the user's HAT Microservers 204a of user 109a (also known as a HAT Microservers owner), in one in-depth feed both chronological and geographical to enable the HAT Microservers owner to visualise their data. It is tasked to give sense and meaning to their data and understand its value; 2) provide a universal visualisation or presentation of data from all applications integrated with each user's PDA hosted on the corresponding HAT Microservers; 3) manage all user approved applications 106a-106n, application providers 108a-108m, application data providers and/or plugins 110a-110p and/or tools; 4) enable the PDA owners, users, to view all data in the HAT database system of the HAT Microservers of the user as well as the person's digital activities with the applications that have been integrated; and 5) act as an access control dashboard where data debits, applications and permissions can be enabled and/or disabled.

The application data provider Data Plugs 110a-110p are typically minimal API-to-API web services with the primary purpose of synchronising and/or fetching personal data of the user 109a from 3rd party APIs associated with $3^{rd}$ party application data providers such as, without limitation, for example Facebook (RTM), Open Banking (RTM), Google (RTM) Calendar (RTM), Instagram (RTM), Spotify (RTM), FitBit (RTM) and the like; and writing the fetched personal data of the user 109a to the corresponding PDA hosted by the HAT Microservers 204a of the user 109a. Any given Data Plug 110a-110p takes care of: brokering user's authorisation to access personal data on a third party resource, implement general logic to move personal data from the API to the PDA hosted by the HAT Microservers of the user, implement logic to maintain and update synchronisation status between third party resource and the PDA of the user, log synchronisation events for auditability purposes.

The PDA Exchange controller 212 is configured to be the central anchor in the HATDeX platform 202. The PDA Exchange controller 212 provides authoritative information about approved applications and their data access rules, ranging from Data Plugs for data acquisition from application data providers 110a-110p (e.g. Facebook (RTM), Open Banking (RTM), Google (RTM) Calendar (RTM), Instagram (RTM), Spotify (RTM), FitBit (RTM) and the like) to tools for improving value of personal data, to complete custom personal data container management.

In operation of the HATDeX system 200, initially applications of the plurality of applications 106a-106n are required to register with the HATDeX platform 202 after going through a governance procedure for obtaining approval to go live on the HATDeX platform 202. In the governance procedure or approval process, the application specifies a set of data access rules, instructions and/or controls that it requires for accessing personal data of a user from a PDS of the user. The governance procedure or approval process may approve the application to go live on the HATDeX platform if the set of data access rules specified by the application, the implementation of the application, and the contract proposed between the application and any new users, meet the minimum requirements/standards that the HATDeX platform 202 has placed on applications for protecting the personal data of the user and the like, and for ensuring users become PDA owners and hence data controllers of their personal data in the PDA of the user.

When an application 106a of the plurality of applications 106a-106n obtains the approval to go live, the PDA exchange controller 212 of the HATDeX platform 202 receives the approved contract permissions template between any PDA owner and the application 106a. The PDA exchange controller 212 interprets or translates the contract template into a set of rules, instructions and/or permissions that govern the applications access to personal data of the new user in the application's namespace, which is created in the PDA hosted by the HAT Microservers of the user. Each application defines an application namespace, which is created on the PDA hosted by the HAT Microservers of the user. The personal data access control information may include a set of rules, instructions and/or permissions governing the applications access. The personal data access control information may be, without limitation, for example a HAT Microservers instruction contract and/or set of HAT Microservers instructions (HMI) configured to provide the set of rules, instructions and/or permissions associated with the application's access to the application namespace in the PDA hosted by the HAT Microservers of the user.

The application can also be approved to have cross namespace access to personal data in another one or more application namespaces associated with one or more other applications of the plurality of applications 106a-106n. The PDA exchange controller 212 of the HATDeX platform 202 may further receive an associated approved contract for cross namespace access between any new PDA owner and the application 106a. The PDA exchange controller 212 interprets or translates this contract into a set of rules, instructions and/or permissions that govern the applications cross namespace access to personal data of the new user in not only the application's namespace but also one or more application namespaces associated with one or more other applications, which are also or have been also created in the PDA hosted by the HAT Microservers of the user. The personal data access control information, which includes a set of rules, instructions and/or permissions governing the applications cross namespace access, may be, without limitation, for example a HAT Microservers instruction cross namespace contract and/or a set of HAT Microservers instructions (HMI) configured to implement the set of rules, instructions and/or permissions associated with the application's access to the application namespace and cross namespace access in the PDA hosted by the HAT Microservers of the user.

When the application 106a of the plurality of applications 106a-106n registers a new user 109a from the plurality of users 109a-109n, the application 106a calls on the PDA provisioning service 206, which will notify the PDS Manager 208 to create a new Personal Data Server (PDS) for the user 109a which is hosted, i.e. implemented, by a HAT Microserver 204a with connections to the PDA exchange controller 212. In essence, the PDA provisioning service 206 creates a new PDS instance by instructing PDS Manager 208 to instantiate a new underlying HAT Microserver 204a and register the said server 204a and user with PDA exchange controller 212. The HAT Microserver 204a checks with the PDA exchange controller 212 the contracts and permissions that may have been pre-approved before allowing the application 106a access to its PDA hosted by the HAT Microservers 204a of the user 109a. PDA owners can go to their PDS dashboard (the HAT App) to enable or disable the access of applications into the personal data in their PDS.

A data access protocol is used to define an API response payload format associated with the application that enables the application access to personal data in the application namespace of a PDS/PDA of a user. A data access protocol known as a data debit protocol may also be used to define an API response payload format associated with the application that enables the application access to cross namespace personal data of the user in relation to other application namespaces of a PDS/PDA of a user. The API associated with the application is configured with data representative of the set of rules, instructions and/or permissions such as, for example, data representative of PDSI (HMIC or HMI), that enables the application access to the required application namespace(s) based on the application's data access rule.

Data into and out of PDAs via the PDSs (data exchange flows) can only be enabled with the authorisation of each PDA hosted by a PDS, or HAT Microserver, of a user, which is a PDA owner, through the users acceptance of a legally binding contract for data exchange known as, without limitation, for example the HAT Microserver Instruction Contract (HMIC). This contract enables PDA owners (users registered with the HATDeX controller with a PDA or registered directly or by another means for a PDA and associated PDS or HAT Microserver) to license the data from namespaces or folders within their PDAs hosted by the HAT Microserver, or specific cross folder bundles of data, or the use of the folder itself, to the application. When the user, aka PDA owner, confirms their contracts, plugins can be enabled to bring data in from open API endpoints associated with each application. Each API endpoint associated with an application is configured with data representative of the set of rules, instructions and/or permissions such as, for example, data representative of PDSI, HMIC or HMI (also known as PDAC information of the application), that enables the application access to the required application namespace(s) based on the application's data rule access. The API endpoint associated with an application is provided for use by the HAT Microserver of the user for use in data exchange of personal data of the user between the application and the PDA hosted by the HAT Microservers of the user. For example, websites/applications can use the corresponding API to read or write personal data from/into the PDA hosted by the HAT Microservers 204a of the user 109a (PDA owner), and tools can be installed and enabled in PDAs to create private analytics and insights. Plugins, websites/applications and tools may be supplied by any person or organisation (called "merchants"), but they would all need to go through PDM platform governance services before going live.

Figure 2B:
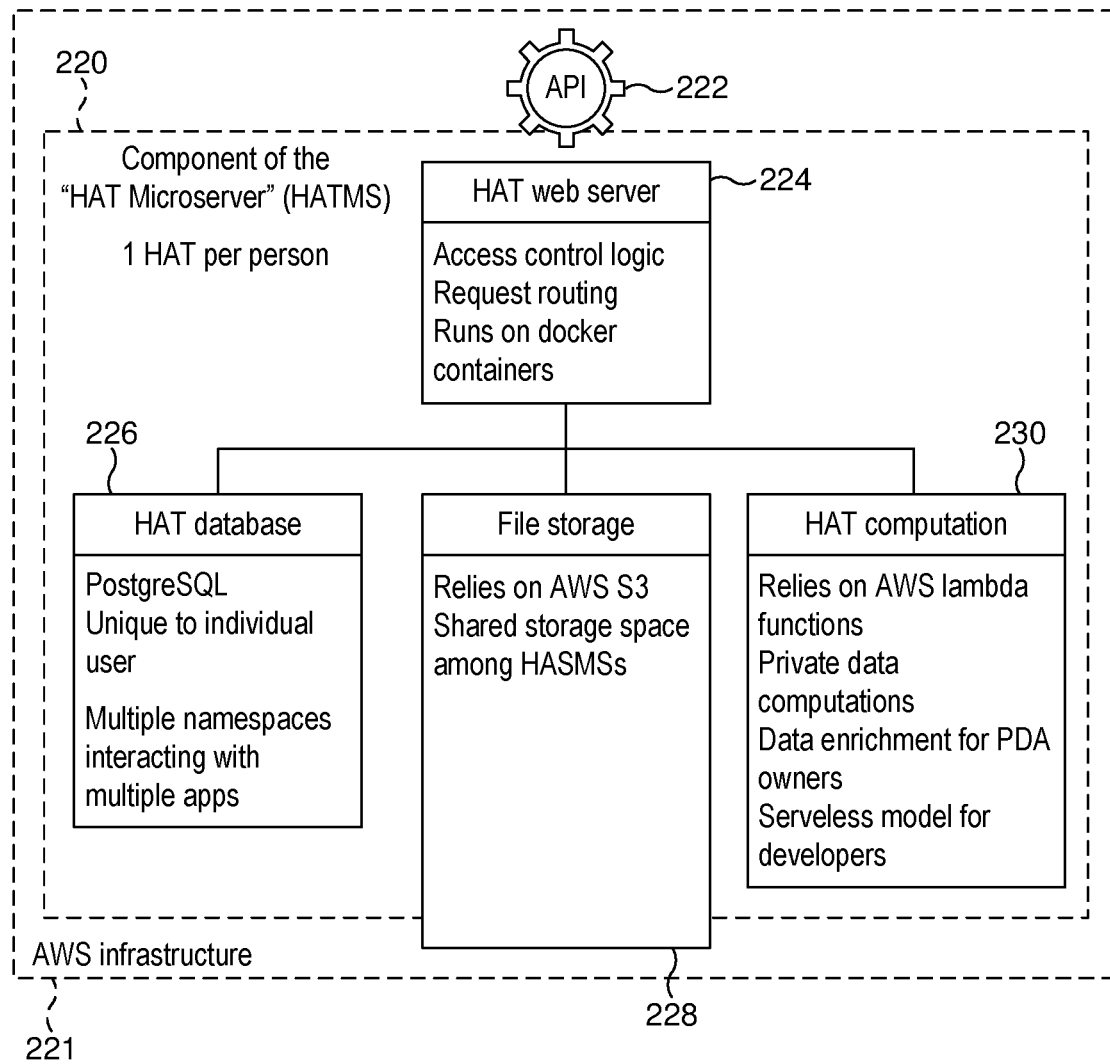
FIG. 2b is a schematic diagram illustrating another example of a personal database server of the example PDM system/platform of FIG. 2a according to some embodiments of the invention.

FIG. 2b is a schematic diagram illustrating an example PDS 220 for use with personal data management component 204 and PDM platform 202 of FIG. 2a according to the invention. In this example, the PDS 220 is implemented as a Hub-of-all-Things (HAT) Microserver, which may be provided for by cloud-based platform provider or infrastructure 221 such as, without limitation, for example Amazon Web Service (AWS) (RTM) infrastructure. Although the PDS 220 is described as being implemented with, by way of example only but is not limited to, a HAT Microservers, HAT technologies and AWS infrastructure, it is to be appreciated by the skilled person that the PDS 220 may be implemented based on, without limitation, for example any other storage and/or computational technology, computing devices, servers, server systems, database system(s), file storage system(s), cloud-based infrastructure, combinations thereof and/or modifications thereto and/or as the application demands.

In this example, the HAT Microserver 220 is a personal single-/multi-tenant technology system that is fully self-service, to enable an individual user to define a full set of "meta-data" defined as a specific set of personal data including, without limitation, for example any data relating or associated with the user; personal preferences associated with the user; personal behaviour and/or events associated with the user and the like. Each HAT Microserver 220 includes an API 222 (e.g. HAT API), a web server 224 (e.g. HAT web server), a database system 226 (e.g. HAT database system), file storage 228 and computational block(s)/unit(s) 230. The API 222 include one or more endpoints that may be associated with one or more particular application(s)/application client(s), application provider(s), or third party application data provider(s) and the like. Another endpoint of the API 222 may be associated with the HATDex platform 202 and its modules and/or components. The API 222 is coupled to, i.e. exposed by, the HAT web server 224, which is connected to the HAT database system 226, the file storage 228 and the HAT computation block(s)/unit(s) 230. The HAT Microservers 220 may be configured or connected by networked connections between the HAT API 222, the HAT webserver 224 (e.g. HAT web server), the HAT database system 226, the file storage system 228 and the computational block(s)/unit(s) 230. For example, the HAT API 222 may be, without limitation, for example a single HAT representational state transfer (REST) API that is being used differently depending on the role and permissions of the requesting entity (e.g. application/application client etc.). The HAT API 222 may be logically divided into a Data API, a File API, a Data Debit API, an Application API, an Authentication API and/or any other functions required.

The HAT web server 224 is configured to establish individual network connections with the HAT database system 226. The HAT database system 226 may include one or more databases for use in collecting, storing, managing and/or retrieving personal data of the user. The HAT web server 224 is configured to send/receive information associated with personal data of the user to a particular database of the HAT database system 226 using an authentication mechanism facilitated by the PDS Manager 208 of the HATDeX platform 202. The HAT web server 224 is configured to expose the one or more endpoints of the HAT API 222 to a communication network for communicating with one or more corresponding applications/application clients, application providers, third parties and the like. The communication network may be, without limitation, for example the Internet. Some of these endpoints of the HAT API 222 provides the means by which users (e.g. HAT owners) and applications, application providers, and/or third parties interact with personal data of the user held inside the HAT database system 226 of the HAT Microservers 220 of the user. Each HAT Microservers 220 has its own API (or set of logical API(s)) 222. The API 222 is configurable or reconfigurable to, without limitation, for example providing access to a namespace, access to a few personal data attributes within a namespace, and/or access to even a combination of personal data attributes across two or more namespaces and the like. The API may be configured based on a data debit protocol or methodology, as described with reference to FIGS. 1a to 1f, which may reconfigure the API 222 of the HAT Microservers 220 accordingly.

The database system 226, which in this example is called a HAT database system 226, may be implemented and created based on, without limitation, for example the AWS Relational Database Service (RDS) instances that then gets assigned to a user of the plurality of users, the user becomes a PDA owner of their personal data stored thereon. The HAT database system may be decentralised. The HAT database system 226 is configured such that PDA owners own IP rights over their particular instance of each database in the HAT database system 226. Personal data of the user associated with the HAT Microservers 220 is placed in a folder, or 'namespace' within the HAT database system 226. These are separated and ordered according to data sources, so that (for example) Spotify and Facebook data is placed into individual Spotify and Facebook namespaces in the HAT database. Each database of the HAT database system 226 contains an optional data schema, allowing for the storing of an individual's data from any source without losing the structure specific to the source, while at the same time enabling the individual to relate their data to a context, providing a common semantic structure for third parties to use such personal data.

The file storage system 228 is connected to the HAT database system 226 and the HAT webserver 224. In this example, the database(s) of the HAT database system 226 may store personal data that is rendered into text based data. Unless the personal data is rendered into text based data, files and other data is not stored solely in the HAT Microservers 220, but rather these files and other data may be stored in a storage system of a cloud-based platform, for example, such files and other data may be held in an S3 storage system offered by AWS and managed by the HAT Microserver and/or HATDeX platform.

The HAT Computation unit 230 is configured to enable the creation of private analytics and "AI" for the personal data stored within the HAT database system 226, which may generate new personal data of the user such as, without limitation, for example shareable insights from potentially sensitive data the individual may not be willing to share directly. The HAT Computation unit 230 may be configured to enable an individual user to install pre-trained tools, applications and/or software (e.g. analytical applications such as machine learning algorithms and/or artificial intelligence applications supplied by organisations or data scientists) configured to, without limitation, for example generate "edge" analytics and private AI insights on their own personal data. The output data of these tools, applications and/or software may be returned as further personal data back into the PDA hosted by the HAT Microservers 220 of the user. The user may control the accessibility and sharing of this further personal data with websites, applications, application providers and the like when requested.

HAT Computation is built around the framework of serverless functions and provides an environment where third-party code written in a number of different programming languages can operate on personal data of the user stored in the HAT database system 226, e.g. using pre-trained AI models, and contributes the newly generated personal data or information back into the HAT database system 226 and without an ability to leak the newly generated personal data or information to third-parties. The generated personal data or information (e.g. insights) may be shared and/or available for acquisition via the Data Debit protocol process.

Figure 2C:
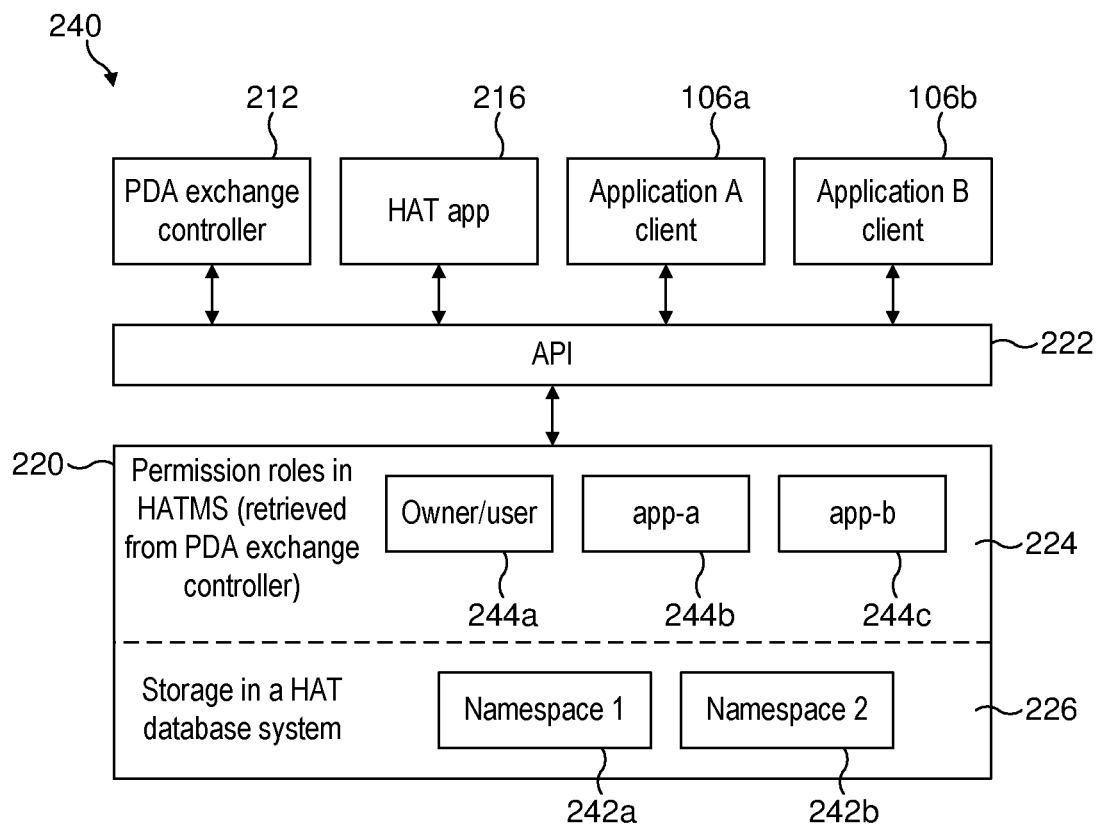
FIG. 2c is a schematic diagram illustrating an example interaction of the personal database server of FIG. 2b with the PDM platform of FIG. 2a according to some embodiments of the invention.

FIG. 2c is a schematic diagram illustrating an example data access process 240 for accessing personal data of the user using HAT API 222 coupled to HAT web server 224 and HAT database system 226 of HAT Microservers 220 of a user. The HAT database system 226 is configured to host a PDA of the user that has one or more namespaces 242a-242b for storing personal data of the user. Each of the namespaces 242a and 242b (e.g. Namespace 1, and Namespace 2) identifies in the PDA of the user where a corresponding application of the applications 106a and 106b (e.g. Application A Client and Application B Client) will have read and write access. The namespace concept is similar to what a "folder" is in operating systems. For example, all operating systems have a root user folder in which users can read and write data. Usually that folder has many subfolders, created by the operating system, such as Images, Music, Videos, Documents, Downloads etc., which are configured by a file system to store corresponding data. Similarly, a namespace is the root folder for the application. The application has read and write access and is able to structure the data in subfolders.

Namespace is integral to applications that are required to store and access personal data of a user during operation of the application and so an application may be required to specify one upon creation. During the application creation process the application is given read, write, and/or file management permissions to the specified namespace associated with the application, also referred to as an application namespace. This allows the application developer to structure the personal data of the user that will be read/written to the application namespace in the PDA of the user in a way that meets the particular business needs of the application. However, if an application only requires read access to the PDA of the user, e.g. read data via a Data Debit protocol/process, then a namespace for the application may not be necessary. Namespaces may also ensure data integrity on the HATDeX Platform. This integrity is maintained as applications read and write data into their own application namespace therefore eliminating the possibility of duplicates and enforcing applications to only write personal data of the user to their own application namespace in the PDA of the user, where the PDA is hosted by a HAT Microservers 220.

The standard approach for most applications requiring read and write access is to have access to a single designated "namespace" 242a or 242b for their application 106a or 106b, respectively. It is possible to request from other unrelated namespaces. This can be achieved through a domain-specific "data debit" mechanism as described with reference to FIGS. 1a to 1f and/or as described herein. If, for example, the application wishes to query individual's Facebook posts, then a data debit will have to be specified and registered with the PDA exchange controller 212 before it can be created on demand by the PDA and be accepted by PDA owners.

In this example, the PDA Dashboard, or HAT App, 216 may be used by the user of the HAT Microservers 220 to select an application 106a or 106b for use on their user device and the like. The PDA data exchange controller 212 provides personal data access control information associated with the application 106a or 106b to the HAT Microservers 220 for reconfiguring the API 222 and exposing endpoints associated with applications for HAT Microservers 220 to call on for: a) verifying trustworthiness of entities such as, without limitation, for example applications 106a-106b (e.g. Application A Client and Application B Client) interacting with the HAT Microservers 220 of the user; and b) exchanging personal data of the user between the entities or applications 106a and 106b and the corresponding application namespaces 242a and 242b in PDA of the HAT Microservers 220 of the user.

As the rights to personal data held in the HAT database system 226 are fully owned by the HAT Microservers 220 owner/user, any data acquisition such as personal data of a user from the HAT database system 226 by an application 106a or 106b would require permission. When permission is granted, a legitimate contract is agreed upon between the user (also known as PDA owner) of the HAT Microservers 220 and the corresponding application 106a or 106b, The PDM Exchange Controller 212 is configured to enforce a data exchange protocol that is a strictly-defined format defining the specific data requested by the application 106a or 106b for the user to review and confirm. This is based on a set of data access rules to personal data of a user specified by the application 106a or 106b that is required for the application to operate properly. Once the data-sharing permissions are given, the contract between the PDA owner/user and the application provider of the application is registered with the PDA exchange controller 212. The contract may be interpreted as a set of rules, instructions and/or permissions based on the set of data access rules specified by the application that govern the required exchange of personal data between the PDA of the user and the application 106a. An endpoint of API 222 associated with the application may be configured based on the personal data access control information (e.g. set of rules, instructions and/or permissions) associated with the application 106a. The endpoint of the API 222 associated with the application 106a is specified and provided to the HAT Microservers of the user/PDA owner, which can be enabled by the PDA owner/user.

The webserver 224 of the HAT Microservers 220 may be configured to include access control logic, which may also be based on the set of rules, permissions, instructions associated with each application 106a and 106b and that may be retrieved from the PDA exchange controller 212. The set of rules, instructions and/or permissions associated with an application and the user govern the data exchange between the HAT Database System 226 and the associated application 106a or 106b, The web server 224 may include a set of rules, instructions and/or permissions 244a governing how the user or owner may exchange personal data with the HAT database system 226. The web server 224 may include a set of rules, instructions and/or permissions 244b governing how an application 106a may exchange personal data with the HAT database system 226. The web server 224 may include a set of rules, instructions and/or permissions 244c governing how an application 106b may exchange personal data with the HAT database system 226. The API 22a-222n associated with the applications 106a and 106b and/or web server 224 becomes the only way that data such as personal data of the user can be securely exchanged and/or retrieved from the PDA of the user hosted by the HAT Microservers 220 by anyone or application 106a or 106b other than the owner/user.

As described, each PDS has an API with a list of endpoints that can be accessed by different applications, and configured with rules/permissions associated with which applications can access which endpoints with rules/permissions defining the access of the applications to personal data in the database of the PDS. These aspects of the API can be dynamically reconfigured as the PDS operates and is being used and as each application is permitted access to personal data of the PDS according to personal data access controls associated with each application/application client 106a. Essentially, each database of a PDS can be accessed through a unique domain name and the API is exposed based on this domain name. For example, when a user registers for a PDA with PDM platform 102 using PDA username "gus", then the PDS of the user may be given a PDS domain name "gus.hubofallthings.net", and through this domain, portions of the API is exposed that allows access to different parts of the database to applications according to personal data access control information corresponding to each of these applications/application clients.

The personal data access control information may comprise data representative of a set of rules, instructions and/or permissions that enable a digital permission based data exchange contract that governs the agreed upon exchange of data between application/application client 106a and the database of the PDS 114a of the user. This enables the user to become a data controller of the personal data of the PDS 114a. The personal data access control information may comprise or represent a set of rules, instructions and/or permissions associated with the application for governing the exchange of data between application/application client 106a and the PDS 114a of the user.

The personal data access control information may include, without limitation, for example data representative of: 1. Permissions that are given to applications, application clients, application providers/developers and the like to act on their behalf and do what it is permitted to do with personal data of the user in the PDS of the user (e.g. read and write personal data into the PDS of the user); 2. Agreements: formed when users agree to allow applications/application clients to operate based on personal data access control information proposed to the user/owner of the PDS of the user by applications, application clients/application providers and the like that are in compliance with the PDM System/Platform, and agreed by the users of the PDS in exchange for consideration. Offer, consideration, and acceptance are presented and agreed through 'PDSI screens' or 'HMI screens' presented to the user/owner of the PDS of the user. The personal data access control information may be based on.

Figure 3A:
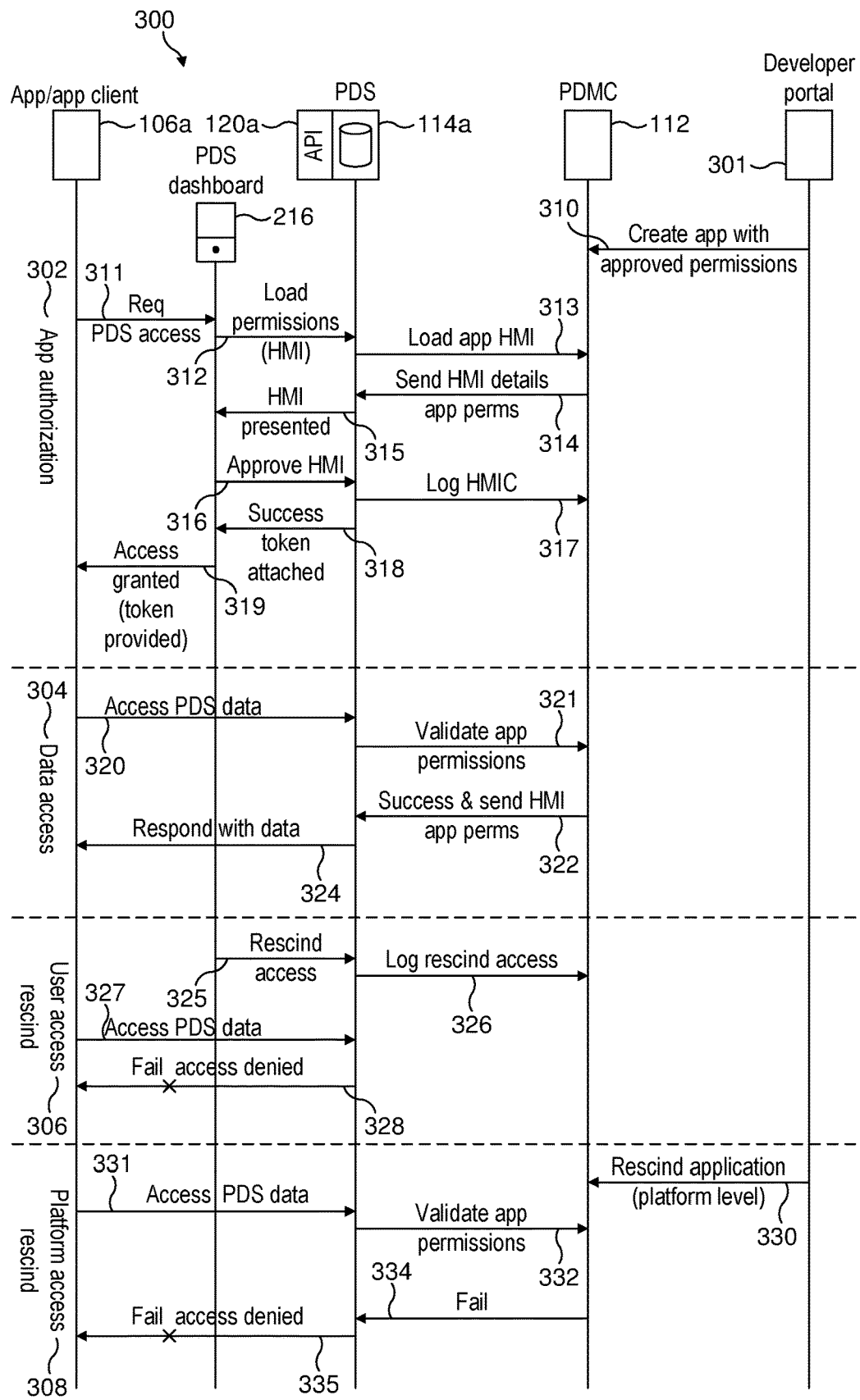
FIG. 3a is a signal flow diagram illustrating an example application authorisation process, an example data access process, an example user access rescind process, and an example a platform access rescind process for use with the PDM platform according to some embodiments of the invention.

FIG. 3a is a signal flow diagram illustrating another example application authorisation and data access process 300 for use with the PDM platforms 100 or 200 as described with reference to FIG. 1a or 2a according to some embodiments of the invention. For simplicity, reference numerals FIGS. 1a-2c for similar or the same entities, components, features are reused in the following. In this example, it is assumed that each PDS 114a of the plurality of PDSs have been created or provisioned for each user and are connected to the PDMC 112. The PDSs assist users in storing their personal data and in controlling access to their personal data. The PDM platforms 100 or 200 are further modified by including a PDMC 112 connected to a PDS dashboard 216 and a developer portal 302. The PDS dashboard is a web application that operates on top of a PDS 114a and may provide an interface for an application client 106a to request authorisation from the PDS 114a of the user for access to personal data of the PDS 114a. The developer portal 302 provides an interface for enabling application developers that create applications and corresponding application client(s) to register their application/application client with the PDMC 112 once the application/application client complies with at least the minimum personal data protection requirements for using personal data of one or more users or personal data protection criteria, which is set by the governance process of the PDMC 112. When the application/application client is approved by the governance process of the PDMC 112 then the application may be loaded from the developers portal and registered in the PDMC 112.

In this example, the application authorisation and data access process 300 includes an application authorisation process 304, a data access process 304, a user access rescind process 306 and a platform access rescind process 308. In order for an application/application client 106a to be used by a user of PDS 114a, the application/application client 106a is required to be authorised by the user for accessing the personal data of the user in the PDS 114a. Each PDS 114a uses the PDMC 112 to determine whether the application client 106a has been approved and registered by the PDMC 112 and also what the personal data access control information associated with the application/application client 106a are to enable the user to approve or reject the request by the application client 106a. Once the application/application client 106a has been authorised access to the PDS 114a by the user of PDS 114a, then the application/application client 106a may access the personal data of the PDS 114a based on the personal data access control information of the application using the data access process 304. The data access process 304 may be performed between the application client 106a and the PDS 114a during the user's operation of the application client 106a.

At any time after the application/application client 106a is authorised to access personal data of the PDS 114a, the user, PDMC 112, and/or the application developer via the developer portal 301 may rescind the application client's 108a access to the personal data of PDS 114a of the user. This may be due to, without limitation, for example the user not wanting to use the application/application client 106a anymore and/or have the application client 106a access personal data from the PDS 114a of the user, the PDMC 112 discovering the application/application client 106a does not comply with the personal data protection criteria of the governance process, and/or the developer deciding to withdraw the application/application client 106a and the like.

The application authorisation process 304 for an application and associated application client 106a to be authorised access to personal data of the PDS 114a of the user may include the following steps of: In step 310, an application (and/or application client 106a) is sent from the developer portal 301 to the PDMC 112 for approval and registration by one or more services within the PDMC 112. The application (and/or application client 106a) is typically submitted by an application developer of the application to the developer portal 301, which sends the submitted application/application client 106a to the PDMC 112 for approval and registration. The PDMC 112 performs a governance procedure for analysing the personal data usage and/or operations performed by the application/application client 106a when a potential user uses the application client 106a of the application. The governance procedure determines whether the application/application client 106a meets a set of personal data protection criteria associated with use of personal data of the potential user when using the application client 106a of the application. When the application/application client 106a meets the set of personal data protection criteria the application/application client 106a is registered in the PDMC 112. The PDMC 112 registers the application/application client 106a using data representative of the application identifier (provided by the application/application client 106a) corresponding to the application/application client 106a and personal data access control information associated with the application/application client's 108a usage of personal data of the user. The application identifier may comprise or represent data representative of an identifier for identifying the application/application client 106a. The application identifier may be a unique identifier.

The user of PDS 114a may have installed the application client 106a on their personal device and/or other computing device or cloud service and wishes to use the application client 106a. For example, the application client 106a may be executing on the user's device, a browser, on desktop or any other way determined by the developer. The applications may be, without limitation, for example desktop applications, mobile applications, web applications, backend applications and/or any other application or node that requests access to the PDS 114a. Alternatively or additionally, the user of PDS 114a may have accessed the PDS dashboard 216 and selected one or more applications approved by the PDMC 112 for use in accessing personal data of the user from PDS 114a. Once the user has installed the application client 106a on a personal device or is using the application/application client 106a for the first time, in step 311 the application client 106a requests access to specific personal data within the PDS 114a of the user that is required for the application client 106a to operate and provide required application services to the user of PDS 114a. In this request, the application client 106a also provides the application identifier associated with the application/application client 106a. This is performed by redirecting the web client to the PDS dashboard 216.

Prior to requesting access to the PDS 114a of the user in step 311, the application client 106a may have requested the user to input, without limitation, for example the username or PDA username or other identifying data that enables the application client 106a to determine the address/domain name of the PDS 114a of the user so it may contact the PDS 114a of the user. The PDA username is created/provisioned when the user registers with the PDM platform 102 for a PDA. The username or PDA username may be a unique identifier that may be used for identifying the PDS 114a of a user, where the PDMC 112 may ensure that each PDS 114a of the plurality of PDSs has a unique identifier when provisioned to a user. The username or PDA username associated with PDS 114a of a user may have been, when the PDA of the user and hence PDS 114a of the user was created/provisioned, generated by the user and/or automatically generated by the PDMC or the application/application client 106a and the like. Each PDS 114a of the plurality of PDSs may be associated with each user of the plurality of users and so may be associated with the unique PDA username via a PDS identifier/domain name that enables an application client 106a to properly direct the request for access to the PDS 114a of the user. For example, the username or PDA username may be considered the individual's/user's username of the PDA of the user on the PDM platform 102 or 202. The PDM platform 102 or 202 may accept a username and automatically convert it into a unique PDA username and corresponding PDS domain name that uniquely identifies the PDS of the user. As a simple example, when a user registers a PDA with username "james", then the PDM platform 102 or 202 may automatically generate a PDS domain name "james.hubofallthings.net" when the username "james" can be used as a unique PDA name. However, should the username "james" not be unique, i.e. another user has this username/PDA username, then the PDM platform 102 or 202 may request another username from the user, and/or automatically generate a unique username/PDA username such as "james123" and automatically generate the unique PDS domain name "james123.hubofallthings.net".

For example, the application client 106a may request/or have a field for the user to enter, by way of example only but not limited to, username/PDA username/domain name/identifier that the application client 106a may use to identify and contact the PDS 114a of the user. Based on the entered PDA username/domain name/identifier of the PDS 114a, the application client 106a may be configured to determine the domain and the address to contact the PDS 114a of the user. Based on this domain, the application client 106a is configured to redirect to the PDS Dashboard 216 so the PDS Dashboard 216 is loaded and/or displayed to the user. For example, when the user registers a PDA from PDM platform 102 or 202, then a PDA username is created for the PDA and a corresponding PDS of the user is created and provisioned. The PDS is provided with a PDS domain name that may be based on the PDA username and hence the application may be able to determine the address/domain name of the PDS 114a of the user based on the PDA username.

Thus, in step 311 the application client 106a requests access to specific personal data within the PDS 114a of the user that is required for the application client 106a to operate and provide required application services to the user of PDS 114a. This is performed by redirecting the web client to the PDS dashboard 216. The PDS dashboard 216 is configured to display or show the user the type of access to personal data of the PDS 114a that the application/application client 106a is requesting. This is in order to enable the user to make a decision to approve and/or authorise the application/application client 106a access to the PDS 114a of the user.

For example, step 311 is typically performed via a redirect from the application/application client to the "PDS Dashboard" 216 controlled by the PDS 114*a* of the user itself. The redirect process may be based on, by way of example only but not limited to, the OAuth standard, which can ensure that authorisation and authentication steps are performed through an interface controlled by the users (or PDS 114*a* of the user) leading to improved security guarantees for the user. Information that needs to be transferred in the request PDS access or authentication redirect of step 311 by the application/application client includes, without limitation, for example "application ID" and a "redirect universal resource indicator (URI)". Internally, i.e. steps 312-317, the PDS 114*a* of the user will check the application ID and redirect URI against application information registered in the PDMC 112, which may be included in the PDAC information. If these records match, a new personal data access token is created and returned to the "redirect URI" in steps 318-319. If the "redirect URI" used does not match the records of the PDMC 112, then an error may be flagged up as suspicious behaviour directly to the user in the PDS Dashboard 216, where the redirect back to application/application client is not performed in that case.

The PDS dashboard 216 may present or display to the user the personal data access control information (e.g. PDS instructions such as HAT Microservers instructions (PDSI/HMI)) of the application/application client 106*a*. In this example the personal data access control information (PDAC) is based on PDSI/HMI. Thus, in step 312 a load permissions (PDSI/HMI) request is sent to the PDS 114*a*, this is in order for the PDS dashboard 216 to get the PDAC associated with the application/application client 106*a* so that it can present of display the PDAC information to the user to enable the user to decide/determine whether or not to allow the application/application client 106*a* to access and/or store personal data of the user in PDS 114*a*. Given, in this example, the PDS 114*a* does not store a registry of the PDAC information for all applications/application clients that may have been approved by the PDM platform 102 or 202, and that the PDMC 112 centrally maintains a register of approved applications/application clients 106*a* and their associated PDAC information, the API 120*a* of the PDS 114*a*, in step 313 sends a load application PDSI/HMI request (or more generally load PDAC information request) to the PDMC 112. Thus, the API 120*a* of the PDS 114*a*, or the PDS 114*a* directly, uses the load application PDSI/HMI request to check with the PDMC 112 whether the application/application client 106*a* is registered, whether it is approved, what kind of permissions or PDAC information the application/application client 106*a* has or is supposed to be given by the PDS 114*a*, and the like. In this case, it is assumed that the application/application client 106*a* is registered and approved, so that, in step 314, the PDMC 112 returns a response message (e.g. send PDSI/HMI details message) with the specific information that the PDS 114*a* may require such as the PDSI/HMI details with all of the rules, instructions, permissions (i.e. the PDAC information). Further PDAC information/PDSI/HMI details may include application ID and redirect URI, which may be part of the registered PDAC information of the application that is registered by the PDMC 112 when the application is approved. If the application/application client was not approved or is not registered, then the PDMC 112 sends a notification to the PDS 114*a* indicating the application/application client 106*a* was not approved or registered, so the user may deny access to the application/application client 106*a*. As an option, on receipt of the registered PDAC information/PDSI/HMI details the PDS 114*a* of the user may check the application ID and redirect URI against application information registered in the PDMC 112. If these records match those received from the application, the PDS 114*a* may proceed with step 315. Otherwise, an error may be flagged up as suspicious behaviour directly to the user in the PDS Dashboard 216 and authorisation process 302 may terminate. In step 315, the API 120*a* of the PDS 114*a* sends the HMI details of the application/application client 106*a* to the PDS dashboard 216 for presenting the HMI details with permissions to the user, so the user can investigate the kind of permissions/instructions/rules that the user will be granting to the application/application client 106*a* (i.e. a third party application).

In this example, the PDSI/HMI is approved by the user (e.g. the user clicks a approve button or OK button on the PDS Dashboard 216), and in step 316, the PDS dashboard 216 sends an approve PDSI/HMI response to the API 120*a* of the PDS 114*a*. The PDS 114*a* loads the PDSI/HMI of the application to the API 120*a* i.e. reconfigures the API 120*a* of the PDS 114*a* based on the PDSI/HMI of the application/application client 106*a*. For example, the PDSI/HMI (or PDAC information) may include, without limitation, for example a set of rules, instructions and/or permissions, which may be executed by the API 120*a* to enable the application/application client 106*a* access to and/or store personal data of the user in the PDS 114*a* according to the PDSI/HMI of the application/application client 106*a*. The PDSI/HMI may include various rules associated with accessing personal data of the user from the PDS 114*a* which provides the API 120*a* with the capability to specify which fields of the personal data can be accessed, so specific granular fields of personal data may be accessed by the application/application client 106*a*. For personal data such as, without limitation, for example Facebook posts, instead of a whole Facebook post being accessed, various fields of the post may be accessed such as the status of a post, the text of the post, an image of the post, the date of the post may be accessed and the like. The PDSI/HMI associated with the application/application client 106*a* may be executed by the API 120*a* during access requests from the application/application client 106*a*. The reconfigurability of the API 120*a* allows portions of personal data of the user to be accessed by an application/application client 106*a* according to the PDSI/HMI of the application/application client 106*a*.

In step 317, the PDS 114*a* logs a digital contract of the user agreeing to allow the application/application client 106*a* access to the PDS 114*a* according to the PDSI/HMI of the application/application process 106*a*. The PDS 114*a* sends the log of the PDSI/HMI contract to the PDMC 112, which then registers the user of the PDS 114*a* as allowing the application/application client 106*a* access to the PDS 114*a* of the user. The PDMC 112 may also log the PDSI/HMI contract between the user and the application/application client 106*a*. In step 318, the PDS 114*a* sends a success response with a token attached (e.g. a personal data access token), where the application/application client 106*a* is configured to use the received personal data access token for accessing the personal data of the PDS 114*a* in accordance with the PDSI/HMI of the application/application client 106*a*. The skilled person would appreciate that any suitable type of token may be used for the personal data access token such as, without limitation, for example an AUTH token based on an Open Authorisation (OAuth) 2 or AUTH0 protocol, JavaScript Object Notation (JSON) Web Token or JWT tokens, and/or any other type of access token/protocol and the like, and/or as the application demands. The personal data access token may be attached to the PDSI/HMI of the application/application client 106a and cannot be used for accessing any other personal data of the user from PDS 114a. The personal data access token may also include data representative of the user name, domain name, PDS identifier, endpoint of the API 120a associated with the application, and/or IP address of the PDS 114a of the user on the communication network or PDM platform 102 or 202. This enables the application/application client 106a to direct data access requests directly to the API 120a of the PDS 114a of the user when accessing personal data on the PDS 114a according to the PDAC information (or PDSI/HMI) of the application/application client 106a. Thus, the application/application client 106a may use the personal data access token during an access request for accessing/storing personal data of the user at the PDS 114a in accordance with the PDSI/HMI of the application/application client 106a. In step 319, the PDS Dashboard or web server 216 (e.g. a browser) sends an access grant message with the personal data access token attached or as payload, where the application/application client 106a may use the personal data access token for accessing the personal data of the PDS 114a in accordance with the PDSI/HMI of the application.

Once the application authorisation process 304 has completed and an application/application client 106a has been authorised by the user to access and store personal data of the user in PDS 114a, the application/application client 106a may perform the data access process 304 (e.g. Data Debit process) in accordance with the PDAC information (e.g. PDSI/HMI) of the application/application client 106a. The user may also perform, at some point in time, a user access rescind process 306 for rescinding access from the application/application client 106a to PDS 114a of the user. In addition, the PDMC or even an application developer may perform, at some point in time, a platform rescind process 308 for rescinding access from the application/application client 106a to PDS 114a of the user.

The namespace of an application is defined by the developer when designing the application/application client 106a. The namespace of the application may be part of the PDAC information and is a configuration parameter that reserves a string that defines the namespace of the application/application client 106a. The API 120a may use the configuration parameter to create the namespace of the application when required. For example, the API 120a of the PDS 114a may create the namespace of the application/application client 106a in the database of the PDS 114a on the first write request of personal data onto the PDS 114a of the user. In this example, the namespace of the application/application client 106a may be created on the first write data access.

FIG. 3a illustrates the example data access process 304 that may be performed for accessing or storing personal data of the user on the PDS 114a of the user. The data access process 304 may be performed one or more times (or many times) during the operation of the application/application client 106a with the user. This may be initiated when an application/application client 106a wishes to access and/or store personal data of the user on the PDS 114a. The application/application client 106a may perform the data access process 304 after the application authorisation process 302 has completed and the application/application client 106a has an personal data access token provided to it by the PDS 114a of the user when the PDS 114a of the user authorised the application/application client 106a access to the PDS 114a based on the PDAC information (e.g. PDSI/HMI) of the application/application client 106a.

The data access process 304 may include the following steps of: In step 320, the application/application client 106a sends an access PDS data request to the PDS 114a of the user. The application/application client 106a has the personal data access token assigned to it by the PDS 114a of the user, which has the user's domain or PDS address/endpoint, so can determine where on the network the API 120a of the PDS 114a of the user is and how to reach it. The access PDA data request may be a direct API request from the application/application client to the PDS 114a of the user, which can potentially be performed in the background. As well, the personal data access token may also have the PDSI/HMI (or PDAC information) encoded therein. The access PDS data request may be, without limitation, for example a read access, write access, delete access, update access or any other type of access as the application demands. That is, it may include data representative of the type of access and/or the personal data fields/type of personal data that the application requires, which should be in line with the PDAC information of the application. The access PDS data request to access personal data may further include, without limitation, for example data representative of an access token (e.g. personal data access token of the application provided by the PDS), the application namespace (or another application namespace if the application is approved to access personal data associated with another namespace of another application) and endpoint (data location in the PDS). It may also optionally include, without limitation, for example parameters for data sorting by an arbitrary data attribute and/or pagination information, e.g. "return records from 100 to 200 only". Application identification is obtained from the information in the access token (e.g. personal data access token of the application) itself and only token signature is validated against token tampering attempts. However, to ensure the applications interacting with the PDS of the user are authentic, various validation steps are performed either during the authorisation process 302 or authentication process 346, i.e. at the point of new personal data access token creation.

Once the PDS 114a receives the access PDS data request, in step 321 the PDS 114a proceeds to validate the application/application client 106a permissions or PDAC information of the application/application client 106a. This is performed because the PDMC 112 can revoke/rescind access centrally to the application/application client 106a. Thus, validating the permissions of the application/application client 106a ensures that the exchange of personal data with the PDS 114a is in accordance with the governance rules/procedures of the PDM platform 102 or 202. This prevents any applications/application clients 106a from accessing the personal data of the PDS 114a that is not in accordance with the PDAC information of the application that has been approved by the data governance PDMC. In step 321, the PDS 114a sends a validate application permissions request to the PDMC 112 of the PDM platform 102 or 202, where the validate application permissions request includes the application/application client 106a identifier. The PDMC 112 determines whether the application/application client 106a is registered with the PDMC 112 and has not been rescinded or disabled since it was approved and registered with the PDMC 112. During the life of the application/application client 106a, the PDMC 112 may determine that the application/application client 106a does not satisfy the governance rules and/or data protection criteria of the governance process/procedure, so the PDMC 112 may disable or deregister the application/application client 106a. In this example, the application/application client 106a is registered with the PDMC 112 and has not been disabled or rescinded. In step 322, the PDMC 112 sends a success response (e.g. an HTTP 200 message) with a payload containing the current PDAC information or HMI details of the application/application client 106*a* that is registered at the PDMC 112. This is because the developer may change or update the application/application client 106*a*, which the PDMC 112 may update.

The PDS 112*a* receives the success response message and the current PDAC information (e.g. PDSI/HMI details) of the application. The PDS 112*a* checks the received current PDAC information of the application/application client 106*a* with those that the PDS 112*a* has used to reconfigure the API 120*a* of the PDS 112*a*. For example, the PDS 112*a* may check that received PDSI/HMI details match the PDSI/HMI details used to reconfigure the API 120*a* of the PDS 112*a*. If they match, then the PDS 112*a* performs the required access operations in relation to the access PDS data request in step 320 and, in step 324, sends a PDS data response message to the application/application client 106*a*. For example, if the access PDS data request in step 320 were a read request for specific personal data of the user from the PDS 114*a*, then the PDS 114*a* would retrieve and read the specific personal data of the user and include it in the PDS response message in step 324. For example, if the access PDS data request in step 320 were a write request for writing particular personal data of the user to the PDS 114*a*, then the API 120*a* of the PDS 114*a*, or the PDS 114*a* directly, would write the particular personal data of the user into the namespace of the application, and the PDS response message in step 324 would be confirmation that the write request was successful. Should the received PDSI/HMI not match the PDSI/HMI details used to reconfigure the API 120*a* of the PDS 114*a*, then the PDS data response in step 324 indicates that the application/application client 106*a* is not authorised to access the requested personal data of the PDS 114*a*. This may require the application/application client 106*a* to re-authorise itself with the PDS 114*a* using application authorisation process 302.

The data access process 304 may be modified to not perform steps 321 or 322 for validating the application permissions (e.g. PDAC information) of the application/application client 106*a* with the PDMC 112. Instead, during the life of the application/application client 106*a*, the PDMC 112 may determine that the application/application client 106*a* does not satisfy the governance rules and/or data protection criteria of the governance process/procedure, so the PDMC 112 may disable or deregister the application/application client 106*a* and/or rescind access of the application/application client 106*a*. Thus, the PDMC 112 may send application permission updates to the PDS 114*a* of the user, which may include updates to application permissions or PDAC information of the application/application client 106*a* should these change, and/or updates indicating the application/application client 106*a*.

FIG. 3*a* illustrates the example user access rescind process 306 that may be performed for revoking or rescinding particular application/application client accessing or storing personal data of the user on the PDS 114*a* of the user. In this example, the user or owner of the PDS 114*a* may use the PDS dashboard 216 to rescind access to a particular application/application client 106*a*. The user access rescind process 306 may include the following steps of: In step 325, the user may use the PDS dashboard 216 or other user interface to the PDS 114*a* and revoke access for a particular application/application client 106*a* to the PDS 114*a* of the user. The PDS dashboard 216 sends a rescind access request to the API 120*a* of the PDS 114*a* for rescinding for a particular application to the PDS 114*a*. In step 326, the PDS 114*a* logs the rescind access to the particular application/application client 106*a* with the PDMC 112. So that the PDMC 112 has a log or history of what is occurring in relation to PDSI/HMI contracts and/or PDAC information between the user and the application/application client 106*a*. The PDS 114*a* may also log the rescind request/event in relation to the particular application/application client 106*a*. The PDS 114*a* then reconfigures the API 120*a* to block or deny the application/application client 106*a* from accessing the PDS 114*a*. For example, the API 120*a* may be reconfigured by indicating that the application/application client associated with application identifier has been disabled and no longer has the right to access personal data or anything on the PDS 114*a*.

Should the application/application client 106*a* attempt to access data of the PDS 114*a*, then the PDS 114*a* will block or deny such access PDS data requests. For example, in step 327, a revoked or rescinded application/application client 106*a* may send a PDS data request to the PDS 114*a* then upon this attempt to access personal data of the PDS 114*a*, the PDS 114*a* does not check with the PDMC 112 because it can determine immediately that the application/application client 106*a* has been disabled due to the logging of the rescind/revoke event in relation to the application/application client 106*a* and/or the reconfiguration of the API 120*a*, which has been reconfigured to block the application/application client 106*a* from access personal data of the PDS 114*a*.

FIG. 3*a* illustrates an example platform access rescind process 308 that may be performed when the platform or PDMC 112 revokes or rescinds a particular application/application client accessing or storing personal data of the user on the PDS 114*a* of the user. In this example, the application developer 301 or the PDMC 112 may determine that the application/application client 106*a* should be revoked or rescinded. The platform access rescind process 308 may include the following steps of: In step 330, the developer may use the developer portal 301 or other user interface to the developer portal 301 and revoke access for a particular application/application client 106*a* to the PDS 114*a* of the user. The developer portal 301 sends a rescind access request to the PDMC 112 for rescinding a particular application access to the PDS 114*a*. Alternatively or additionally, the PDMC 112 may determine that the application/application client 106*a* should be revoked or rescinded. For example, the registered application and associated PDAC information may fail one or more data protection criteria of the PDMC. That is each registered application may be checked by the governance process/procedure of the PDMC 112 whether their registered PDAC information still complies with the data protection criteria set by the PDMC 112 or platform 102/202. In any event, the PDMC 112 logs the rescind access request to the particular application/application client 106*a* so that the PDMC 112 has a log or history of what is occurring in relation to PDSI/HMI contracts and/or PDAC information between the user and the application/application client 106*a*. The PDMC 112 may also log or deregister the application/application client 106*a* associated with application identifier has been disabled and no longer has the right to access personal data or anything on the PDS 114*a* of the user. This may be applied to any of the PDSs 114*a*-114*l* that may be providing personal data access to the rescinded application/application client 106*a*. Thus, the application/application client 106*a* may be identified by the PDMC 112 to be disabled/rescinded for all users using the application/application client 106*a*.

Should the application/application client 106a attempt to access data of the PDS 114a, then the PDMC 112 will block such access PDS data requests. For example, in step 331, a revoked or rescinded application/application client 106a may send a PDS data request to the PDS 114a then upon this attempt to access personal data of the PDS 114a. The application/application client 106a has the personal data access token assigned to it by the PDS 114a of the user, which has the users domain or PDS address/endpoint, so can determine where on the network the API 120a of the PDS 114a of the user is and how to reach it. Once the PDS 114a receives the access PDS data request, in step 332 the PDS 114a proceeds to validate the application/application client 106a permissions or PDAC information of the application/application client 106a. This is performed because the PDMC 112 can revoke/rescind access centrally to the application/application client 106a. Thus, validating the permissions of the application/application client 106a ensures that the exchange of personal data with the PDS 114a is in accordance with the governance rules/procedures of the PDM platform 102 or 202. This prevents any revoked or rescinded applications/application clients 106a from accessing the personal data of the PDS 114a that is not in accordance with the PDAC information of the application that has been approved by the data governance of the PDMC. In step 332, the PDS 114a sends a validate application permissions request to the PDMC 112 of the PDM platform 102 or 202, where the validate application permissions request includes the application/application client 106a identifier. The PDMC 112 determines whether the application/application client 106a is registered with the PDMC 112 and has not been rescinded or disabled since it was approved and registered with the PDMC 112. However, in this case, the rescinded application/application client 106a has been logged and/or registered as being revoked/rescinded and/or disabled. Thus, the PDMC 112 determines that the application/application client 106a has been rescinded/revoked. In step 334, the PDMC 112 sends a fail access response (e.g. an HTTP 400 message) to the PDS 114a. There is no payload to this message. The PDS 112a receives the fail access response message and is configured to immediately send a fail access denied response (e.g. an HTTP 400 message) to the rescinded application/application client 106a. The PDS 114a does not perform any access operations in relation to the PDS access request in step 331. The PDS data response in step 331 may also indicate that the rescinded application/application client 106a is not authorised to access the requested personal data of the PDS 114a. This may prompt the application/application client 106a to attempt to re-authorise itself with the PDS 114a using application authorisation process 302.

Figure 3B:
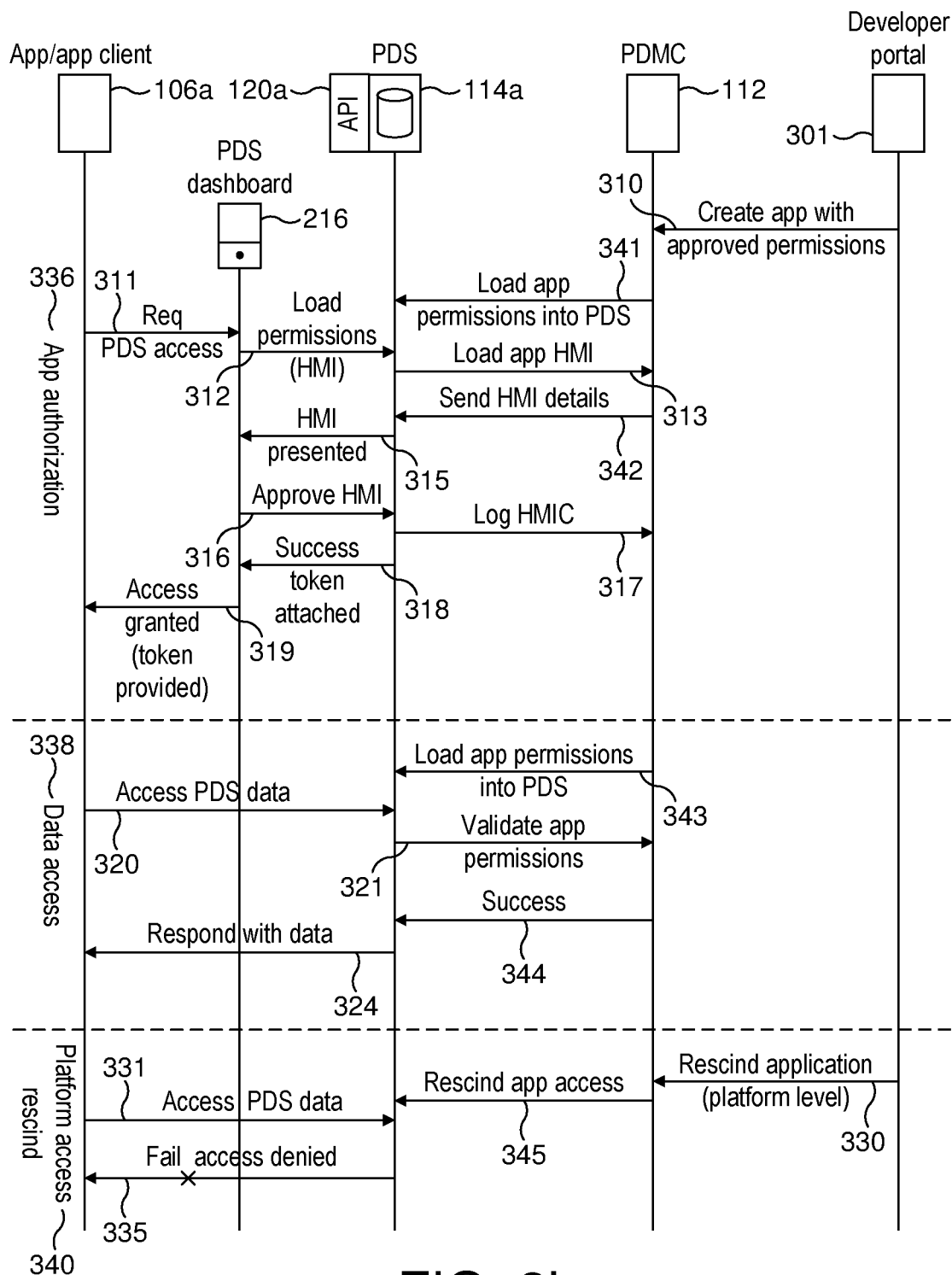
FIG. 3b is a signal flow diagram illustrating another example application authorisation process, another example data access process, another example platform access rescind process for use with the PDM platform according to some embodiments of the invention.

FIG. 3b is a signal flow diagram illustrating another example application authorisation process 336, another example data access process 338, and another platform access rescind process 340 which may be implemented for operating the PDM platforms 100 and/or 200 in some embodiments of the invention. In this example, application authorisation process 336 further modifies the application authorisation process 302 to enable the PDS 114a to handle more of the data processing when allowing applications to access personal data of the PDS 114a of the user. In this example, data access process 336 further modifies the data access process 304 to further reduce the load on the PDMC 112 when validating whether the application is registered with the PDM platform 102 and/or 202. In this example, platform access rescind process 340 further modifies the platform access rescind process 308 in a similar manner. In these examples, the reference numerals for steps of the previous process(es) 302, 304 and 306 that have not been modified have remained the same with the modified steps having different reference numerals. Thus, reference is made to the steps of the previous process(es) 302, 304 and 306 where applicable.

In FIG. 3b, the application authorisation process 336 includes the following steps of: after step 310 of process 302 in which an application/application client 106a is submitted for approval and registration with the PDMC 112, when the application has been approved and registered at the PDMC 112, in step 341 the PDMC 112 is configured to send or load the PDAC information or PDSI/HMI permissions into each PDS 114a or each of the plurality of PDSs 114a to 114l where each of the plurality of PDSs 114a-114l maintains a log or register of all the applications that have been approved and registered with the PDMC 112. This enables each PDS 114a to immediately have available the PDAC information for each application/application client 106a (e.g. PDSI/HMI details), such that the PDMC 112 does not need to send these details each time a PDS access request is performed by an application/application client 106a. The PDMC 112 instead, may send updates to the PDAC information (PDSI/HMI details) or permissions for each of the applications/application clients 106a when they change. After step 341, steps 311 to 313 may be normally performed as described in application authorisation process 302. In this case, it is assumed that the application/application client 106a is registered and approved, so that, in step 342, the PDMC 112 returns a response message (e.g. send PDSI/HMI details message) with the specific information that the PDS 114a may require to present to the user. Steps 315-319 are performed in the normal manner as described with reference to FIG. 3a and application authorisation process 302, except that after the user approves the application/application client 106a, between steps 316 and 318, the PDS 114a checks that the PDAC information (or PDSI/HMI permissions) of the application that were previously logged in step 341 are the same as the PDSI/HMI details (or PDAC information) of the application. If there is a match, then the PDS 114a reconfigures the API 120a according to the PDAC information of the application in the normal manner as described herein. Then steps 317 to 319 are performed as described with reference to application authorisation process 302 of FIG. 3a. However, if there is a mismatch, then the PDAC information of the application 106a previously logged in step 341, then the previously logged PDAC information may be replaced by the PDSI/HMI details or PDAC information provided to the PDS 114a in step 342. These may be used instead of the previously logged PDAC information of the application as these are more recent/current. Furthermore, the PDSI/HMI details of the application received in step 342 may replace the logged PDAC information of the application. Steps 317 to 319 may also be performed as described with reference to application authorisation process 302.

In FIG. 3b, the example data access process 338 further modifies the data access process 304 described with reference to FIG. 3a by including PDAC information updates associated with applications from the PDMC 112. The data access process 338 may include the following steps of: In step 338, the PDMC 112 is configured to send or load the PDAC information or PDSI/HMI permissions of updates to current applications approved by the PDMC 112 and/or new applications approved by the PDMC 112 into each PDS 114a or each of the plurality of PDSs 114a to 114l where each of the plurality of PDSs 114a-114l maintains a log or register of all the applications that have been approved and registered with the PDMC 112. This enables each PDS 114*a* to immediately have available the necessary and up-to-date PDAC information for each application/application client 106*a* (e.g. PDSI/HMI details), for example, in cases of communications network partitioning, such that the PDMC 112 does not need to send these details each time a PDS access request is performed. Step 343 may occur at any time when the PDMC 112 receives or updates its register in relation to new applications and/or updated PDAC information for current registered applications. Additionally or alternatively, the PDMC 112 may schedule these updates to load application permissions into the PDSs 114*a*-114*l* of each user according to a schedule. Thereafter, an application 106*a* may perform a PDS data access request as described in steps 320 and 321 of data access process 304. On receipt of the validate application permissions request from the PDS 114*a* of the user, the PDMC 112 of the PDM platform 102 or 202 determines whether the application/application client 106*a* is registered with the PDMC 112 and/or has not been rescinded or disabled since it was approved and registered with the PDMC 112. During the life of the application/application client 106*a*, the PDMC 112 may determine that the application/application client 106*a* does not satisfy the governance rules and/or data protection criteria of the governance process/procedure, so the PDMC 112 may disable or deregister the application/application client 106*a*. In this example, the application/application client 106*a* is registered with the PDMC 112 and has not been disabled or rescinded. In step 344, the PDMC 112 sends a success response (e.g. an HTTP 200 message) without any payload, because the PDS 114*a* is considered to have the current PDAC information of the application 106*a* from step 343 or from step 341. It is assumed that the PDMC 112 will always update the PDSs 114*a*-114*l* of the PDM platform 102 or 202 whenever there is a change to one or more existing registered applications or one or more new applications are approved and registered along with their PDAC information.

The PDS 112*a* receives the success response message and the PDS 112*a* performs the required access operations in relation to the access PDS data request in step 320 and, in step 324, sends a PDS data response message to the application/application client 106*a*. For example, if the access PDS data request in step 320 were a read request for specific personal data of the user from the PDS 114*a*, then the PDS 114*a* would retrieve and read the specific personal data of the user and include it in the PDS response message in step 324. For example, if the access PDS data request in step 320 were a write request for writing particular personal data of the user to the PDS 114*a*, then the API 120*a* of the PDS 114*a*, or the PDS 114 directly, would write the particular personal data of the user into the namespace of the application, and the PDS response message in step 324 would be confirmation that the write request was successful. Should the application/application client 106*a* not be registered with the PDMC 112 or has been disabled or rescinded, then in step 344, the PDMC 112 may instead send a fail response (e.g. an HTTP 400 message) without any payload, in which case the PDS 114*a* does not perform any of the requested access operations associated with the PDS data request of step 320, rather the PDS data response in step 324 indicates that the application/application client 106*a* is not authorised to access the requested personal data of the PDS 114*a*. This may take the form of a fail access denied message. This may require the application/application client 106*a* to re-authorise itself with the PDS 114*a* using application authorisation process(es) 302 or 336 and the like.

The platform access rescind process 340 of FIG. 3*b* may further modify the platform access rescind process 308 of FIG. 3*a* by not performing steps 332 or 334 for validating the application permissions (e.g. PDAC information) of the application/application client 106*a* with the PDMC 112. The platform access rescind process 340 may be modified to perform the following steps of: In step 330, where, during the life of one or more approved application(s)/application client(s) 106*a*, the PDMC 112 may determine that an application/application client 106*a* does not satisfy the governance rules and/or data protection criteria of the governance process/procedure, so the PDMC 112 may disable or deregister the application/application client 106*a* and/or rescind access of the application/application client 106*a*. This may also be prompted by the developer via the developer portal 301 as in step 330. Thus, in step 345, once the PDMC 112 disables or deregisters an application/application client 106*a* that is to be rescinded, the PDMC 112 may instead send a rescind application message to each of the PDSs 114*a*-114*l* that are registered as using or providing access to the rescinded application(s)/application client(s) 106*a*. The rescind application message may include a list of all the applications/application client(s) that have been rescinded, or simply include a list of those applications/application client(s) that have been recently rescinded. Step 345 may be performed each time an application/application client has been disabled and/or rescinded. An example rescind application message may include, without limitation, for example one or more application identifier(s) of the corresponding application(s)/application client(s) 106*a* that have been rescinded. On receiving the rescind application message from the PDMC 112, each of the PDSs 114*a*-114*l* may log and disable the corresponding one or more application(s)/application client(s) 106*a* indicated in the rescind application message. The PDS 114*a* may also reconfigure the API 120*a* of the PDS 114*a* to block the access of the rescinded application/application client 106*a* to the personal data of the PDS 114*a*.

Thus, in step 331, on receiving a PDS access request from a rescinded application/application client 106*a*, the PDS 114*a* does not need to check or validate with the PDMC 112 because it can determine immediately that the application/application client 106*a* has been disabled due to the logging of the rescind/revoke event in relation to the application/application client 106*a* and/or the reconfiguration of the API 120*a*, which has been reconfigured to block the application/application client 106*a* from access personal data of the PDS 114*a*. The PDS 114*a* determines that the application/application client 106*a* has been rescinded/revoked and sends, as in step 335, a fail access response message and is configured to immediately send a fail access denied response (e.g. an HTTP 400 message) to the rescinded application/application client 106*a*. The PDS 114*a* does not perform any access operations in relation to the PDS access request in step 331. The fail access denied response in step 335 may also indicate that the rescinded application/application client 106*a* is not authorised to access the requested personal data of the PDS 114*a*. This may prompt the application/application client 106*a* to attempt to re-authorise itself with the PDS 114*a* using application authorisation process 302. Should the application/application client 106*a* be approved again by the PDMC 112 and registered as approved, the PDMC 112 may perform steps 341 or 343 to update the PDSs 114*a*-1141, which would update their corresponding logs and PDAC information associated with the approved application/application client 106*a*. The application/application client 106*a* may then resume to perform data access process(es) 304 or 338 and the like.

Figure 3C:
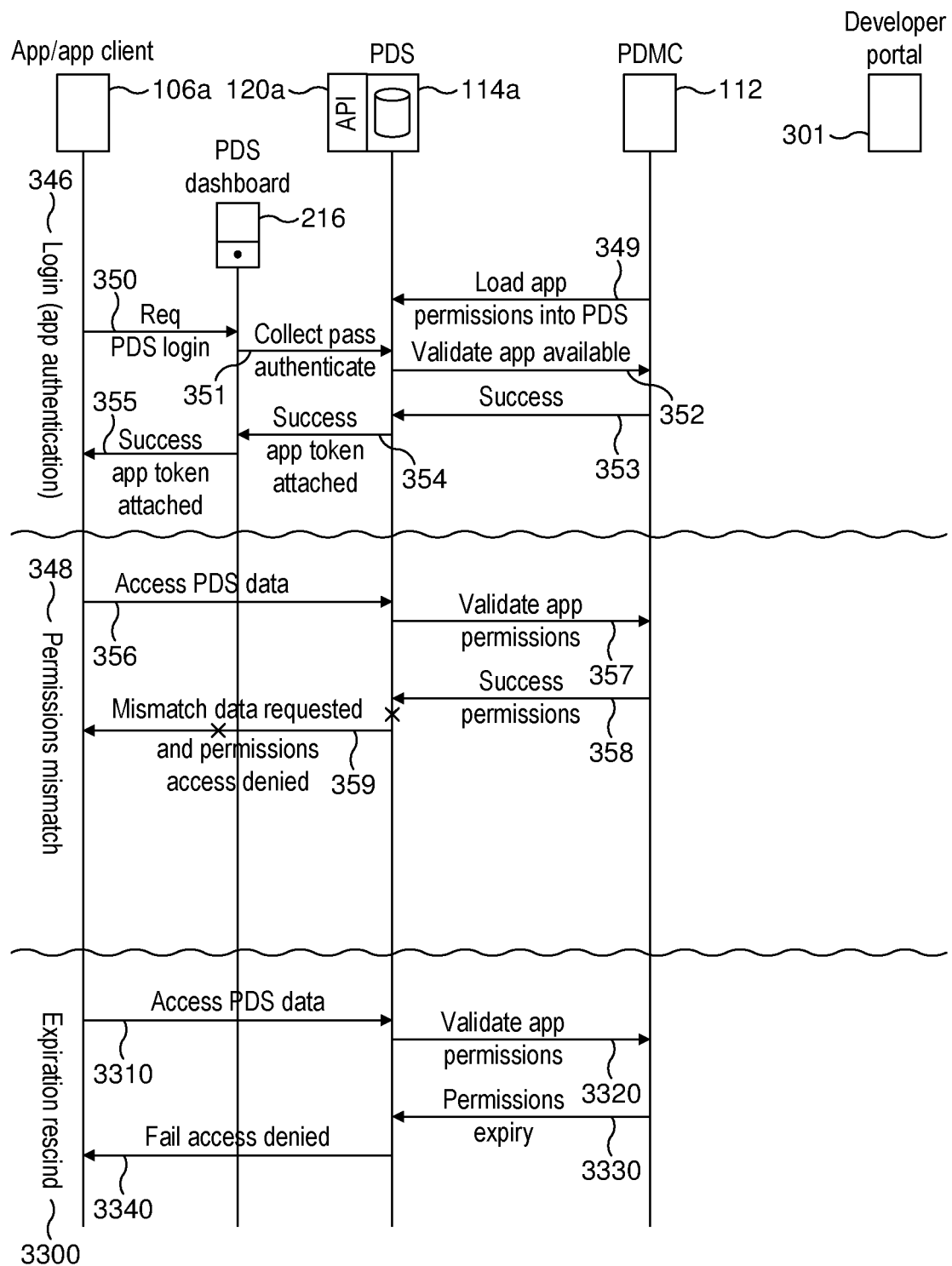
FIG. 3c is a signal flow diagram illustrating an example application authentication/authorisation process, a further example data access process, and another application rescind process for use with the PDM platform according to some embodiments of the invention.

FIG. 3*c* is a signal flow diagram illustrating a further example application authentication process 346, a further example data access process 348, and an example expiration rescind process 3300 according to some embodiments of the invention. The application authentication process 346 is based on application authorisation process(es) 302 and 332 of FIGS. 3*a* and 3*b*, which have been further modified to remove the load on the PDMC 112 and efficiently improves the scalability of the PDM platforms 100 and/or 200. The data access process 348 is based on the data access process(es) 304 and 338 described with reference to FIGS. 3*a* and 3*b* and describes the situation when a mismatch in PDAC information between the PDS 114*a* and PDMC 112 occurs due to changes that may have been made to an application/application client 106*a* after the application/application client 106*a* has been authorised by the user of the PDS 114*a* for accessing personal data of the PDS 114*a*.

In FIG. 3*c*, the example application authentication process 346 for an application and associated application client 106*a* to be authorised/authenticated access to personal data of the PDS 114*a* of the user may include the following steps of: Once an application (and/or application client 106*a*) has been approved and registered by one or more services within the PDMC 112 (e.g. as in step 310 of FIG. 3*a* or 3*b*), in step 349 the PDMC 112 is configured to send or load the PDAC information of the approved/registered application(s) or PDSI/HMI permissions of the approved/registered applications into each PDS 114*a* or each of the plurality of PDSs 114*a* to 114*l* where each of the plurality of PDSs 114*a*-114*l* maintains a log or register of all the applications that have been approved and registered with the PDMC 112. Further the registered PDAC information/PDSI/HMI details of an application may include application ID and redirect URI of the application, which may be part of the registered PDAC information of the application that is registered by the PDMC 112 when the application is approved. This enables each PDS 114*a* to immediately have available the PDAC information for each application/application client 106*a* (e.g. PDSI/HMI details) that has been registered with the PDMC 112. This means that the PDMC 112 does not need to send these details each time a PDS access request is performed by an application/application client 106*a*. The PDMC 112 instead, may send updates to the PDAC information (PDSI/HMI details) or permissions for each of the applications/application clients 106*a* when they change (e.g. see step 343 of FIG. 3*b*). The PDS 114*a* of the user may thus perform checks between any information received by the application and the registered PDAC information logged by the PDS 114*a* of the user.

After step 349, the user of PDS 114*a* may have installed the application client 106*a* on their personal device and/or other computing device or cloud service and wishes to use the application client 106*a*. For example, the application client 106*a* may be executing on the user's device, a browser, on desktop or any other way determined by the developer. The applications may be, without limitation, for example desktop applications, mobile applications, web applications, backend applications and/or any other application or node that requests access to the PDS 114*a*. Alternatively or additionally, the user of PDS 114*a* may have accessed the PDS dashboard 216 and selected one or more applications approved by the PDMC 112 for use in accessing personal data of the user from PDS 114*a*. Once the user has installed the application client 106*a* on a personal device or is using the application/application client 106*a* for the first time, in step 350 the application client 106*a* sends a request for PDS login/authentication/authorisation, which is a request to authenticate the application and authorise the application to access specific personal data within the PDS 114*a* of the user in accordance with the PDAC information of the application, which may be required for the application client 106*a* to operate and provide required application services to the user of PDS 114*a*. In the request, the application client 106*a* also provides the application identifier associated with the application/application client 106*a*. This is performed by redirecting the web client to the PDS dashboard 216.

Prior to requesting access to the PDS 114*a* of the user in step 311, the application client 106*a* may have requested the user to input, without limitation, for example the username, PDA username, domain name or other identifying data that enables the application client 106*a* to determine the address/domain name of the PDS 114*a* of the user so it may contact the PDS 114*a* of the user as described with reference to steps 311 and/or 312 of FIG. 3*a*. For example, when the user registers a PDA from PDM platform 102 or 202, then a PDA username is created for the PDA and a corresponding PDS of the user is created and provisioned. The PDS is provided with a PDS domain name that may be based on the PDA username and hence the application may be able to determine the address/domain name of the PDS 114*a* of the user based on the PDA username.

Thus, in step 350 the application client 106*a* requests PDS login and access to specific personal data within the PDS 114*a* of the user that is required for the application client 106*a* to operate and provide required application services to the user of PDS 114*a*. Thus, the application requires authentication. This is performed by redirecting the web client to the PDS dashboard 216. The PDS dashboard 216 is configured to display or show the user the type of access to personal data of the PDS 114*a* that the application/application client 106*a* is requesting. This is in order to enable the user to make a decision to approve and/or authorise the application/application client 106*a* access to the PDS 114*a* of the user.

For example, step 350 is typically performed via a redirect from the application/application client to the "PDS Dashboard" 216 controlled by the PDS 114*a* of the user itself. The redirect process may be based on, by way of example only but not limited to, the OAuth standard, which can ensure that authorisation and authentication steps are performed through an interface controlled by the users (or PDS 114*a* of the user) leading to improved security guarantees for the user. Information that needs to be transferred in the request PDS login and access or authentication redirect of step 350 by the application/application client includes, without limitation, for example "application ID" and a "redirect universal resource indicator (URI)". Internally, i.e. steps 351-353, the PDS 114*a* of the user will check the application ID and redirect URI against application information registered in the PDMC 112, which may be included in the PDAC information logged by the PDS 114*a* in step 349. If these records match, a new personal data access token is created and returned to the "redirect URI" in steps 354-355. If the "redirect URI" used does not match the records of the logged by the PDS 114*a*, then an error may be flagged up as suspicious behaviour directly to the user in the PDS Dashboard 216, where the redirect back to application/application client is not performed in that case.

Thus, as an option, once the logged registered PDAC information/PDSI/HMI details of the application is retrieved from the PDS 114a of the user, the PDS 114a of the user may check the application ID and redirect URI against the application information registered in the PDMC 112 and logged by the PDS 114a of the user in step 349. If these records match those received from the application, the PDS 114a may proceed with the authentication process 346. Otherwise, an error may be flagged up as suspicious behaviour directly to the user in the PDS Dashboard 216 and authentication process 346 may terminate.

The PDS dashboard 216 may present or display to the user the personal data access control information (e.g. PDS instructions such as HAT Microservers instructions (PDSI/HMI)) of the application/application client 106a. In this example the personal data access control information (PDAC) is based on PDSI/HMI. Thus, the PDS dashboard 216 may retrieve the logged PDAC information associated with the application/application client 106a (e.g. logged in step 349) so that it can present or display the PDAC information to the user to enable the user to decide/determine whether or not to allow the application/application client 106a to access and/or store personal data of the user in PDS 114a. The PDS dashboard may present the PDSI/HMI details (or PDAC information) with permissions to the user, so the user can investigate the kind of permissions/instructions/rules that the user will be granting to the application/application client 106a (i.e. a third party application). In this example, the PDSI/HMI of the application 106a is approved by the user (e.g. the user clicks a approve button or OK button on the PDS Dashboard 216), and in step 351, the PDS dashboard 216 sends a request for collecting a pass or token for authenticating the application to the PDS 114a.

In step 352, the PDS 114a sends a validate application available request to the PDMC 112 of the PDM platform 102 or 202 to determine whether the application is available for use with the PDS 114a. The validate application available request may also include, without limitation, for example, a digital PDSI/HMI contract, logged by the PDS 114a, of the user agreeing to allow the application/application client 106a access to the PDS 114a according to the PDSI/HMI of the application/application client 106a. This allows the PDMC 112 to also register the digital PDSI/HMI contract representing the user of the PDS 114a agreeing to allow the application/application client 106a access to the PDS 114a of the user. The PDMC 112 may also log the PDSI/HMI contract between the user and the application/application client 106a. The validate application available request is useful as it may be that the application has been disabled or deregistered, which has not yet been communicated to the PDS 114a of the user, so its log of the PDAC information of the application may be out of date. The validate application available request may further include, without limitation, for example the application/application client 106a identifier. The PDMC 112 determines whether the application/application client 106a is registered with the PDMC 112 and has not been rescinded or disabled since it was approved and registered with the PDMC 112. During the life of the application/application client 106a, the PDMC 112 may determine that the application/application client 106a does not satisfy the governance rules and/or data protection criteria of the governance process/procedure, so the PDMC 112 may disable or deregister the application/application client 106a. In this example, the application/application client 106a is registered with the PDMC 112 and has not been disabled or rescinded. The PDMC 112 logs the user or PDS 114a of the user as allowing the application access to the personal data of the PDS 114a. In step 353, the PDMC 112 sends a success response (e.g. an HTTP 200 message) indicating that the application/application client 106a is available and approved for use in accessing personal data of the PDS 114a of the user.

Given that the PDSI/HMI of the application (or PDAC information of the application 106a) is approved by the user (e.g. the user clicks a approve button or OK button on the PDS Dashboard 216), the PDS 114a loads the logged PDAC information or PDSI/HMI details of the application to the API 120a i.e. reconfigures the API 120a of the PDS 114a based on the PDSI/HMI of the application/application client 106a. For example, the PDSI/HMI (or PDAC information) may include, without limitation, for example a set of rules, instructions and/or permissions, which may be executed by the API 120a to enable the application/application client 106a access to and/or store personal data of the user in the PDS 114a according to the PDSI/HMI of the application/application client 106a. The PDSI/HMI may include various rules associated with accessing personal data of the user from the PDS 114a which provides the API 120a with the capability to specify which fields of the personal data can be accessed, so specific granular fields of personal data may be accessed by the application/application client 106a. The PDSI/HMI associated with the application/application client 106a may be executed by the API 120a during access requests from the application/application client 106a. The reconfigurability of the API 120a allows specific portions of personal data of the user to be accessed by an application/application client 106a according to the PDSI/HMI of the application/application client 106a.

In step 354, the PDS 114a sends to the PDS Dashboard 216 a success response with a access pass or token attached (e.g. a personal data access token), where the application/application client 106a is configured to use the received personal data access token for accessing the personal data of the PDS 114a in accordance with the PDSI/HMI of the application/application client 106a. As described previously, the skilled person would appreciate that any suitable type of token may be used for the personal data access token such as, without limitation, for example an AUTH token based on an Open Authorisation (OAuth) 2 or AUTH0 protocol, JavaScript Object Notation (JSON) Web Token or JWT tokens, and/or any other type of access token/protocol and the like, and/or as the application demands. The personal data access token may be attached to the PDSI/HMI of the application/application client 106a and cannot be used for accessing any other personal data of the user from PDS 114a. The personal data access token may also include data representative of the user name, domain name, PDS identifier, endpoint of the API 120a associated with the application, and/or IP address of the PDS 114a of the user on the communication network or PDM platform 102 or 202. This enables the application/application client 106a to direct data access requests directly to the API 120a of the PDS 114a of the user when accessing personal data on the PDS 114a according to the PDAC information (or PDSI/HMI) of the application/application client 106a. Thus, the application/application client 106a may use the personal data access token during an access request for accessing/storing personal data of the user at the PDS 114a in accordance with the PDSI/HMI of the application/application client 106a. In step 355, the PDS Dashboard or web server 216 (e.g. a browser) sends an access grant message with the personal data access token attached or as payload, where the application/application client 106a may use the personal data access token for accessing the personal data of the PDS 114a in accordance with the PDSI/HMI of the application.

Once the application authorisation process 346 has completed and an application/application client 106*a* has been authorised by the user to access and store personal data of the user in PDS 114*a*, the application/application client 106*a* may perform the data access process 304, 338, and/or 348, modifications thereof combinations thereto and the like (e.g. Data Debit process) in accordance with the PDAC information (e.g. PDSI/HMI) of the application/application client 106*a*. The user may also perform, at some point in time, a user access rescind process 306 for rescinding access from the application/application client 106*a* to PDS 114*a* of the user. In addition, the PDMC or even an application developer may perform, at some point in time, a platform rescind process(es) 308, 340 and/or modifications thereof and/or combinations thereto and the like for rescinding access from the application/application client 106*a* to PDS 114*a* of the user.

In FIG. 3*c*, the example data access process 348 illustrates what may occur when there is a permissions mismatch of PDAC information of an application between the PDS 114*a* and the PDMC 112. This is typically because the PDAC information of the application may have been updated by the developer and this has been approved and registered by the PDMC 112, or the PDMC 112 or application developer have rescinded the application. In any event, each PDS 114*a* of the plurality of PDSs 114*a*-114*l* may immediately have available the necessary and up-to-date PDAC information for each application/application client 106*a* (e.g. PDSI/HMI details), which is provided in regular updates by the PDMC 112. For example, as in data access process 338, step 343 may occur when the PDMC 112 receives or updates its register in relation to new applications and/or updated PDAC information for current registered applications. Additionally or alternatively, the PDMC 112 may schedule these updates to load application permissions into the PDSs 114*a*-114*l* of each user according to a schedule. The data access process 348 may include the following steps of: in step 356 an application 106*a* may send a PDS data access request (e.g. as described in steps 320 and 321 of data access process 304 or 338 of FIGS. 3*a* and 3*b*) to the PDS 114*a* of the user.

In step 357, the PDS 114*a* sends a validate application permissions request to the PDMC 112 of the PDM platform 102 or 202, where the validate application permissions request includes the application/application client 106*a* identifier. The PDMC 112 determines whether the application/application client 106*a* is registered with the PDMC 112 and has not been rescinded or disabled since it was approved and registered with the PDMC 112 as described with reference to process(es) 304 and 338 with respect to FIGS. 3*a* and 3*b*. During the life of the application/application client 106*a*, the PDMC 112 may determine that the application/application client 106*a* does not satisfy the governance rules and/or data protection criteria of the governance process/procedure, so the PDMC 112 may disable or deregister the application/application client 106*a*. In this example, although the application/application client 106*a* is registered with the PDMC 112 the PDAC information of the application 106*a* has changed, but the PDS 114*a* of the user has not yet received an update from the PDMC 112. In step 358, the PDMC 112 sends a success response (e.g. an HTTP 200 message) with a payload containing the current PDAC information or PDSI/HMI details of the application/application client 106*a* that is registered at the PDMC 112. This is because the developer may change or update the application/application client 106*a*, which the PDMC 112 may update. Which is assumed to have occurred in this example. Essentially this means that the application/application client 106*a* should re-authorise its access to the PDS 114*a*. That is, the application/application client 106*a* to re-authorise itself with the PDS 114*a* using application authorisation process(es) 302, 336, and/or 346 and the like. However, the following steps describe that the PDS 114*a* can prompt the application/application client 106*a* to do this by denying the PDS data request of the application to the PDS 114*a* of the user.

The PDS 114*a* receives the success response message and the current PDAC information (e.g. PDSI/HMI details and/or permissions) of the application. Given that the PDS 114*a* includes a log of the PDAC information associated with a plurality of applications received from updates and/or notifications from the PDMC 122 (e.g. see steps 349, 341, 343 as described with reference to FIGS. 3*c* and/or 3*b*), the PDS 114*a* may compare the PDAC information with the currently received PDAC information and determine that there is a mismatch due to the current PDAC information changing based on a change in the application/application client 106*a*. In this case, the PDS data request of the application/application client 106*a* may be requesting a portion of personal data of the user of PDS 114*a* that is not allowed based on the previous PDAC information that the PDS has stored in its log. This means that the PDS 114*a* should not provide access to the application/application client 106*a* because the user of the PDS 114*a* may not have agreed to allow the application/application client to access such data. In this case the PDS 114*a* does not perform the required access operations in relation to the access PDS data request in step 356 and, in step 359, sends an PDS data response message to the application/application client 106*a* indicating that there is a mismatch in the PDMC information, and hence in the data requested, and that the permissions and access to the PDS 114*a* is denied. Alternatively or additionally, the PDS 114*a* may send a fail response message (e.g. an HTTP 400 message) indicating the application/application client 106*a* is denied access to the PDS 114*a* of the user. This may require the application/application client 106*a* to re-authorise itself with the PDS 114*a* using application authorisation process(es) 302, 336, and/or 346 and the like.

Additionally or alternatively, should the application/application client 106*a* not be registered with the PDMC 112 or has been disabled or rescinded, then in step 358, the PDMC 112 may instead send a fail response (e.g. an HTTP 400 message) without any payload, in which case the PDS 114*a* does not perform any of the requested access operations associated with the PDS data request of step 359, rather the PDS data response in step 359 indicates that the application/application client 106*a* is not authorised to access the requested personal data of the PDS 114*a*. This may take the form of a fail access denied message. This may require the application/application client 106*a* to re-authorise itself with the PDS 114*a* using application authorisation process(es) 302, 336, and/or 346 and the like.

In FIG. 3*c*, the example expiration rescind process 3300 illustrates what may occur when there is an expiry time limit/period associated with an application's authorisation to access and store personal data in the PDS 114*a* of user 109*a*. Typically, the PDSI/HMIC/HMI details or PADC information of the application may include an expiry time limit or time period in which the authorisation given to the application to access the PDS 114*a* of the user lapses or expires, after which the application/application client 106*a* should be denied access to personal data of the PDS 114*a* of the user. Thus, when the user authorises an application access to personal data of the PDS 114*a* of the user, then the user may be provided with PDSI/HMIC/HMI details/PDAC information including, without limitation, for example an expiry date, time period or contract validity period parameter. When the user approves and authorises the application, the user and application have entered into an agreement that the authorisation will be valid for a certain period of time associated with the expiry date, time period or contract validity period parameter. Thus, another reason for denying access to an application/application client may include expiration of the time period/contract validity period parameter. The application's authorisation to access personal data of the PDS 114a of the user may be rescinded and/or revoked.

The expiration rescind process 3300 may include the following steps of: in step 3310 an application/application client 106a may send a PDS data access request (e.g. as described in steps 320 and 321 of data access process 304 or 338 of FIGS. 3a and 3b) to the PDS 114a of the user. In step 3320, the PDS 114a sends a validate application permissions request to the PDMC 112 of the PDM platform 102 or 202, where the validate application permissions request includes at least the application/application client 106a identifier. The PDMC 112 determines whether the application/application client 106a is registered with the PDMC 112 and has not been rescinded or disabled since it was approved and registered with the PDMC 112 as described with reference to process(es) 304 and 338 with respect to FIGS. 3a and 3b. During the life of the application/application client 106a, the PDMC 112 may determine that the application/application client 106a does not satisfy the governance rules and/or data protection criteria of the governance process/procedure, so the PDMC 112 may disable or deregister the application/application client 106a. In this example, the application/application client 106a is registered with the PDMC 112, but the PDAC information of the application 106a includes an expiry time, expiry time period, or contract validity period parameter. In step 3330, the PDMC 112 sends a success response (e.g. an HTTP 200 message) with a payload containing the current PDAC information or HMI details of the application/application client 106a that is registered at the PDMC 112, the PDAC information includes data representative of an expiry time, expiry time period, or contract validity period parameter defining the period of time that the application may be authorised access to personal data of the PDS 114a. Essentially, if expiration has occurred, then this means that the application/application client 106a should re-authorise its access to the PDS 114a— i.e. agree on another time period with the user. That is, the application/application client 106a to re-authorise itself with the PDS 114a using application authorisation/authentication process(es) 302, 336, and/or 346 and the like. However, the following steps describe that the PDS 114a can prompt the application/application client 106a to do this by denying the PDS data request of the application to the PDS 114a of the user.

Once the PDS 114a receives the success response message and the current PDAC information (e.g. PDSI/HMI details and/or permissions) of the application including data representative of the expiry time, expiry time period, or contract validity period parameter defining the period of time that the application may be authorised access to personal data of the PDS 114a, the PDS 114a may internally check the date of the contract signature and if the validity of the application authorisation has lapsed. For example, The PDS 114a may calculate when the expiry of the time period/contact validity occurs and determine whether the application's authorisation (e.g. PDSI/HMIC) to access personal data of the PDS has occurred. When the validity or time period of the application authorisation has lapsed or expired, then, in step 3340, the PDS 114a may revoke/rescind access to the application by sending a revoke/rescind access request or notification to application. This means that the PDS 114a should not provide access to the application/application client 106a because the user of the PDS 114a may not have agreed to allow the application/application client to access such data when the time period expires. In this case the PDS 114a does not perform the required access operations in relation to the access PDS data request in step 3310 and, in step 3340, sends an PDS data response message (or fail access denied message) to the application/application client 106a indicating that the authorisation has expired or revoked/rescinded, and hence in the data requested, and that the permissions and access to the PDS 114a is denied. Alternatively or additionally, the PDS 114a may send a fail response message (e.g. an HTTP 400 message) indicating the application/application client 106a is denied access to the PDS 114a of the user. This may require the application/application client 106a to re-authorise itself with the PDS 114a using application authorisation process(es) 302, 336, and/or 346 and the like. Optionally, the revoke/rescind access request may be sent to the PDMC 112 to inform the PDMC 112 of the revocation/rescind event associated with the application for logging purposes. As well, the PDS 114a may log the revocation/rescind event in its own register/log files.

The PDS 114a may also disable/reconfigure the endpoints/components of the API of the PDS 114a associated with providing the revoked application personal data access so that the application cannot access the PDS 114a. The PDS 114a may be configured to retain the personal data of the user stored in the PDS. The application 106a may request to be permitted to access the PDS 114a of a user for another time period or indefinitely and the like by going through the application authorisation/authentication process(es) 302, 311, and/or 346 again before gaining access to the PDS of a user.

Figure 3D:
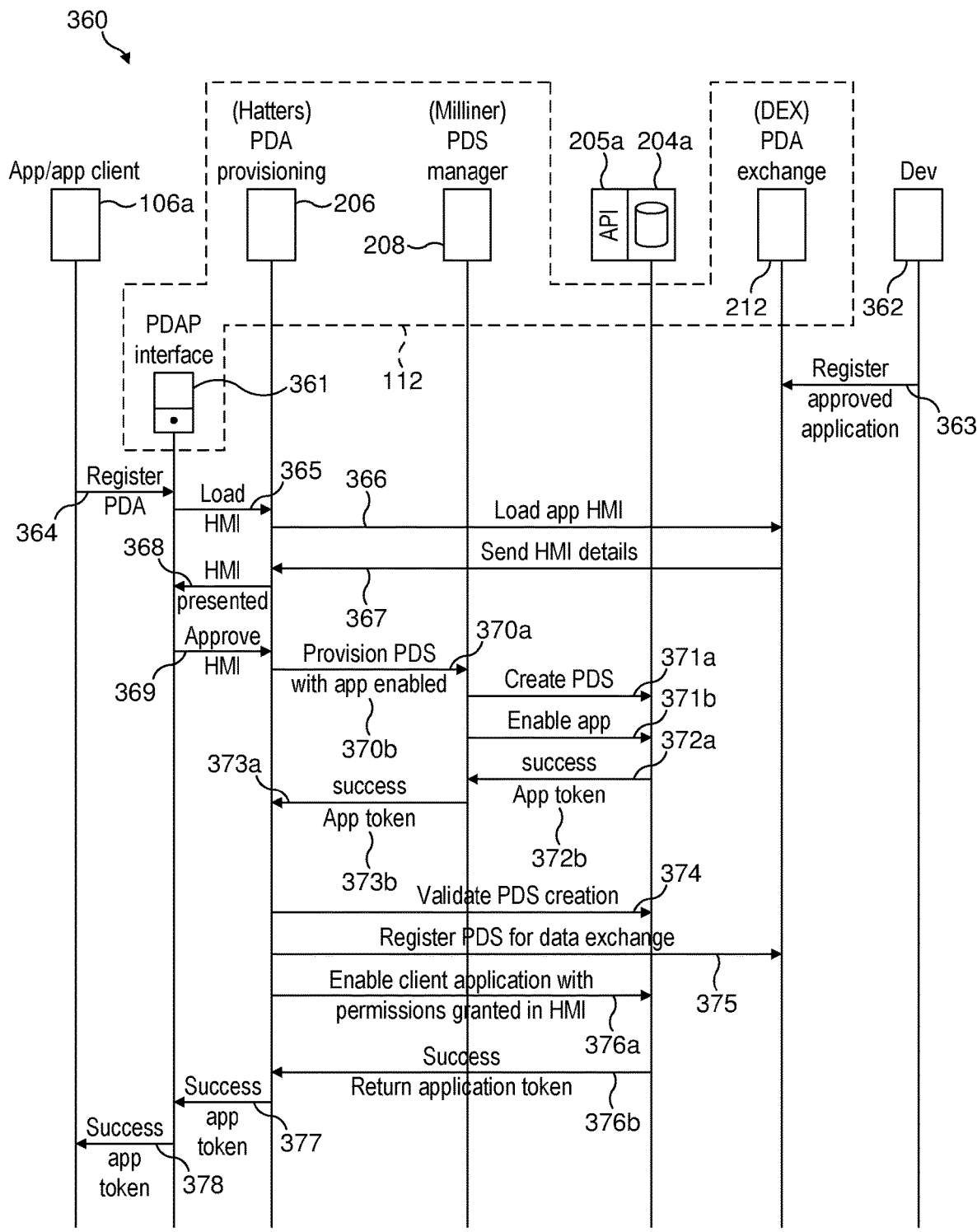
FIG. 3d is a signal flow diagram illustrating an example PDS provisioning process for use with the PDM platform according to some embodiments of the invention.

FIG. 3d is a signal flow diagram illustrating a provisioning process of a PDS for a user of the PDM platform 102 or 202 as described with reference to FIG. 1a and 2a according to some embodiments of the invention. FIG. 1a to 3c assumed that the PDSs 114a-114l of the plurality of users 109a-109l had already been set up for each user and provisioned for each user. However, given that each of the plurality of PDSs 114a-114l are entities that are provisioned from cloud-computing platforms, it may be unclear how users 109a-109l may acquire such a PDS 114a for each user to being storing their personal data generated by themselves and/or one or more of the plurality of applications/application clients 106a-106n, 108a-108m and the like. In essence, a user may be provisioned a PDS 114a by requesting one from a web site or web server such as the PDS dashboard 216 or a PDAP interface of the PDM platform 102 or 202 and the like. This requires a user to be proactive in determining that they require a PDS 114a as described in the examples here. Alternatively or additionally, one or more applications/application clients of the plurality of applications 106a-106n may be configured to determine whether a user requires a PDS when the user subscribes and/or installs the application client of the application on their user device, or when the user logins in to an application service provided on a cloud computing platform and the like. One or more of the plurality of applications 106a-106n may be configured to only access and store personal data of a user on a PDS assigned to the user. Thus, each application may be configured to comply with only storing and accessing personal data of the employee in the PDS of the employee as described with reference to FIGS. 1a to 3c and 3e to 5. If a plurality of applications or the majority or all applications available comply with this condition of only storing and/or accessing personal data of the user in the PDS of the user, then this should substantially reduce the unnecessary duplication of having personal data of the user stored by each individual application and/or application provider/data provider. Rather, according to some embodiments of the invention, the user can control access and storage of their personal data using a PDS assigned to the user by making or only agreeing with applications that comply with a certain standard of data protection criteria and/or handling of data.

For example, this may be extended to corporate entities, where users are employees and a PDS is assigned to each employee of the plurality of employees of the corporate entity. Each PDS is configured for enabling applications or enterprise applications (e.g. HR applications, payroll applications and the like) to access and/or store personal data (e.g. identify of the employee, phone numbers, contact details, family details, payroll information of the employee) of the employee in the PDS of the employee. Thus, as described herein, the employee controls what applications may access and/or store personal data of the employee in the PDS of the employee. Thus, each application may comply with only storing and accessing personal data of the employee in the PDS of the employee as described with reference to FIGS. 1a to 3c and 3e to 5.

For example, each user may be assigned a PDS in which each PDS is configured for enabling those applications that comply with certain data protection criteria and/or data handling criteria (e.g. only storing personal data of the user in the PDS of the user) that may be governed by the PDM platform 102 or 202 and the like and/or as described herein with reference to FIGS. 1a to 5. There are many applications such as, without limitation, social media applications, gaming applications, productivity applications, finance applications, banking applications, enterprise applications (e.g. HR applications, payroll applications and the like), media applications, multi-media applications, content applications/sources/providers, and any other application, each of which may be required to access and/or store personal data of the user (e.g. identify of the user, phone numbers, contact details, banking details, family details, payroll information of the employee). If all of these applications were configured to only store personal data generated by the application of the user and/or personal data provided by the user to the application in the PDS of the user, and if all of these applications were configured to have permissioned access to personal data of the user in the PDS of the user, then the user would become a data controller in control of their personal data. This also reduces the amount of redundancy, duplication, and data protection technologies required for storing and accessing personal data of the user. Thus, each application may comply with only storing and accessing personal data of the user in the PDS of the user when the user agrees to allow the application access to the PDS of the user based on the PDAC information of the application as described with reference to FIGS. 1a to 5.

Referring to FIG. 3d, the example provisioning process 360 of a PDS for a user of the PDM platform 102 or 202 as described with reference to FIGS. 1a and 2a according to some embodiments of the invention. In this case, it is assumed that the user initially does not have a PDS 204a (or 114a of FIG. 1). In this example, several service components of the PDM platform 102 or 202 are illustrated. The PDM platform 102 or 202 includes a PDMC 112 connected to a plurality of PDSs (not shown) of a plurality of users (not shown) and a plurality of applications/application clients 106a-106n. In this example, some of the service components of the PDMC 112 include a PDS provisioning server 206 (e.g. HATTERS), a PDS manager 208 (e.g. MILLINER), and a PDS exchange 212 (e.g. DEX) and a PDAP interface 361, which are in communication or communicatively coupled together. The PDMC 112 may also include a developer portal 362 for receiving applications for approval and registration of application as described herein with respect to FIGS. 3a to 3c. In this case, the PDS 204a and API 205a of the PDS 204a for a user have not been created yet. The provisioning process 360 of a PDS 204a of the user may include the following steps of: In step 363, a request for registration and approval of an application/application client 106a is provided via the developer portal 362 from an application developer of the application/application client 106a. Step 363 may be based on step 310 as described with reference to FIGS. 3a to 3c. The application developer may also submit with the application personal data access control information (e.g. PDSI/HMI details) that defines how the application/application client 106a handles personal data of a user. The PDA exchange component 212 receives the request to register the application/application client 106a of the application developer and performs a governance procedure to determine whether the PDAC information (e.g. PDSI/HMI details) of the application/application client 106a meets the data protection and handling criteria/standards (e.g. GDPR regulation standard data protection) set by the PDM platform 102 or 202 for registration and/or approval. It is assumed in this case that the application/application client 106a and the PDAC information (e.g. PDSI/HMI) of the application/application client meets the data protection/handling criteria and are registered as approved by the PDA exchange component 212. Once approval is met the application/application client 106a may be installed on a user device of a user and/or provided as an application server to a user and the like. In such cases, the application/application client 106a is configured to request from the user, for example on first use of the application/application client 106a, a user name and/or PDS name of the PDS of the user. If the user has a user name and/or PDS name, then the user has a PDS and thus the application/application client 106a may proceed based on application authorisation process(es) 302, 336 and/or 346 as described with reference to FIGS. 3a to 3c. However, if the user does not have a user name and/or PDS name, i.e. the user is not an owner of a PDS, then, in step 364, the application/application client 106a may request registration of a personal data account (PDA) for the user, in which a PDS is provisioned to the user, for use in accessing and storing personal data of the user in the PDS. The application/application client 106a may be configured to only use the PDS of the user for storing personal data of the user, and only use the PDS of the user for accessing personal data of the user based on the PDAC information of the application/application client 106a. The request to register a PDA for the user may be sent to a PDAP interface 361 of the PDMC 112, which is a web interface that may be presented to the user on their user device, which enables the user to enter a user name and/or PDS name and the like for use in generating a unique PDS identifier for the PDS of the user. In step 365, the PDAP interface 361 is configured to send a load application PDSI/HMI request (or load PDAC information of the application) to the PDA provisioning service 206, which is involved in provisioning PDAs/PDSs to users. In step 366, the PDA provisioning service 206 may forward the load application PDSI/HMI request or send another load application PDSI/HMI request to the PDA exchange component 212. The PDA exchange component 212 checks its register and determines that the application/application client 106a was registered and approved. If the application/application client 106a was not registered and approved by the PDM platform 102 or 202, then the provisioning process 360 may exit or be configured to inform the user, via the PDAP interface 361, that the application/application client 106a is unable to request creation of a PDA or PDS for the user. This may prompt the user to use another application. This may prompt the developer of the application to register the application/application client 106a with the PDA exchange component 212. In step 267, the PDA exchange component 212 sends the PDSI/HMI details of the application/application client 106a (e.g. data representative of PDAC information of the application/application client 106a) to the PDA provisioning service 206. In step 368, the PDA provisioning service 206 provides the PDSI/HMI details of the application to the PDAP interface for presentation to the user. The PDSI/HMI details are presented to the user and the user may investigate how the application/application client 106a handles personal data and whether the user agrees with how the application/application client 106a handles personal data of users. For example see, steps 315-316 of FIGS. 3a to 3b for further details in which the PDS Dashboard 216 presents PDSI/HMI details to the user for approval. In this case, the application/application client 106a has been registered and approved by the PDA exchange component 212 and the user approves of the PDSI/HMI details of the application/application client 106a (or the PDAC information of the application/application client 106a). The PDSI/HMI details/PDAC information of an application governs or defines how the application/application client 106a handles personal data of users. If the user approves (e.g. the user presses a confirmation button and the like) then, in step 369, the PDAP interface 361 sends an HMI approve response to the PDA provisioning service 206. The PDSI/HMI approve response may include user name and/or PDS name chosen by the user and/or data for generating a unique user name and/or PDS name and the like for enabling applications to identify the PDS of the user on the communication network.

In step 370a, the PDA provisioning service sends a provision PDS command to the PDS manager 208 (e.g. MILLINER). Optionally, in step 370b, the provision PDS command may include data representative of enabling the application/application client 106a to have access to the PDS of the user once created. This may include PDSI/HMI details/PDAC information of the application/application client 106a, which may be used to configure the API of the PDS of the user to permit the application to access and store personal data of the user on the PDS of the user (once created). Once created, the application/application client 106a may perform data access process(es) 304, 338, 348 as described with reference to FIGS. 3a to 3c.

In step 371a, the PDS manager instructs the provisioning infrastructure (e.g. AWS infrastructure or any other cloud based infrastructure) with a create PDS request to create a PDS 204a for the user with a unique PDS identifier/name that will enable application/application client 106a or other applications to identify and connect to the API 205a of the PDS 204a over a communication network. As an option, in step 371b, the create PDS request includes data representative of enabling the application/application client 106a to have access to the PDS of the user once created. This may include PDSI/HMI details/PDAC information of the application/application client 106a, which may be used by the cloud-based infrastructure to configure the API 205a of the PDS 204a of the user to permit the application 106a to access and store personal data of the user on the PDS of the user. This may avoid the requirement that the application/application client 106a has to perform the application authorisation process(es) 302, 336 and/or 346 as described with reference to FIGS. 3a to 3c. In step 372a, a success response (e.g. HTTP 200 response) may be sent from the PDS 205a to the PDS manager 208. As an option, in step 372b the success response may include data representative of the personal data access token of the application/application client 106a. In step 372b, once the PDS 205a of the user is created, the application token or personal data access token of the application/application client 106a may be created by the PDS 205a that may be provided to the application/application client 106a for use by the application/application client 106a in accessing the PDS 205a of the user as described with reference to FIGS. 3a to 3c. In step 373a, the received success response (e.g. HTTP 200 response) may be forwarded or sent from the PDS manager 208 to the PDA provisioning 208. As an option, in step 373b the success response may include data representative of the personal data access token of the application/application client 106a. Once the PDA provisioning service 206 receives the success response in relation to successful creation of PDS 204a of the user, in step 374, the PDA provisioning service 206 sends a PDS creation comment (or PDS validity check) to the PDS 204a of the user. This is to run validation actions and the like on the API 205a of the PDS 204a and also the PDS 204a of the user to ensure it has been validly set-up and created and, for example, available to receive connections. In step 375, the PDA provisioning service 206 sends a registration request to the PDA exchange component/controller 212 for registering the PDS 204a in the PDA exchange component 212. As an option, this may include registering the relationship or link between the PDS 204a and the application/application client 106a, that is the PDS 204a is to allowed access to the application/application client 106a in accordance with the PDSI/HMI details or PDAC information of the application/application client 106a. If steps 370b, 371b, 372b and 373b are not performed and an personal data access token of application/application client 106A has not been created yet, then as an option, in step 376a the PDA provisioning service 206 sends a request to the PDS 204a for enabling the application/application client 106a to have access to the PDS 204a of the user based on the permissions granted in step 389 in relation to the PDSI/HMI details and/or PDAC information of the application/application client 106a. In step 376a, the PDS 204a may reconfigure the API 205a of the PDS 204a to enable application/application client 106a to access and/or store personal data on PDS 204a of the user based on the PDSI/HMI details or PDCA information of the application/application client 106a. Once application/application client 106a has been enabled for accessing the PDS 204a of the user via the API 205a of the PDS 204a, then the PDS 204a sends a success response (e.g. HTTP 200 response) to the PDA provisioning service 206, where the success response may include a payload based on data representative of a personal data access token for enabling the application/application client 106a to access the PDS 204a as described herein and/or with reference to FIGS. 3a to 3d and the like. In step 377, the PDA provisioning service 206 sends the success response and the personal data access token for the application/application client 106a to the PDAP interface 361.

In step 378, the PDAP interface 361 sends the success response and the personal data access token for the application/application client 106a to the application/application client 106a. The PDAP interface 361 may also notify the user of the user name and/or PDS name of the PDS 204a that has been created for the user. This will allow the user to provide any other application/application client access to personal data of the PDS 204a of the user, for example, using application authentication process(es) 302, 336 and/or 346 and the like. Once the application/application client has the personal data access token generated by the PDS 204a of the user, then the application/application client 106a may perform data access process(es) 304, 338, 348 and the like for accessing and/or storing personal data of the user on the PDS 204a of the user. For example, the application/application client 106a may be configured to only store personal data of the user on the PDS 204a of the user, and only access personal data of the user from PDS 204a of the user.

In another example, with reference to FIGS. 2a to 2c, an application/application client 106a wishes to create a personal data account for a user 109a of a plurality of users 109a-109l on the PDM platform 200, where the user 109a does not have a PDA or associated PDS (e.g. HAT Microserver) 204a/220. The application/application client 106a redirects the user 109a from the application/application client 106a to, without limitation, for example an interface of a PDA Provisioning Manager service 206 (e.g. HATTERs) by calling on an API in the PDM platform 200. Once the API call is received, the following provisioning procedure may be performed in which the PDA Provisioning Manager 206 calls, without limitation, for example a PDS Manager 208 (e.g. a Milliner API). The PDS Manager 208 has an internal logic that: (1) creates a new database 226 in the PDM platform 200 (e.g. a database from a database cluster); (2) creates a public-private key pair (private key of the HAT Microserver 204a/220 is currently stored in the PDS Manager 208 (e.g. Milliner)); and (3) stores the password of the HAT Microserver 204a/220 (e.g. PDS). The PDS Manager 208 responds to the PDA Provisioning Manager 206 indicating "success" for creating the HAT Microserver 204a with PDA. The PDS Manager 208 independently checks that the HAT Microserver 204a/220 is now accessible via the API 222 of the HAT Microserver 220. The PDA provisioning manager 206 (e.g. HATTERs) registers all the information about the HAT Microserver 204a/220 of the user 109a with the PDA Exchange controller/component 212 so that the PDA exchange controller 212 can monitor traffic to and from HAT Microservers 204a-204l of a plurality of users 109a-109l. The PDS provisioning manager 206 (e.g. HATTERs) enables the application 106a on a HAT Microserver 204a/220 by depositing permissions (e.g. HMI and/or PDAC information of the application) into the HAT database 226 of the HAT Microserver 204a/220 of the user 109a (e.g. PDS of the user). The PDA provisioning manager 206 (e.g. HATTERs) also registers the permissions template (e.g. digital HMI, set of rules, permissions and/or instructions) with the PDA exchange controller 212 of what personal data of the user 109a from the HAT Microserver 204a/220 (e.g. PDS) is allowed to be accessible by the application 106a based on what the user 109a (e.g. database owner) has agreed to.

Figure 3E:
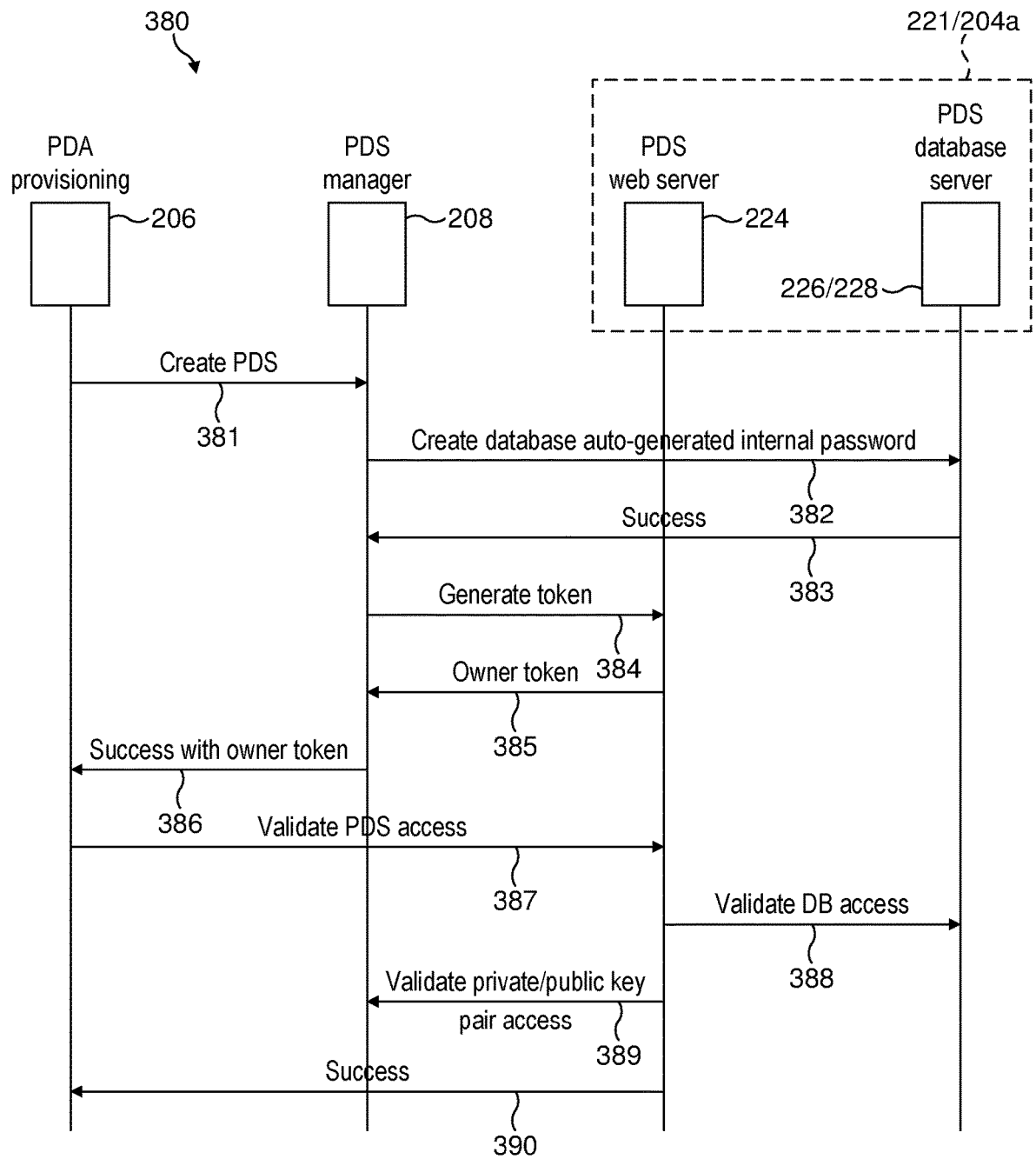
FIG. 3e is a signal flow diagram illustrating an example PDS operation process for use with the PDM platform according to some embodiments of the invention.

FIG. 3e is a signal flow diagram illustrating another example provisioning process 380 and operations performed by the provisioned PDS of a user in accordance with some embodiments of the invention. The example provisioning process 380 of a PDS for a user may be used with the PDM platform 102 or 202 as described with reference to FIGS. 1a and 2a and 3a-3d according to some embodiments of the invention. In this example, the focus is on several components of the PDMC 212, namely, PDA provisioning server 206 (e.g. HATTERS) and PDS manager 208 (e.g. MILLINER). It is assumed that either: 1) a user, which does not have a PDS or PDA registered with the PDM platform 102 or 202, has sent a notification approving the PDAC information of an application and is permitting that the application can store and access personal data of the user in a PDS of the user in accordance with the PDAC information; or b) the user has requested a PDA from the PDM platform and should be provisioned a PDS that enables a user to control the storing and accessing of personal data to/from the PDS. The PDA provisioning server/service 206 receives a notification or request (e.g. PDSI/HMI approve response, or a request for provisioning a PDS for a user) associated with provisioning a PDS for a user. For example, see steps 363 to 369 described with reference to FIG. 3d. The notification or request may include, without limitation, for example a user name, user email or another email address, and/or PDS name, and/or PDA user name chosen by the user, where the PDA provisioning server 206 may generate a unique PDS name and the like for enabling applications to identify the PDS of the user over a communication network. The PDA provisioning process 380 may further include the following steps of:

In step 381, on receiving the notification or request associated with provisioning a PDS for a user, the PDA provisioning server 206 sends a create PDS command/message (or a provision PDS command/instruction and the like) to the PDS manager 208 including the information necessary for the PDS manager 208 to proceed to create a PDS 221/204a for the user including, without limitation, for example a webserver 224 and a PDS database server 226/228 connected together. The PDS 221/204a of the user that is created may also include an API and a file system as described herein. In step 382, the PDS manager 208 creates the PDS database using an auto-generated internal password and the like. In some embodiments, the PDS manager 208 creates a system-managed database password. For example, the PDS manager 208 may instruct a cloud-based infrastructure or platform to allocate, assign or generate one or more scalable database instances or containers and the like to form a PDS database server for the PDS of the user. In step 383, the PDS manager 208 receives a success notification that the PDS database server for the PDS of the user has been created. In step 384, the PDS manager 208 may instruct the cloud-based infrastructure or platform to allocate, assign or generate one or more scalable webserver instances or containers and the like to form a webserver 224 for the PDS 221/204a of the user, i.e. a PDS webserver, the instruction may include a generate token including the necessary information for the cloud-based infrastructure or platform to generate a PDS webserver and, in step 385, transfers ownership to the PDS manager 208 by sending a success notification with an owner token associated with the PDS webserver 224 of the PDS 221/204a of the user. The owner token may be used by the owner of the PDS to control the storage and access to personal data of the PDS 221/204a. The PDS manager 208 may perform further operations to generate an API, a file system and/or computational units for the PDS 221/204a of the user. These may be combined together to form a PDS 221/204a with an API connected to, i.e. served by, the webserver 224, which is connected to the PDS database server 226/228, file system, and computational units.

In step 386, the PDS manager 208 sends a success notification along with the owner token to the PDA provisioning server/service 206. Once received, the PDS provisioning service 206 may use the owner token to validate PDS access to the provisioned PDS 221/204a of the user. In step 387, the PDS provisioning server/service 206 sends a validate PDS access message and/or a validate PDS availability message to the PDS 221/204a of the user using the owner token, if successful, the web server 224 of the PDS 221/204a of the user, in step 388 sends a validate database access and/or a validate database availability message to the PDS database server 226/228, as only the PDS webserver 224 is connected to the PDS database server 226/228. When the PDS webserver 224 has performed the internal checks etc., the PDS webserver 224 sends the PDS manager 208a validate access response using a private/public keypair access or a unique public key of the user PDA. In step 390, the PDS webserver 224, once it is determined that the PDS webserver 224 can connect with the PDS provisioning server/service 206, PDS manager 208 and the PDS database server 226/228, and any other components of the PDS 221/204a of the user, sends a success notification to the PDA provisioning server/service 206. In some embodiments, in step 390, sending the success notification includes returning a unique PDS public key.The PDA provisioning service/server also creates a PDA account for the user with user credentials for login via a user interface to the PDS 221/204a of the user (e.g. PDS Dashboard 216 or PDAP Interface 361) and links the personal data account (PDA) to the PDS 221/204a of the user using the owner token, which can then use the owner token to control access to the PDS for reconfiguring the API of the PDS to enable/rescind/disable applications access to the PDS 221/204a of the user. The PDA provisioning server/service 206 may delete the owner token from memory to prevent other users or components other than the PDA to access the PDS 221/204a of the user Optionally, when an application initiates the process for a user to obtain a PDA and an associated PDS of the user, in step 381, the create PDS command/message (or provision PDS comment/message) may include data representative of enabling the application/application client to have access to the PDS of the user once created by preconfiguring the API of the resulting PDS 221/204a to enable access to the PDS by the application. For example, the data representative of enabling an application access to the PDS may include PDSI/HMI details/PDAC information of the application/application client. The PDAC information/PDSI/HMI details of the application may be used to pre-configure the API of the PDS 221/204a of the user to permit the application to access and store personal data of the user on the PDS 221/204a of the user (once created). Once created, the PDS 221/204a may be configured to generate an personal data access token for the application, which may be provided to the PDAP interface 361 or PDS Dashboard 216 or any other interface that is used by the application to request a PDA/PDS be created for the user. When the application is provided with the personal data access token for the application, it can use this token to store and/or access personal data of the user of the PDS 221/204a of the user based on performing the data access process(es) 304, 338, 348 as described with reference to FIGS. 3a to 3d, modifications thereto, combinations thereof, and/or as described herein and/or as the application demands. Furthermore, if a personal data access token or application token is generated for the application, steps 384 and 385 and 386 may be modified for generating the personal data access token instead of the ownership token in which the personal data access token of the application may be used in steps 387-390 for validating the PDS 221/204a of the user instead of using the owner token. The personal data access token of the application may be sent to the application once the PDA for the user is formed and linked with the PDS 221/204a of the user.

Figure 3F:
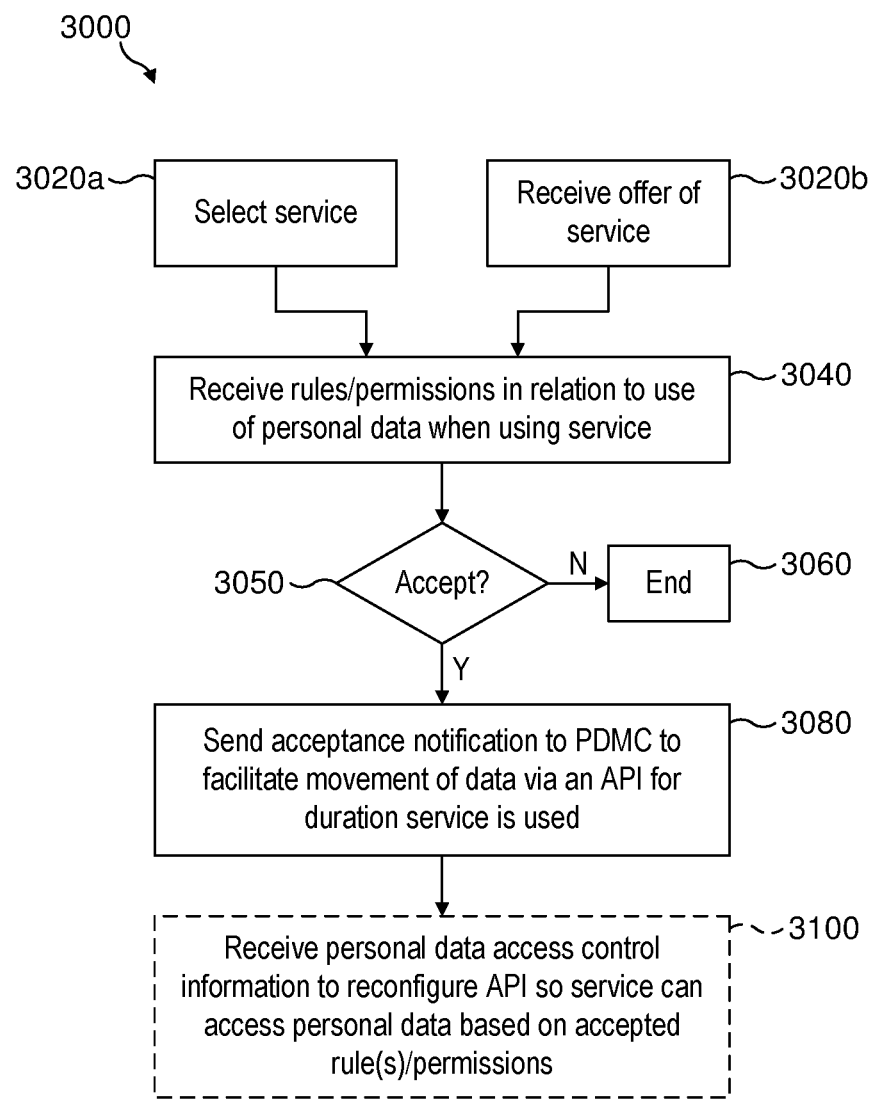
FIG. 3f is a flow diagram illustrating another data access/data debit process for use with the PDM system/platform according to some embodiments of the invention.

FIG. 3f is a flow diagram illustrating a data debit mechanism or protocol 3000 in relation to an application according to some embodiments of the invention. The data debit mechanism or protocol 3000 reconfigures an API associated with the application that is configured to enforce or govern the exchange of personal data of a user between the PDS (e.g. HAT Microserver) of the user and the application. The API represents what is called a Data Debit is based on a permission-based, data contract. As the rights to the (HAT) database system (e.g. PDM platform 102 or 202) of the PDS/HAT Microservers of the user are fully owned by the user, which is the PDS/HAT owner, any data acquisition from the PDS/HAT database would require permission. When permission is granted, a legitimate contract is agreed upon between the application provider of the application and the user of the PDS/HAT Microserver or PDA owner/user of the PDA hosted by the HAT Microserver. This process is not the same as consent. The data debit mechanism or protocol 3000 flow enforces a strictly-defined format defining the specific data requested for the owner to review and confirm.

The permission based data exchange contract may be called a Personal Data Server DS/HAT Microserver Instruction Contract (PDSIC/HMIC) that governs the agreed upon exchange of data between application and the PDS/HAT database system of the PDS/HAT Microserver of the user. The PDSIC/HMIC may be converted into a set of rules, instructions and/or permissions associated with the application for governing the exchange of data between application and the PDS/HAT database system of the PDS/HAT Microserver of the user. The data representative of the set of rules, instructions and/or permissions may be called Personal Data Server Instructions, for example HAT Microserver Instructions (PDSIs/HMIs). Personal Data Server (HAT Microserver) Instructions (PDSIs/HMIs) are the means by which PDS/HAT Microserver owners can manipulate the contents in their PDS/HAT Microservers.

The PDSIs/HMIs include data representative of: 1. Permissions that are given to applications, application providers and the like (e.g. PDS/HAT Merchants/Vendors/Applications) to act on their behalf and do what it is permitted to do in the PDSIC/HMIC (e.g. read and write personal data into the PDS/HAT Microserver of the user); 2. Agreements: PDSI/HMI Instruction Contracts (PDSICs/HMICs) are formed when PDSI/HMI permissions are proposed to the user/owner of the PDA hosted by the HAT Microserver of the user by applications, application providers and the like that are in compliance with the PDM System/Platform, and agreed by the users of the PDS/HAT Microservers in exchange for consideration. Offer, consideration, and acceptance are presented and agreed through 'PDSI screens' or 'HMI screens' presented to the user/owner of the PDA hosted by the HAT Microserver of the user. 3. Executions of code by PDS/HAT owners themselves through the pressing of the confirmation button, enabling them to execute PDS/HAT functions or code and/or interact with or organise their PDS/HAT data directly.

The data debit mechanism or protocol 3000 in relation to an application based on using Personal Data Server/HAT Microserver Instruction Contracts (PDSICs/HMICs)/PDSIs/HMIs is as follows: In step 3020a, a PDS/HAT Microserver user/owner may use a user interface to select an application service of an application provider and/or application (e.g. a PDS/HAT Vendor/Merchant). This is shown to the PDS/HAT Microserver user/owner over the user interface or linked via the PDS Dashboard, such as the HAT App of the HATDeX Platform. Alternatively or additionally, in step 3020b, a PDS/HAT Microserver user/owner may be offered an application service by an application provider and/or application (e.g. a PDS/HAT Vendor/Merchant). This is shown to the PDS/HAT Microserver user/owner over a user interface or linked via the PDS Dashboard, such as the HAT App of the HATDeX Platform.

In step 3040, the PDS/HAT Microserver may receive rules(s)/permissions in relation to user of personal data of the user when using the service, which may be displayed to the user for approval. For example, the PDS/HAT Microserver user/owner may be presented with an PDSI/HMI screen outlining the read/write permissions (e.g. set of data access rules and/or PDSI/HMI) sought by the application provider and/or application (e.g. PDS/HAT Vendor/Merchant) from the PDS/HAT Microserver user/owner, together with information on the data (e.g. personal data of the PDS/HAT Microserver user/owner) sought and buttons through with to accept/reject the offer.

In step 3050, the user may accept or reject the rule(s)/permissions. For example, the PDS/HAT Microserver user/owner press 'Confirm' (e.g. Y) to accept the offer of the read/write permissions sought by the application. In doing so, a contract is formed between the PDS/HAT Microserver user/owner and the application provider/application. This contract may be a PDSIC/HMIC that specifies: a. PDS/HAT Microserver user/owner legally giving permission to application provider/application (e.g. PDS/HAT Merchant/Vendor) to do what it is permitted to do in the PDSI/HMI (e.g. read and write data into the PDS/HAT Microserver by its application); b. PDS/HAT Microserver user/owner legally gives permission to the PDM platform services (e.g. a PDA Exchange controller/component) to facilitate the movement of the data (e.g. personal data) through PDM platform APIs, each API associated with an application and configured to perform data exchange between the PDS/HAT Microserver and the application that is governed by the PDSIC/HMIC, for the duration stipulated in the PDSI/HMI/PDSIC/HMIC. If a duration is not mentioned, then it gives permission till the PDS/HAT Microserver user/owner revokes/terminates the flow/exchange of data between PDS/HAT Microserver and the application/application provider via the API associated with the application. c. The PDS/HAT Microserver user/owner legally accepts a contract and executes the code to complete the data work.

PDSICs/HMICs are transparent, readable, and provide PDS/HAT Microserver user/owners with all the information they need on the data sought and purposes for which it will be used. The PDM platform records all PDSICs/HMICs that application providers/applications (e.g. PDS/HAT Merchants/Vendors) offer to PDS/HAT Microserver users/owners. When a PDS/HAT Microserver user/owner accepts a proposed PDSIC/HMIC, this is recorded by the PDA Exchange controller of the HATDeX Platform.

In step 3080, the PDS/HAT Microserver may send an acceptance notification to the personal data management component (PDMC) or PDA Exchange Controller of the PDM platform to facilitate movement of data via an API for the duration of the service being used. Thus, once the data-sharing permissions are given, the contract between the PDS/HAT Microserver user/owner and the application provider is logged and a Data Debit mechanism (e.g. API associated with the application and PDS/HAT Microserver) becomes one of the ways data of the user or personal data of the user can be retrieved from a PDS/HAT Microserver of the user by anyone other than the user/owner of the PDS/HAT Microserver. The application may be assigned a namespace on the PDS/HAT Microserver for storing personal data of the user in its assigned namespace and/or for reading the personal data from the assigned namespace at a later time in the future. The assigned namespace of the application may be defined by the application in the PDSI/HMI or as a parameter when the application is authorised to access the PDS/HAT Microserver. For example, the application may be provided a personal data access token that provides the application with access to the PDS/HAT Microserver and at least the assigned namespace of the application. The application may also, depending on the PDSI/HMI details, have authorisation to access one or more other namespaces of other applications and access personal data of the user in these one or more other namespaces.

In step 310, the PDS/HAT Microserver may receive PDSIC/HMIC/PDSI/HMI details and/or personal data access control information of the application for reconfiguring the API of the PDS/HAT Microserver to enable personal data access to the application for use in exchanging personal data of the user between the PDS/HAT Microserver of the user and the application service based on the PDSIC/HMIC/PDSI/HMI and/or PDAC information of the application. For example, an endpoint of the API that is associated with the application/application service is configured based on the set of rules, instructions and/or permissions (e.g. PDSIC/HMIC/PDSI/HMI or PDAC information) derived from the PDSIC/HMIC/PDSI/HMI or PDAC information of the application that govern data exchange and/or access to personal data of the user in PDS/HAT Microserver of the user.

Figure 3G:
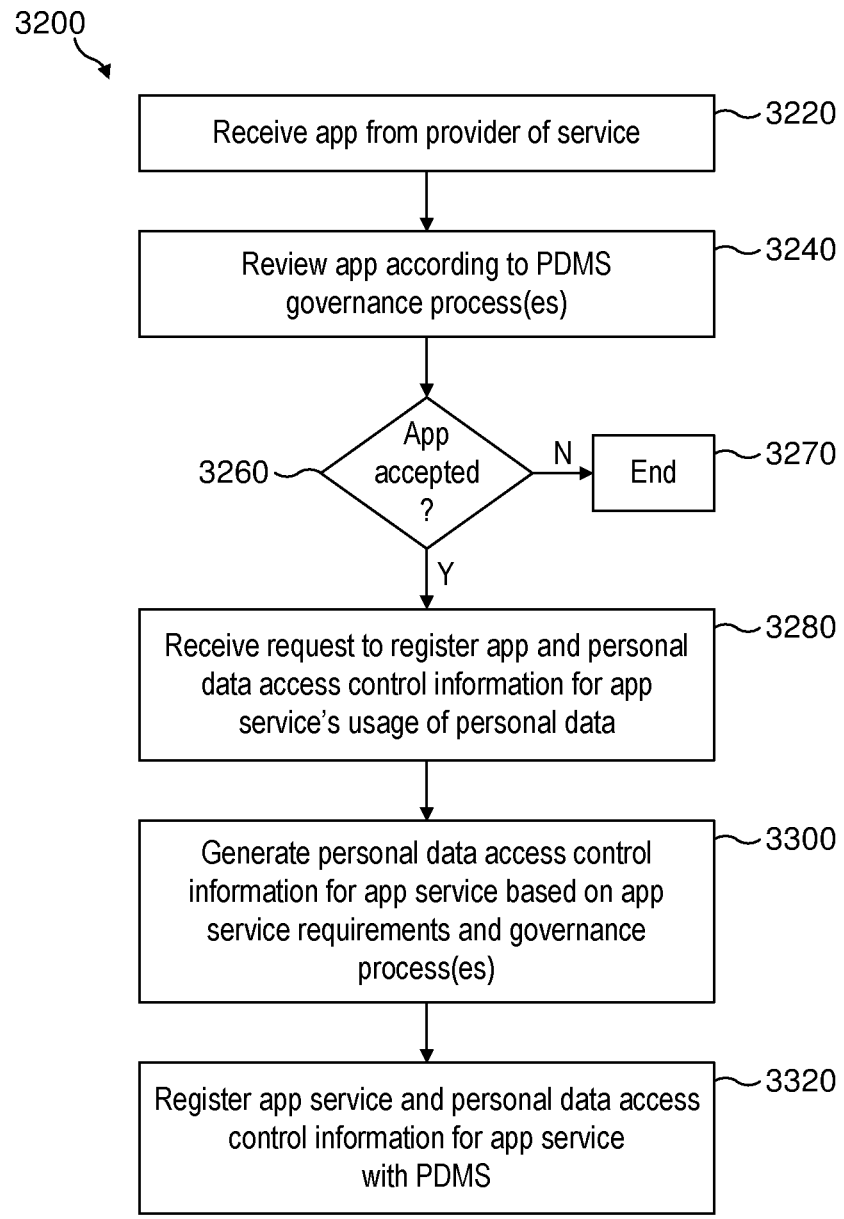
FIG. 3g is a flow diagram illustrating an application registration process for use with the PDM platform according to some embodiments of the invention.

FIG. 3g is a flow diagram illustrating an application registration process 3200 for registering an application with the PDM platform according to some embodiments of the invention. The application registration process 3200 may include the following steps of: In step 3220, the PDM platform receives an application from the application provider of an application service. In step 3240, the application is reviewed according to the PDM Platform's governance process and data management criteria to see if the application is compliant with the rules/code of operation with the PDM platform and data management criteria. In step 3260, it is determined whether the application is accepted for use with the PDM platform. If the application is accepted, (Y), then in step 3280, the application process may receive a request from the application provider to register the applications and the set of rule(s)/permissions in relation to the application service's usage of personal data of users of the PDM platform. In step 3260, if the application is not accepted, ('N'), then the application registration process ends, the process may provide a notification with reasoning as to why the application was rejected, whereby the application provider may redraft the application for compliance. In step 3300, the PDM platform generates rules/permissions based on the application service requirements and the PDM Platform's governance processes. In step 3320, the application/application service is registered along with the set of rule(s)/permission(s) (e.g. PDSIC/HMIC/PDSIs/HMIs and/or PDAC information) in the PDM platform, which may be retrieved when a user of a PDS/HAT Microserver requests access to the application and the like as described in FIGS. 1a to 3f and 4a to 5 and/or as described herein.

Although the PDS of a user as described herein with reference to FIGS. 1a to 3g as being implemented with, by way of example only but is not limited to, a HAT Microservers, HAT technologies and AWS infrastructure, it is to be appreciated by the skilled person that the PDS of a user may be implemented based on, without limitation, for example any other storage and/or computational technology, computing devices, servers, server systems, database system(s), file storage system(s), cloud-based infrastructure, combinations thereof and/or modifications thereto and/or as the application demands.

Nevertheless, given that a plurality of applications may be configured to store personal data of a user only within a PDS of a user and to access personal data from a PDS of a user, it is important the implementation, management, provisioning, deployment, and data access to each of the plurality of PDSs of the corresponding plurality of users by a plurality of application may require an efficient and scalable PDS infrastructure. This may be achieved by implementing the plurality of PDSs 114a-114l, 204a/205a, 221 as described with reference to FIGS. 1a to 3g as a scalable PDS cluster based on, without limitation, for example using cloud-based infrastructure technologies using web server instances, database instances, and containers thereto using a combination of multi-tenant and single-tenant architectures.

Figure 4A:
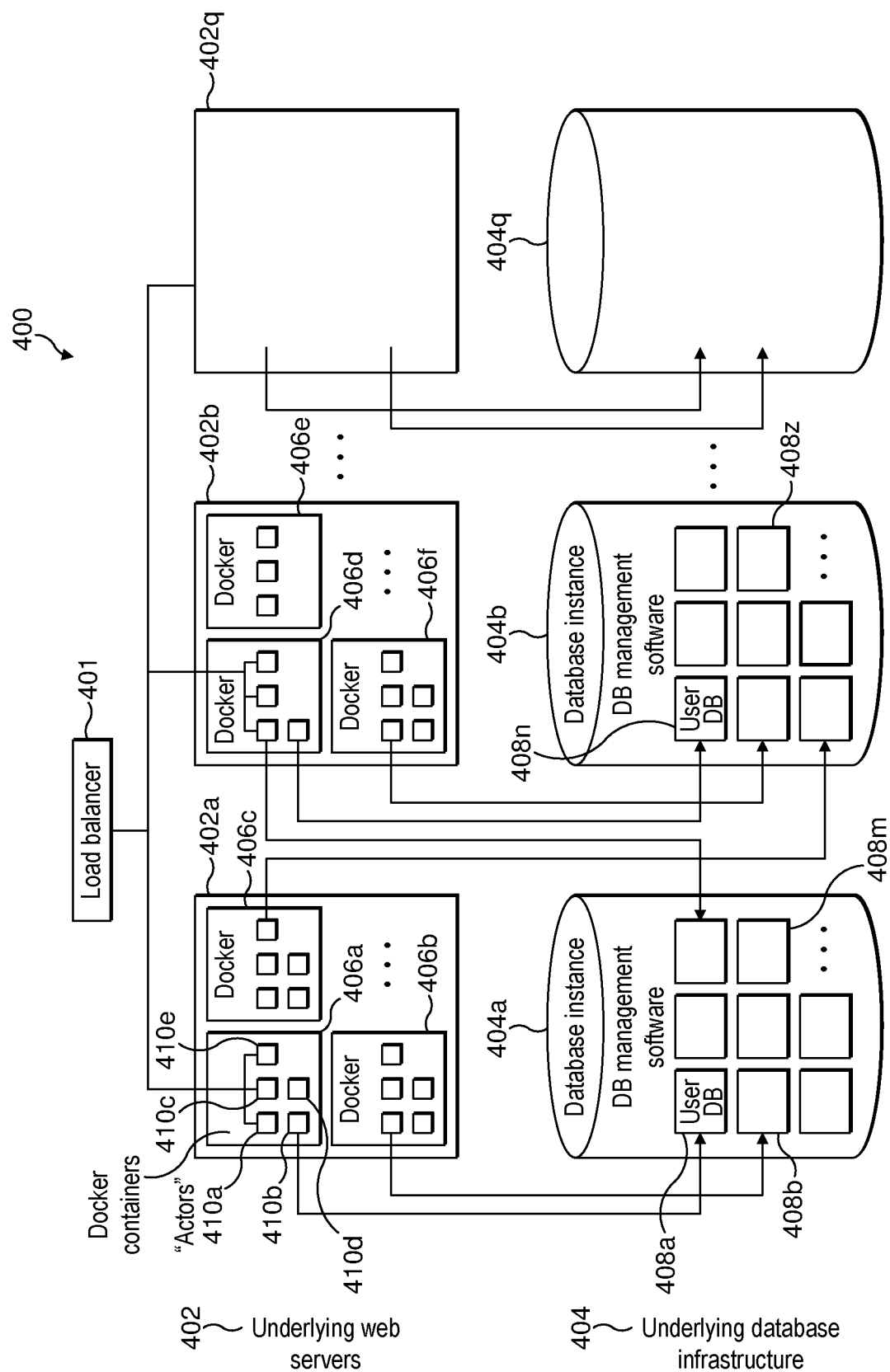
FIG. 4a is a schematic diagram illustrating an example scaleable PDS cluster for use with PDM platform/system according to some embodiments of the invention.

FIG. 4a is a schematic diagram illustrating an example scalable PDS cluster 400 for use with PDM platforms 102 and/or 202 as described with reference to FIGS. 1a to 3g and/or as described herein according to some embodiments of the invention. For simplicity, reference numerals for similar or the same components, services, features and the like of FIGS. 1a to 3g may be reused by way of example only. The scalable PDS cluster 400 may include a plurality of PDSs for use with PDM platform 102/102 and/or 200/202. The PDS cluster 400 includes a load balancer 401, which may be incorporated and/or used by the PDS Manager 208 or PDMC 112 for balancing the computing and storage requirements of the plurality of PDSs required by PDM platform 102 and/or 202 and/or as the application demands.

For example, the load balancer 401 may enable running of the PDSs 114a-114l and/or HAT Microservers 204a-204n at scale on public or private cloud infrastructure. The PDS Manager 208/PDMC 112 may be configured to implement the load balancer 401 which may be further configured to operate as, without limitation, for example a credential broker that monitors underlying resources and manages underlying infrastructure, with an administrative dashboard to monitor platform health of the PDM platforms 102/202 and the like. This may include interacting with PDSs 114a-114l or HAT Microservers 204a-204n for fast setup and teardown in order to facilitate, without limitation for example, rapid access to, provision of and/or storage requirements of PDSs 114a-114l or HAT Microservers 204a-204n and the like.

Although a PDS is essentially a combination of at least an API, a web server, a database, a file system and/or computing units, in order to operate the necessary number of PDAs with PDSs and the underlying storage, access and computing resources for each requires using scalable computing infrastructure. In this example, the resource allocation of the web server and database for a PDS is described, however, the other components of the PDS, such as API, file system, and computational units may be allocated, assigned in a similar manner to form a PDS of a user for use with a PDA of the user. Although the resource allocation of the web server and database for a PDS is described, this is by way of example only and the invention is not so limited, it is to be appreciated by the skilled person that the resource allocation of the API, file system, and/or any computational units that make up a PDS may be assigned, allocated or instantiated in a similar manner and managed by the cloud management tools and the like and/or as the application demands.

The scalable PDS cluster 400 of FIG. 4a illustrates an example of the overall technical architecture with underlying web and database server layers 402 and 404 as the architectural foundation. The web server layer 402 includes a plurality of web servers 402a to 402q and the database server layer 404 includes a plurality of database servers 404a to 404q. The web servers 402a-402q and database servers 404a-404q may be either physical servers or "server instances" from a cloud provider that might be virtual. For example, one or more of the plurality of web servers 402a-402q may be a web server instance and one or more of the plurality of database servers 404a-404q may be a database server instance.

Although infrastructure may be co-mingled with other architectures, this may lead to inefficiencies in use of computing and/or storage resources and the like, thus in this example each of the plurality of web servers 402a-402q may be a web server instance and each of the plurality of database servers 404a-404q may be a database server instance. Each web server instance 402a or 402b includes and runs a plurality of webserver containers 406a-406b or 406d to 406f, respectively. Each database instance 404a or 404b includes and runs a plurality of database containers 408a-408m or 408n-408z.

In this example, each of the webserver containers 406a-406b or 406d to 406f may include a single instance of the code required for running a PDS. Each webserver container 406a includes a plurality of PDS actors 410a to 410e, each of the PDS actors 410a to 410e share the single instance of the executing PDS code. The PDS actors are, in some examples, in-memory connections. For example, the PDS code uses a pattern known as Actor Model design pattern to logically segregate the PDS state (which may be an ephemeral state) and database connections to each individual PDS and hence PDA of a user in memory. Similarly, in this example, each of the database containers 408a-408b or 408d to 408f may include a single instance of the code required for running a user database. In this example, the database server instances 404a-404q run a single instance of a DBMS, whereas the user databases are logical databases. Each logical database of a PDS of a user is located in one of the plurality of databases 408a-408m or 408n-408z. Thus, a PDS of a user may include a PDS actor 410b connected to user database 408a. PDS Actors 410a-410e are dynamically created and destroyed and a single actor only ever connects to a single logical database within each database container 408a-408m or 408n-408z. In this example, there are a plurality of database instances 404a-404q each housing a plurality of logical databases 408a-408m protected by individual user passwords. It is important to note that there is only a single copy of Database Management Software (DBMS) running per database instance 404a.

For example, each web server instance 402a runs, by way of example only but is not limited to, a plurality of Docker webserver containers 406a-406c, within each webserver container there is a single instance of HAT Microserver code running as a PDS. The webserver containers 406a-406c, in some examples, are configured to function as virtualisation containers. The HAT Microserver code uses a pattern known as Actor Model design pattern to logically segregate the state and database connections of individual PDSs and hence PDAs in memory. So, in order to create a PDS or HAT Microserver of a user, the load balancer 401 under control of the PDS Manager 208 or PDMC 112 may assign, allocate and/or initiate a Docker webserver container 406a of the webserver instance 402a and within the Docker webserver container 406a assign, allocate or initiate an HAT Actor

410b to create the webserver of the HAT Microserver. The load balancer 401 may then link or connect the Docker container 406a to the outside public networks. The HAT Actor 410b and database container 408a once linked/connected forms the HAT Microserver of the user (i.e. a PDS of a user).

In this example, each of the plurality of webserver instances runs multiple multi-tenant HAT Microservers 406a-406c with a first set of users of the plurality of users sharing each multi-tenant HAT Microserver 406a in which each user has a HAT Actor 410b, Each of the plurality of database instances 404a-404q runs a single multi-tenant DBMS shared with a second set of users of the plurality of users sharing the single multi-tenant DBMS in which each user has a logical database 408a-408m. One or more users of the first set of users may be in the second set of users and vice versa. Each logical database 408a may be protected with a user password.

Figure 4B:
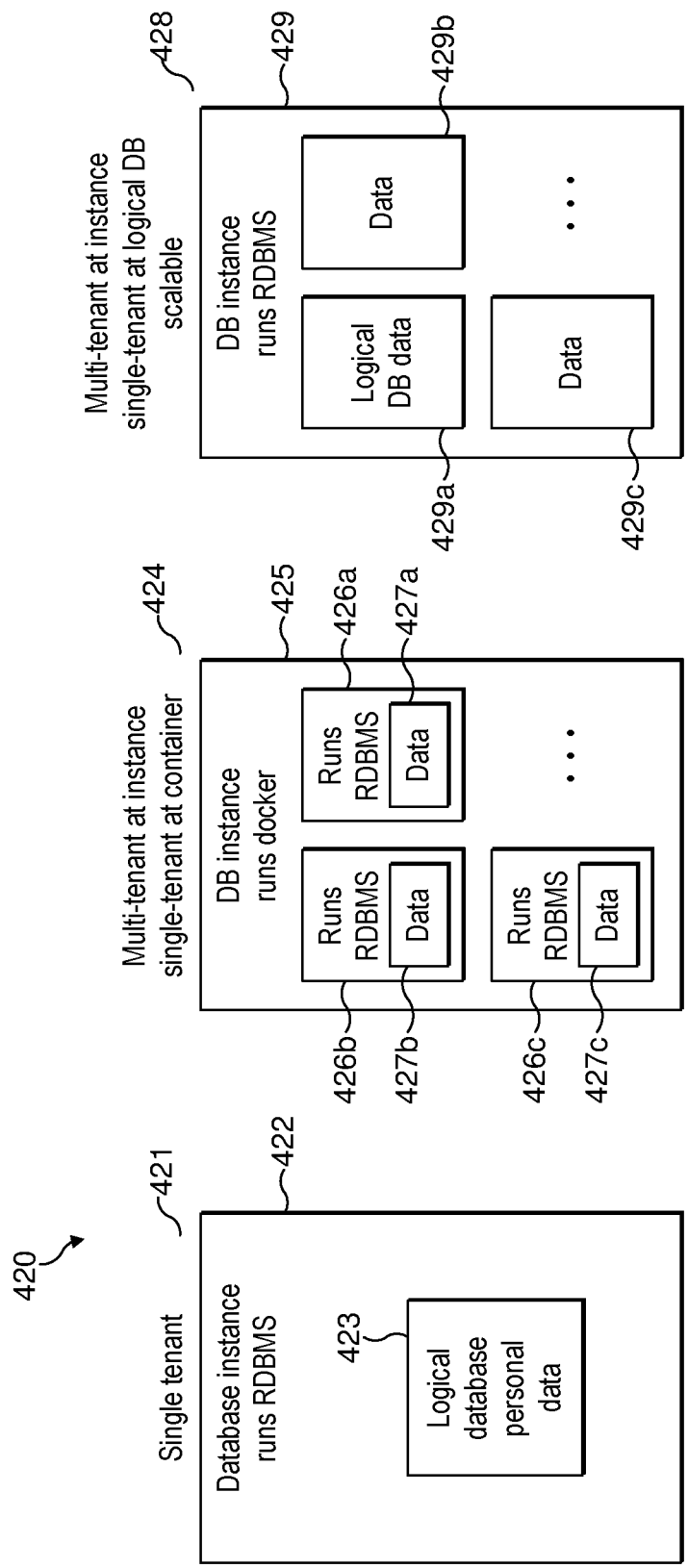
FIG. 4b is a schematic diagram illustrating several example PDS structures for scaling the plurality of PDSs within a PDM platform/system according to some embodiments of the invention.

FIG. 4b is a schematic diagram illustrating several example PDS database architectures 420 that may be used for scaling the provision and management of the plurality of PDSs within the PDM platform 102 and/or 202 according to some embodiments of the invention. Although scaling in respect of the database architecture is described and illustrated, this is by way of example only and the invention is not so limited, it is to be appreciated by the skilled person that these database architectures that are described may be applied to the webserver architecture for implementing, provisioning and managing a plurality of PDSs and the like. A comparison is made of the different available database architectures regarding different levels of database virtualisation and tenancy. The first database architecture 421 is based on a single-tenant database architecture 421 that is configured as a single database instance running a single copy of a DBMS to manage a single logical database 423 containing personal data per instance. This first database architecture 421 is not feasible at scale due to cost. A second database architecture 424 includes a single DB instance 425 running a plurality of multi-tenant docker containers 426a-426c, each docker container 426a runs a single copy of a DBMS to manage a single logical database 427a within the container. The second database architecture 424 uses logical databases 427a-427c that are single-tenant within docker containers 426a-426c. Although this second architecture 424 is scalable, it can be expensive to operate in terms of computational resources, cost and/or storage. A third database architecture 428 includes a single database instance 429 running a relational DBMS with multi-tenant logical databases 429a-429c inside the single database instance 429. A single copy of the DBMS of the single database instance 429 manages a multitude of logical databases 429a-429c protected by individual user passwords. There is a single-tenancy of personal data within a logical database 429a, thus a separation or segregation of user data between PDSs is possible. The third database architecture 428 is based on the scaleable PDS cluster scenario 400 of FIG. 4a. This database architecture is scalable with acceptable computational, storage and operating costs.

The core difference between the second and third architectures 424 and 428 is the type of software that achieves logical segregation of virtual databases. In the second architecture 424, a Docker containers are used, whereas in the third architecture a single DBMS (e.g. Postgresql) is used. This allows the third architecture to have independent database instances (or a plurality of independent database instances) each housing a plurality of logical databases 429a-429b protected by individual user passwords. It is important to note that there is only a single copy of DBMS running per database instance 429.

Although several database architectures have been described, this is by way of example only and the invention is not so limited, for use in provisioning and/or managing a plurality of PDSs/PDAs of users in PDM platforms 102 or 200 and the like, it is to be appreciated by the skilled person that other scalable database and/or webserver architectures based on one or more cloud-computing and/or server techniques and/or derived from multi-tenancy/single tenant/Actor model techniques, modifications thereof, combinations thereto and the like may be used for managing and/or provisioning each PDS of the plurality of PDSs and/or as the application demands.

The PDM platform(s) 100 and/or 200 and corresponding process(es) described with reference to FIGS. 1a to 4b may be used in many use cases. For example, in the case of the OneZero-Me application (RTM), the PDM platform 102 or 202, modifications thereto or combinations thereof may be used to enable a user to control their personal data via a PDA/PDS assigned to the user in which the user may agree with the personal data handling of the OneZero-Me application based on the PDSIC/HMIC/PDSI/HMI of the OneZero-Me application. The OneZero-Me (OZM) application service that may process personal data of a user for generating, without limitation, for example self-sovereign identity to alternative credit and risk scores and the like.

Initially, when a user registers with OZM application service, the PDM platform as described herein may create a Personal Data Account (PDA) using a Personal Database Server (PDS) assigned to the user when the user agrees to the PDSIC/HMIC/PDSI/HMI of the OZM application. The OZM application may be registered and approved by the PDM platform 102 or 202 and the like as the PDSI/HMI/PDSIC's/HMIC's of the OZM application may comply with the GDPR regulations, which provides "strong" data protection of the personal data of a user. When the user agrees to the PDSIC/HMIC/PDSI/HMI of the OZM application, the PDS of the user is configured, as described with reference to FIG. 1a to 5, to enable the OZM application to have the ability to read/write into an OZM application namespace of the PDS of the user in accordance with the PDSIC/HMIC/PDSI/HMI of the OZM application. The OZM application creates a random unique ID (UID) as a pseudonym for the user and further generates a key (or a set of random keys). The OZM application stores the keys in the OZM server(s), under a table where the key for the table is the UID. And then the OZM application writes the UID into the PDA on the PDS of the user within the OZM application namespace/folder. So within the application server, there is no email or PDS/HAT URL, just a random UID.

Next, the OZM application asks the user to share their Facebook data for risk or credit scoring. The user may agree to store Facebook data within the PDS of the user within a Facebook namespace. The user then agrees to a third party WRITE by a Facebook data plug API-to-API service (e.g. enabling transfer of personal Facebook data of the user from Facebook to the PDS of the user) and a third party READ (e.g. cross-namespace read by the OZM application PDSIC/HMIC, that is allowing the OZM application to read from the Facebook namespace. The third party WRITE brings the Facebook data into the PDS of the user, that is the Facebook namespace of the database of the PDS of the user. The data debit access protocol enables and configures the API of the PDS of the user and the OZM application pulls on the API that has been enabled/configured. The risk scores of the user are generated by the OZM application algorithm in which the risk scores of the user are personal data that are written into the PDA/PDS of the user. But before the OZM application writes anything into the PDS of the user, the text of the risk score is effectively encrypted with the keys sitting in the user's table of the application server. Then the OZM application pushes the encrypted data into the PDS of the user. A copy of those risk scores are also written into the application server in the user's table. This makes the data unreadable by anyone else accessing the PDA. On the other hand, it also reduces the risk of identifiability from application server data.

When the user logs into the OZM application with his PDA on the PDS of the user, the OZM application accesses the UID of the user from within its namespace of the PDA and with it, access the user's table on the application server and retrieve the keys. The keys are then used to decrypt the risk scores and displayed to the user. The risk scores displayed are not explicit (because it's not meaningful) but the user does get to see a meaningful representation of their risk scores.

As an example, the user may have a UID of 123, their Facebook scores could be a set of numbers 05, 12, 56, 78 that says something about the user, then the only data that sits in the application server is 12305125678. Raw Facebook data is not kept anywhere and is discarded after the scores have been obtained. Similarly, when the user does a psychometric test with results 06081216, the test results are stored with the same UID table and now can look like 12305125678067006081216 as an example.

When the OZM application needs to share the scores with a loan company such as, without limitation for example GoCredit (RTM), because the user has applied for a loan and has been rejected or the insurance quote is too high. When the user requests for the OZM application to give their scores, GoCredit gives the OZM application another random identifier for the user, say UID1. The OZM application then creates another table that takes the UID into the table with UID1. What the OZM application has on it's application server is just the UID that was created randomly when the user registered a PDA on a PDS of the user, and any potentially identifiable credit API. So if somebody breaks into the application server there is no way of linking the data to the user.

Alongside the scores, the OZM application also has meta data about user activities e.g. if the user came from GoCredit, the user shared their personal data with GoCredit and user contract for sharing and consent given. Sharing practices are based on active opt-in, i.e. explicitly show the user how GoCredit would use the scoring and for what purposes.

Figure 5:
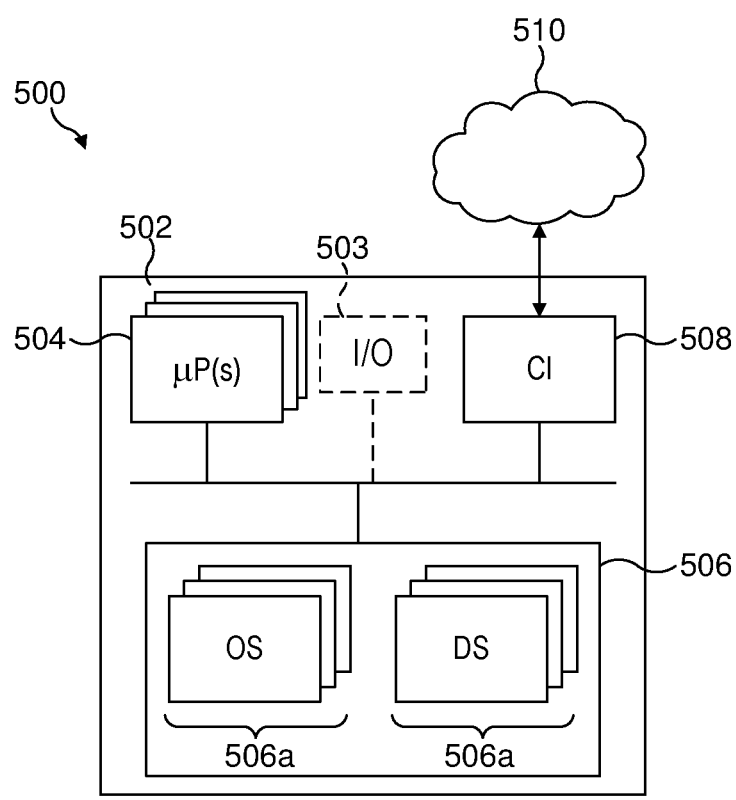
FIG. 5 is a computer system/device according to some embodiments of the invention.

FIG. 5 is a schematic diagram illustrating an example computing system 500 including a computing device 502 in communication with communication network 510. The computing system 500 and/or computing device 502 may be used to implement one or more aspects of the user device(s), PDS(s), personal data management component(s), PDM platform(s) or system(s), apparatus, method(s), and/or process(es) combinations thereof, modifications thereof, and/or as described with reference to any of FIGS. 1a to 5 and/or as described herein. Computing device 502 includes one or more processor unit(s) 504, optionally an input/output unit 503 as the application demands, a memory unit 506, and a communications unit/interface 508 in which the one or more processor unit(s) 502 are connected to the optional input/output unit 503, communications unit/interface 508, and the memory unit 506. In some embodiments, the computing system/device 500/502 may be a server, or one or more servers networked together. In some embodiments, the computing apparatus/system 502/500 may be a user device, computer or supercomputer/processing facility or hardware/software suitable for processing or performing the one or more aspects of the personal data management components, PDA(s), PDS(s), PDM platform(s) and system(s), apparatus, method(s), and/or process(es) combinations thereof, modifications thereof, and/or as described with reference to FIGS. 1a to 5 and/or as described herein. The communications interface 508 may connect the computing apparatus/system 502/500, via a communication network 510, with one or more applications, application clients, application services, devices, server system(s), cloud-based platforms, systems for implementing some of the embodiments of the invention as described herein. The memory unit 506 may store one or more program instructions, code or components such as, by way of example only but not limited to, an operating system and/or code/component(s) associated with the process(es)/method(s) as described with reference to FIGS. 1a to 5, additional data, applications, application firmware/software and/or further program instructions, code and/or components associated with implementing the functionality and/or one or more function(s) or functionality associated with one or more of the method(s) and/or process(es) of the device, application service and/or server(s) implementing process(es)/method(s)/system(s), apparatus, mechanisms and/or system(s)/platforms/architectures for implementing the invention as described herein, combinations thereof, modifications thereof, and/or as described with reference to at least one of FIGS. 1a to 5.

In the embodiments, examples, of the invention as described above such as data debit protocol(s)/process(es), method(s), system(s) and/or apparatus may be implemented on and/or comprise one or more cloud platforms, one or more server(s) or computing system(s) or device(s). A server may comprise a single server or network of servers, the cloud platform may include a plurality of servers or network of servers. In some examples the functionality of the server and/or cloud platform may be provided by a network of servers distributed across a geographical area, such as a worldwide distributed network of servers, and a user may be connected to an appropriate one of the network of servers based upon a user location and the like.

The above description discusses embodiments of the invention with reference to a single user for clarity. It will be understood that in practice the system may be shared by a plurality of users, and possibly by a very large number of users simultaneously.

The embodiments described above may be configured to be semi-automatic and/or are configured to be fully automatic. In some examples a user or operator of the data model configuration system(s)/process(es)/method(s) may manually instruct some steps of the process(es)/method(es) to be carried out.

In the described embodiments and examples of the invention the system may be implemented as any form of a computing and/or electronic device. Such a device may comprise one or more processors which may be microprocessors, controllers or any other suitable type of processors for processing computer executable instructions to control the operation of the device in order to gather and record routing information. In some examples, for example where a system on a chip architecture is used, the processors may include one or more fixed function blocks (also referred to as accelerators) which implement a part of the method in hardware (rather than software or firmware). Platform software comprising an operating system or any other suitable platform software may be provided at the computing-based device to enable application software to be executed on the device.

Various functions described herein can be implemented in hardware, software, or any combination thereof. If implemented in software, the functions can be stored on or transmitted over as one or more instructions or code on a computer-readable medium. Computer-readable media may include, for example, computer-readable storage media. Computer-readable storage media may include volatile or non-volatile, removable or non-removable media implemented in any method or technology for storage of information such as computer readable instructions, data structures, program modules or other data. A computer-readable storage media can be any available storage media that may be accessed by a computer. By way of example, and not limitation, such computer-readable storage media may comprise RAM, ROM, EEPROM, flash memory or other memory devices, CD-ROM or other optical disc storage, magnetic disc storage or other magnetic storage devices, or any other medium that can be used to carry or store desired program code in the form of instructions or data structures and that can be accessed by a computer. Disc and disk, as used herein, include compact disc (CD), laser disc, optical disc, digital versatile disc (DVD), floppy disk, and blu-ray disc (BD). Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, DSL, or wireless technologies such as infrared, radio, and microwave are included in the definition of communication medium. Combinations of the above should also be included within the scope of computer-readable media.

Alternatively, or in addition, the functionality described herein can be performed, at least in part, by one or more hardware logic components. For example, and without limitation, hardware logic components that can be used may include Field-programmable Gate Arrays (FPGAs), Program-specific Integrated Circuits (ASICs), Program-specific Standard Products (ASSPs), System-on-a-chip systems (SOCs). Complex Programmable Logic Devices (CPLDs), etc.

Although illustrated as a single system, it is to be understood that the computing device may be a distributed system. Thus, for instance, several devices may be in communication by way of a network connection and may collectively perform tasks described as being performed by the computing device. Although illustrated as a local device it will be appreciated that the computing device may be located remotely and accessed via a network or other communication link (for example using a communication interface). The term 'computer' is used herein to refer to any device with processing capability such that it can execute instructions. Those skilled in the art will realise that such processing capabilities are incorporated into many different devices and therefore the term 'computer' includes PCs, servers, mobile telephones, personal digital assistants and many other devices.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilising conventional techniques known to those skilled in the art that all, or a portion of the software instructions may be carried out by a dedicated circuit, such as a DSP, programmable logic array, or the like.

It will be understood that the benefits and advantages described above may relate to one embodiment or may relate to several embodiments. The embodiments are not limited to those that solve any or all of the stated problems or those that have any or all of the stated benefits and advantages. Variants should be considered to be included into the scope of the invention.

Any reference to 'an' item refers to one or more of those items. The term 'comprising' is used herein to mean including the method steps or elements identified, but that such steps or elements do not comprise an exclusive list and a method or apparatus may contain additional steps or elements.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something". Further, to the extent that the term "includes" is used in either the detailed description or the claims, such term is intended to be inclusive in a manner similar to the term "comprising" as "comprising" is interpreted when employed as a transitional word in a claim.

The figures illustrate exemplary methods. While the methods are shown and described as being a series of acts that are performed in a particular sequence, it is to be understood and appreciated that the methods are not limited by the order of the sequence. For example, some acts can occur in a different order than what is described herein. In addition, an act can occur concurrently with another act. Further, in some instances, not all acts may be required to implement a method described herein.

Moreover, the acts described herein may comprise computer-executable instructions that can be implemented by one or more processors and/or stored on a computer-readable medium or media. The computer-executable instructions can include routines, sub-routines, programs, threads of execution, and/or the like. Still further, results of acts of the methods can be stored in a computer-readable medium, displayed on a display device, and/or the like.

The order of the steps of the methods described herein is exemplary, but the steps may be carried out in any suitable order, or simultaneously where appropriate. Additionally, steps may be added or substituted in, or individual steps may be deleted from any of the methods without departing from the scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

In particular, the skilled person will understand that while embodiments of the invention have been exemplified using personal data, the data need not be of a personal nature, nor is the invention disclosed herein exclusively related to individual use and ownership but rather encompasses organisational data use, ownership, and servers, and use and ownership associated with a proxy. An entity mentioned in the claims may be any suitable type of entity for example a user, an organisation, a government agency, or a machine or network.

The invention claimed is:

1. A method of provisioning a database server for a user by a data management component of a database management platform, the database management platform comprising the data management component communicatively coupled to a plurality of database servers provisioned for one or more of a plurality of users, each database server configured for storing and exchanging data controlled by said corresponding user, wherein the database management platform communicates over a communication network with a plurality of applications, wherein each application is configured for providing an application service requiring access to data of one or more of the plurality of users, the method, performed by the data management component, comprising:
   receiving a request for creating a database server for a user of the plurality of users;
   creating a database server for the user based on a scalable computing infrastructure, wherein the database server is configured for a user to control automatic storage and exchange of data of the user with one or more of the plurality of applications;
   registering data representative of the user and the database server of the user; and
   providing a database server identifier to the user for enabling an application to store and access data in the database server of the user based on data access control information of the application, wherein the application and the data access control information of the application is previously registered with the data management component, and wherein an application is registered with the data management component when the data access control information of the application satisfies or meets data protection requirements of the database management platform;
   receiving, prior to receiving the request to create a database server for the user, a request from the application for creating a data account for the user, wherein the request for creating the data account is sent from the application during an initial set-up stage of the application with the user;
   determining whether the application is registered with the data management component;
   in response to the application being registered with the data management component, performing the steps of:
   retrieving the data access control information of the application;
   displaying data representative of the data access control information of the application to the user, wherein the application is configured to store and access data in the database server of the user based on data access control information of the application; and
   receiving a confirmation the user approves the application handling data of the user in accordance with the data access control information of the application.

2. The method of claim 1, wherein creating the database server for the user further comprises:
   combining at least an application programming interface of a web server, a database, and a file system using the scalable computing infrastructure to form the database server; and
   validating the database server is connectable to the communication network via an endpoint of the application programming interface of the database server.

3. The method of claim 1, wherein the scalable computing infrastructure comprises a web server layer and a database server layer, the web server layer comprising a plurality of web server instances and the database server layer comprising a plurality of database instances, wherein each webserver instance comprises a plurality of webserver containers and each database instance comprises a plurality of database containers, creating the database server for the user further comprising:
   assigning or allocating a portion of a webserver container for creating the webserver;
   assigning or allocating a database container for creating the database; and
   linking the portion of webserver container to the database container for creating the database server of the user.

4. The method of claim 3, wherein each database instance is a single database instance, each single database instance configured with a single multi-tenant database management system shared by each of the plurality of database containers, each database container configured to execute a single tenant logical database for a user and each logical database protected with a user password.

5. The method of claim 4, wherein the single database instance executes a single copy of a database management system configured to manage the plurality of logical databases of each user.

6. The method of claim 1, wherein providing a database server identifier to the user further comprising:
   receiving a data access token from the database server of the user for enabling the application to store and access data in the database server of the user in accordance with the data access control information of the application; and
   sending the data access token of the application to the application for use in storing and accessing data in the database server of the user.

7. The method of claim 1, further comprising, prior to requesting creation of a database server for the user, receiving, from the user, a request for creating a data account for the user.

8. The method of claim 7, further comprising:
   receiving a set of data protection requirements of the user for automatically approving any application having data access control information that meets the data protection requirements of the user; and
   setting-up a user agent for the database server of the user, wherein the user agent is configured to automatically approve any application having data access control information that meets the set of data protection requirements of the user, wherein the application is configured to store and access data in the database server of the user in accordance with the data access control information of the application.

9. The method of claim 1, wherein the data access control information of an application comprises data representative of one or more from the group of:
a set of data exchange rules, instructions and permissions for the application governing the storage and exchange of data between a database server of the user and the application;
data server instructions governing the storage and exchange of data between a database server of the user and the application;
data server instructions digital contract governing the storage and exchange of data between a database server of the user and the application;
data representative of governing the storage and exchange of data between a database server of the user and the application.

10. The method of claim 1, wherein the data access control information of an application comprises data representative of one or more from the group of:
a set of data exchange rules, instructions or permissions for the application governing the storage or exchange of data between a database server of the user and the application;
data server instructions governing the storage or exchange of data between a database server of the user and the application;
data server instructions digital contract governing the storage or exchange of data between a database server of the user and the application;
data representative of governing the storage or exchange of data between a database server of the user and the application.

11. The method of claim 1, wherein each application of the plurality of applications is configured to only store data of a user in a database server of the user, and configured to only access data of a user from the database server of the user.

12. The method of claim 1, wherein data of a user comprises data representative of any information associated with or relating to the user.

13. The method of claim 1, wherein the application is configured for execution on one or more user devices or platforms associated with the plurality of users.

14. The method of claim 1, further comprising:
receiving, from a database server of a user, an indication of the user providing an application permission to store and access data in the database server of the user based on data access control information of the application, the data access control information of the application governing the storage and exchange of data between the database server of the user and the application;
determining whether the application is registered with the data management component, wherein an application is registered with the data management component when the data access control information of the application satisfies or meets data protection requirements of the database management platform; and
in response to the application being registered with the data management component, performing the steps of:
retrieving the registered data access control information of the application governing the storage and exchange of data between the database server of the user and the application; and
sending to the database server of the user data representative of the retrieved data access control information and an indication the application is registered with the data access control; and
registering the database server of the user permitting the application access to the database server in accordance with the registered data access control information,
wherein the database server of the user sends a response message to the application indicating whether permission is granted based on a comparison of the retrieved data access control information with previous data access control information of the application used previously for configuring an application programming interface of the database server of the user for permitting storage and exchange of data between the database server and the application in accordance with the previous data access control information.

15. The method of claim 14, further comprising:
receiving a plurality of validation requests from one or more database servers of one or more users, wherein each validation request from each database server of a user is in response to an application of the plurality of application requesting access to data of said each database server of said user; and
sending for each validation request, when the application is registered with the data management component to access data of the database server of the user corresponding to the validation request, a validation response associated with the application to the database server including data representative of registered data access control information of the application, wherein the data access control information of the application governs the permitted storage and exchange of data between the database server and the application,
wherein, each database server is configured to include an application programming interface configured for controlling access to data of the database server for each application permitted to store and access data of the database server based on previously received data access control information of the application, and for determining whether to permit said application access to data according to the data access control information of the application based on a comparison of the previously received data access control information and the data access control information of the application client received in the corresponding validation response.

16. The method of claim 1, further comprising:
receiving a plurality of validation requests from one or more database servers of one or more users, wherein each validation request from each database server of a user is in response to an application of the plurality of applications requesting access to data of said each database server of said user;
determining for each validation request whether each application of the plurality of applications is registered with the data management component to access data of the database server of the user corresponding to the validation request; and
sending for each validation request, when the application is registered with the data management component to access data of the database server of the user corresponding to the validation request, a validation response associated with the application to the database server including data representative of registered data access control information of the application, wherein the data access control information of the application governs the permitted storage and exchange of data between the database server and the application, wherein, each database server is configured to include an application programming interface configured for controlling access to data of the database server for each application permitted to store and access data of the database server based on previously received data access control information of the application, and for determining whether to permit said application access to data according to the data access control information of the application based on a comparison of the previously received data access control information and the data access control information of the application client received in the corresponding validation response.

17. The method of claim 1, further comprising:
receiving an indication to rescind or disable access to a registered application as authorised for accessing data of one or more database servers in accordance with the data access control information of the application; and
registering an authorisation of the registered application to access data of the one or more database servers as being rescinded or disabled.

18. An apparatus comprising a processor unit, a memory unit and a communication interface, the processor unit connected to the memory unit and the communication unit, wherein the apparatus is configured to:
provision a database server for a user by a data management component of a database management platform, the database management platform comprising the data management component communicatively coupled to a plurality of database servers provisioned for one or more of a plurality of users, each database server configured for storing and exchanging data controlled by said corresponding user, wherein the database management platform communicates over a communication network with a plurality of applications, wherein each application is configured for providing an application service requiring access to data of one or more of the plurality of users, wherein the data management component is configured to:
receive a request for creating a database server for a user of the plurality of users;
create a database server for the user based on a scalable computing infrastructure, wherein the database server is configured for a user to control automatic storage and exchange of data of the user with one or more of the plurality of applications;
register data representative of the user and the database server of the user; and
provide a database server identifier to the user for enabling an application to store and access data in the database server of the user based on data access control information of the application, wherein the application and the data access control information of the application is previously registered with the data management component, and wherein an application is registered with the data management component when the data access control information of the application satisfies or meets data protection requirements of the database management platform;
receive, prior to receiving the request to create a database server for the user, a request from the application for creating a data account for the user, wherein the request for creating the data account is sent from the application during an initial set-up stage of the application with the user;
determine whether the application is registered with the data management component;
in response to the application being registered with the data management component:
retrieve the data access control information of the application;
display data representative of the data access control information of the application to the user, wherein the application is configured to store and access data in the database server of the user based on data access control information of the application; and
receive a confirmation the user approves the application handling data of the user in accordance with the data access control information of the application.

19. A non-transitory computer-readable medium comprising code or computer instructions stored thereon, which when executed by a processor unit, causes the processor unit to perform steps of provisioning a database server for a user by a data management component of a database management platform, the database management platform comprising the data management component communicatively coupled to a plurality of database servers provisioned for one or more of a plurality of users, each database server configured for storing and exchanging data controlled by said corresponding user, wherein the database management platform communicates over a communication network with a plurality of applications, wherein each application is configured for providing an application service requiring access to data of one or more of the plurality of users, said steps, performed by the data management component, comprising:
receiving a request for creating a database server for a user of the plurality of users;
creating a database server for the user based on a scalable computing infrastructure, wherein the database server is configured for a user to control automatic storage and exchange of data of the user with one or more of the plurality of applications;
registering data representative of the user and the database server of the user; and
providing a database server identifier to the user for enabling an application to store and access data in the database server of the user based on data access control information of the application, wherein the application and the data access control information of the application is previously registered with the data management component, and wherein an application is registered with the data management component when the data access control information of the application satisfies or meets data protection requirements of the database management platform;
receiving, prior to receiving the request to create a database server for the user, a request from the application for creating a data account for the user, wherein the request for creating the data account is sent from the application during an initial set-up stage of the application with the user;
determining whether the application is registered with the data management component;
in response to the application being registered with the data management component, performing the steps of:
retrieving the data access control information of the application;
displaying data representative of the data access control information of the application to the user, wherein the application is configured to store and access data in the database server of the user based on data access control information of the application; and receiving a confirmation the user approves the application handling data of the user in accordance with the data access control information of the application.

* * * * *